Dec. 25, 1928.　　　　　　　　　　　　　　1,696,228
A. B. ELY ET AL
TYPEWRITING MACHINE
Filed Oct. 31, 1925　　　19 Sheets-Sheet 1

INVENTORS
A.B.Ely +
E.L.Harmon
BY
ATTORNEYS

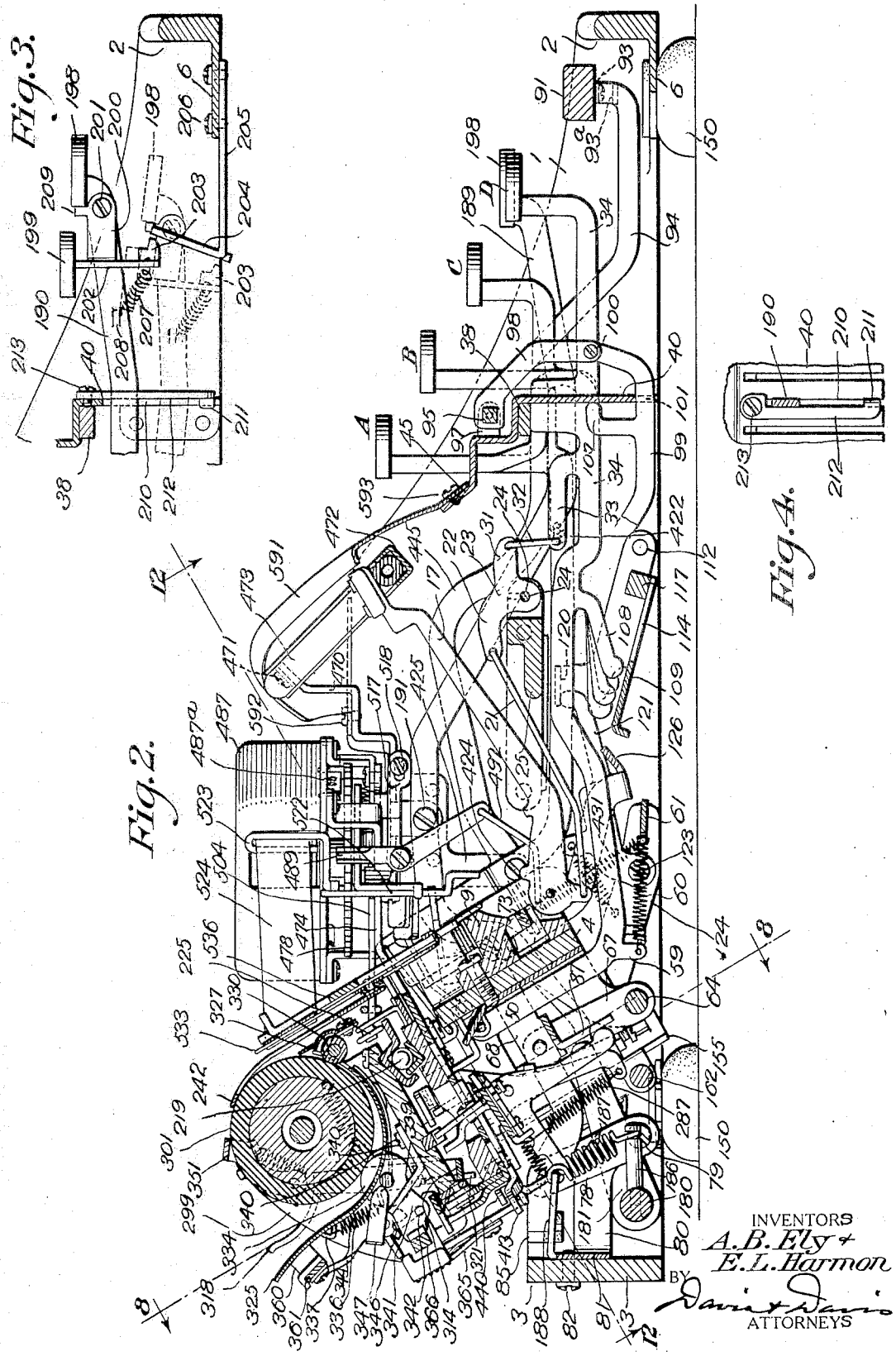

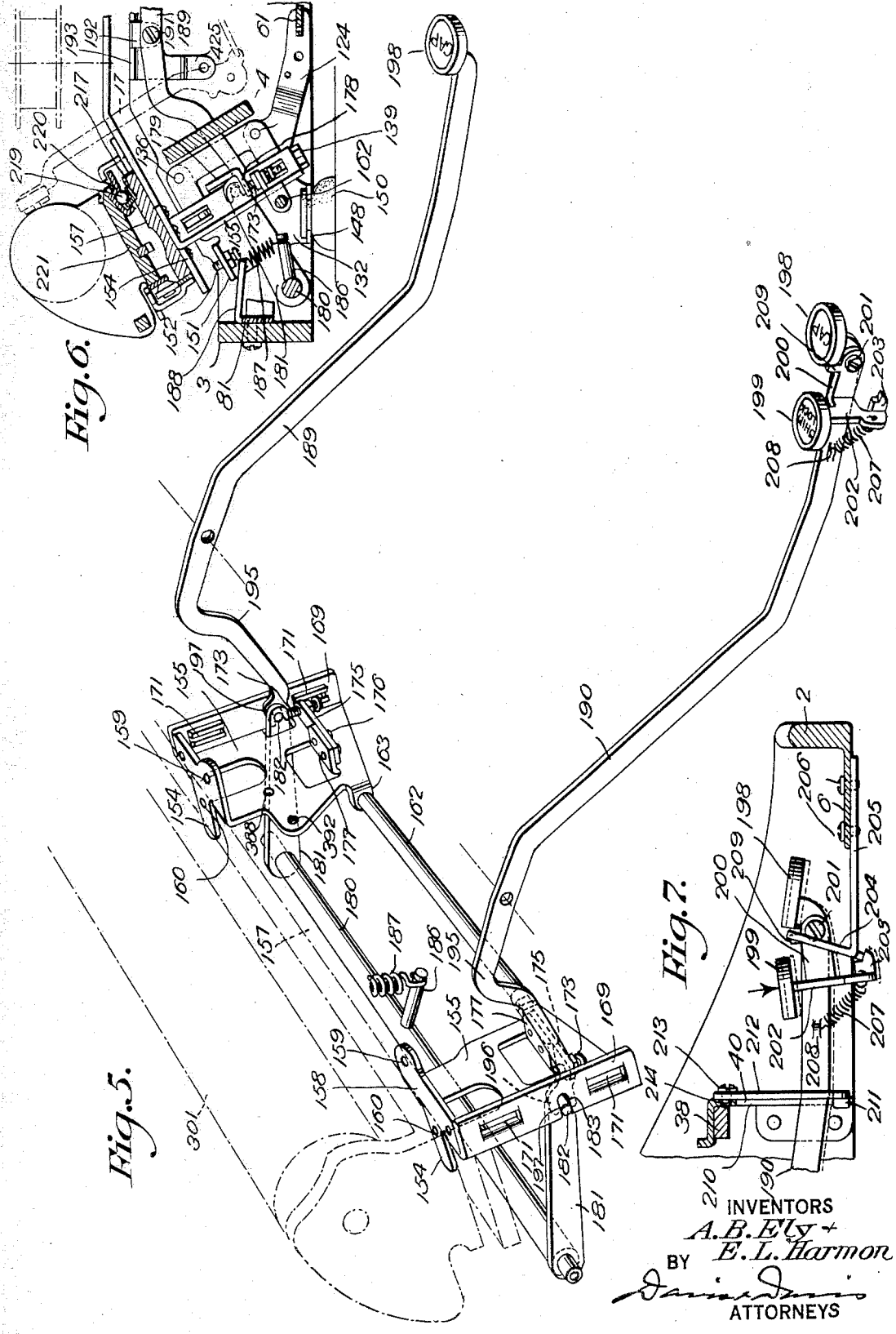

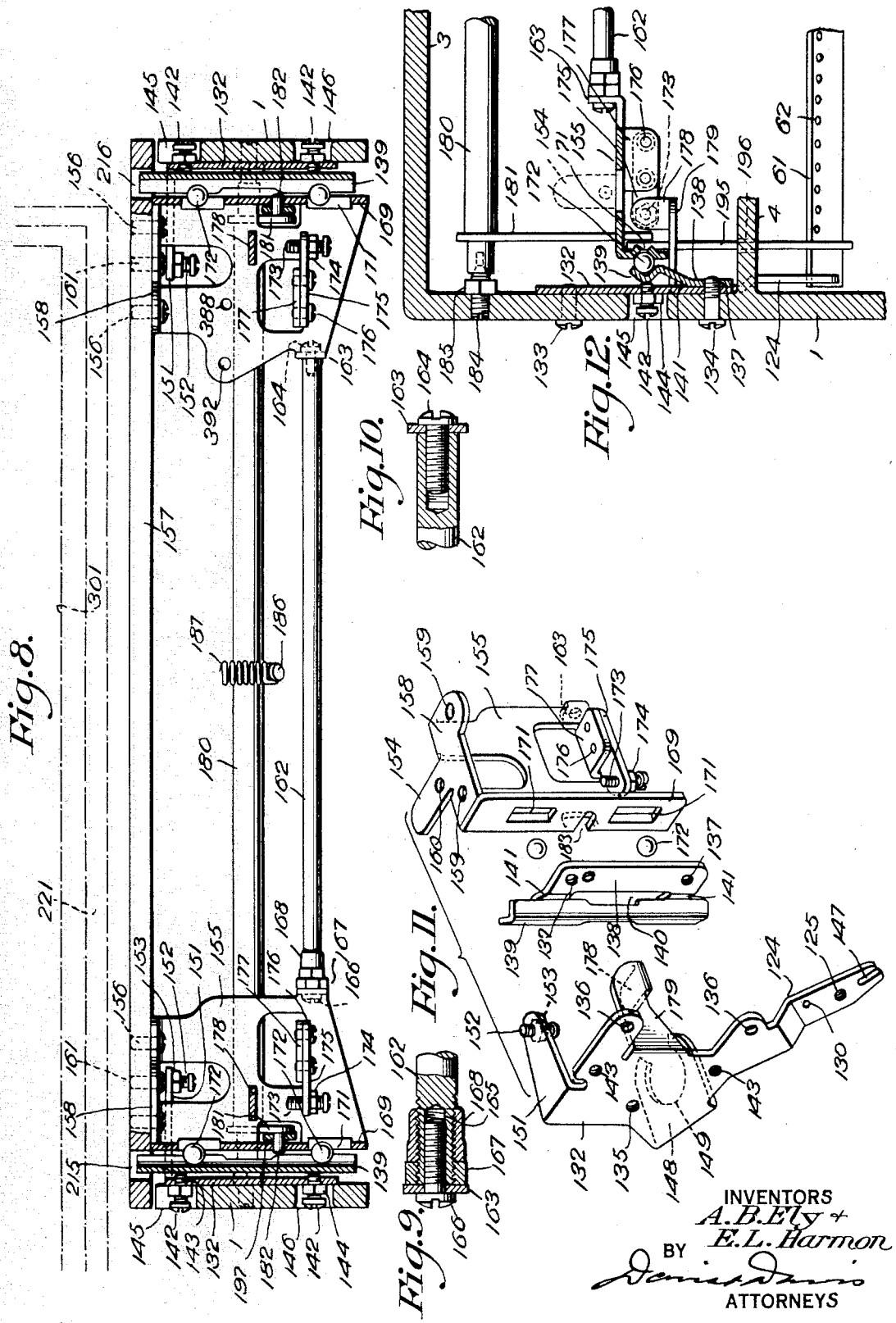

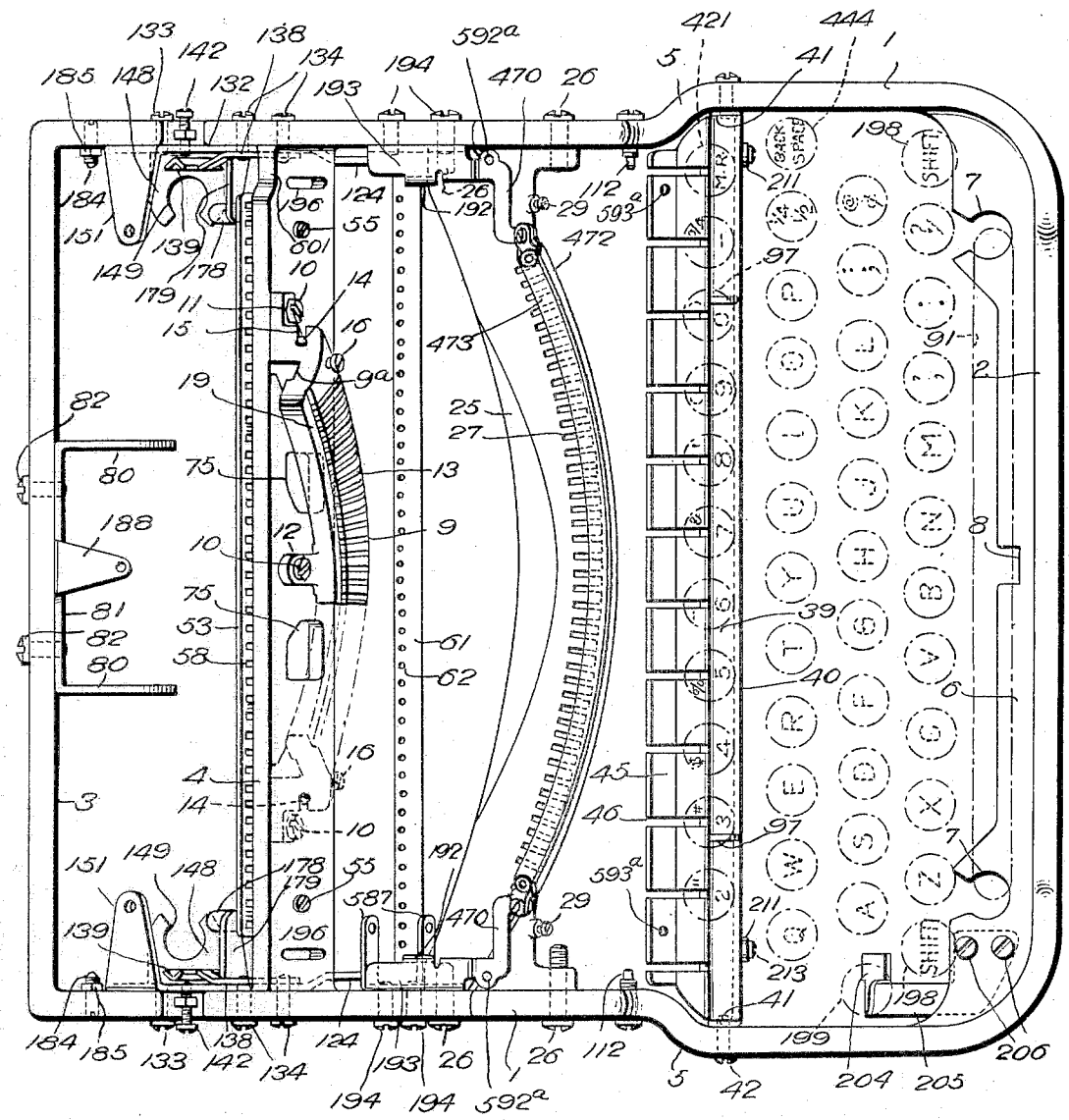

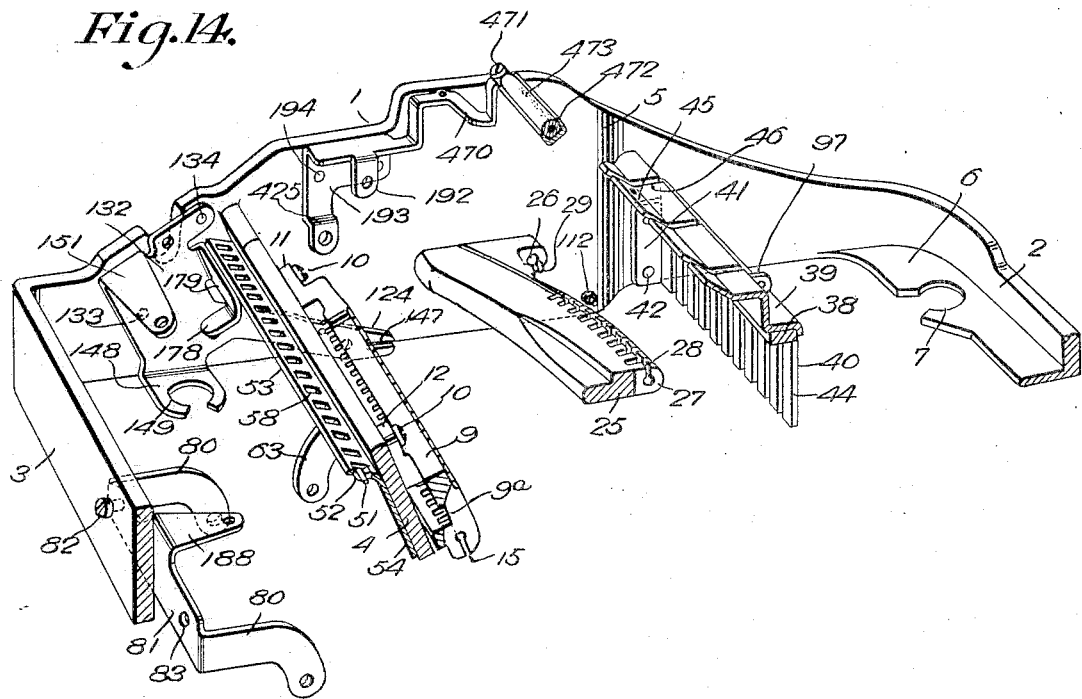

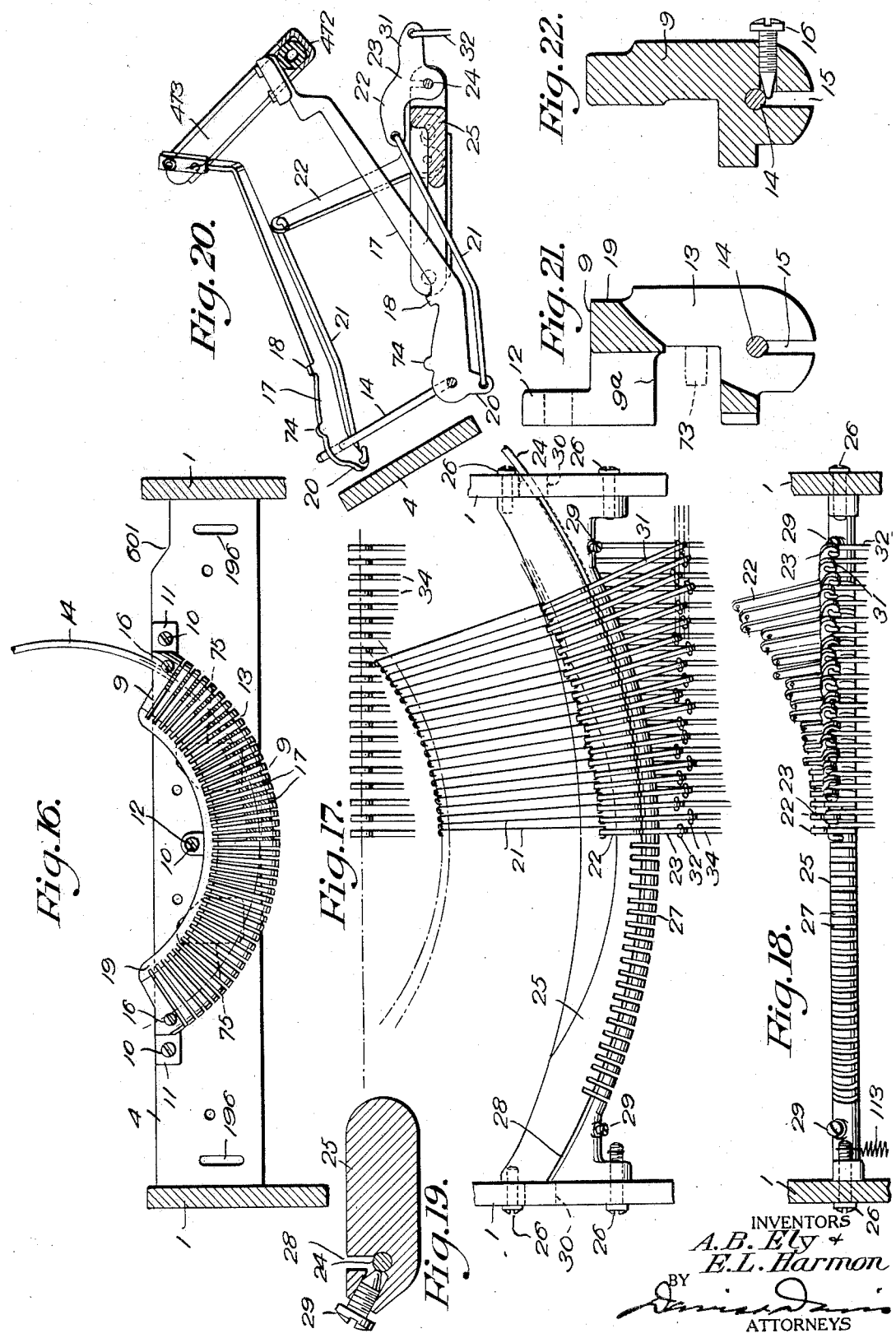

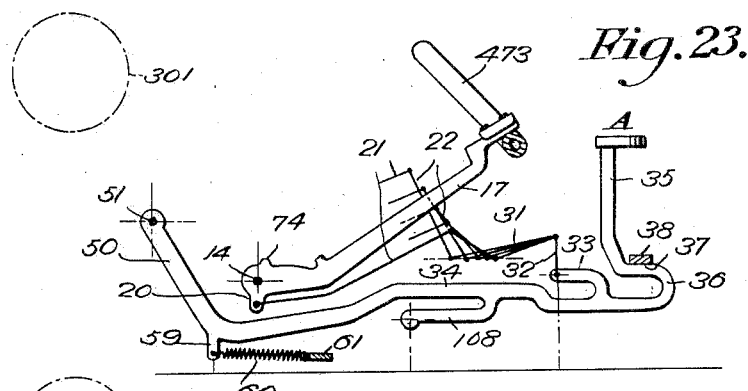
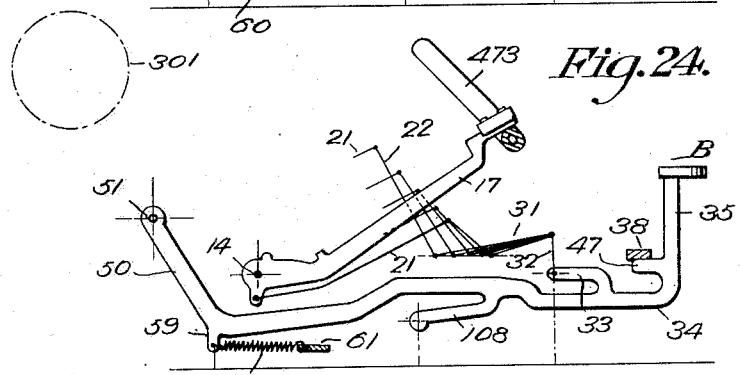
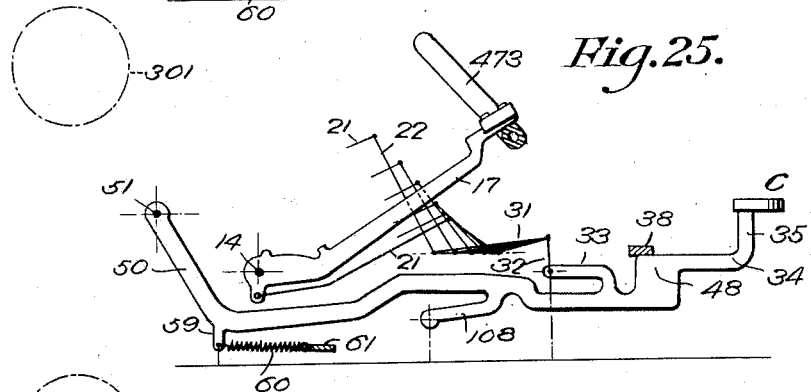
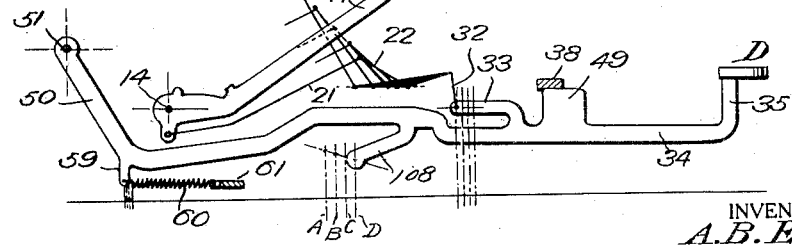

Dec. 25, 1928.  1,696,228
A. B. ELY ET AL
TYPEWRITING MACHINE
Filed Oct. 31, 1925   19 Sheets-Sheet 9

INVENTORS
A.B.Ely +
E.L.Harmon
BY
ATTORNEYS

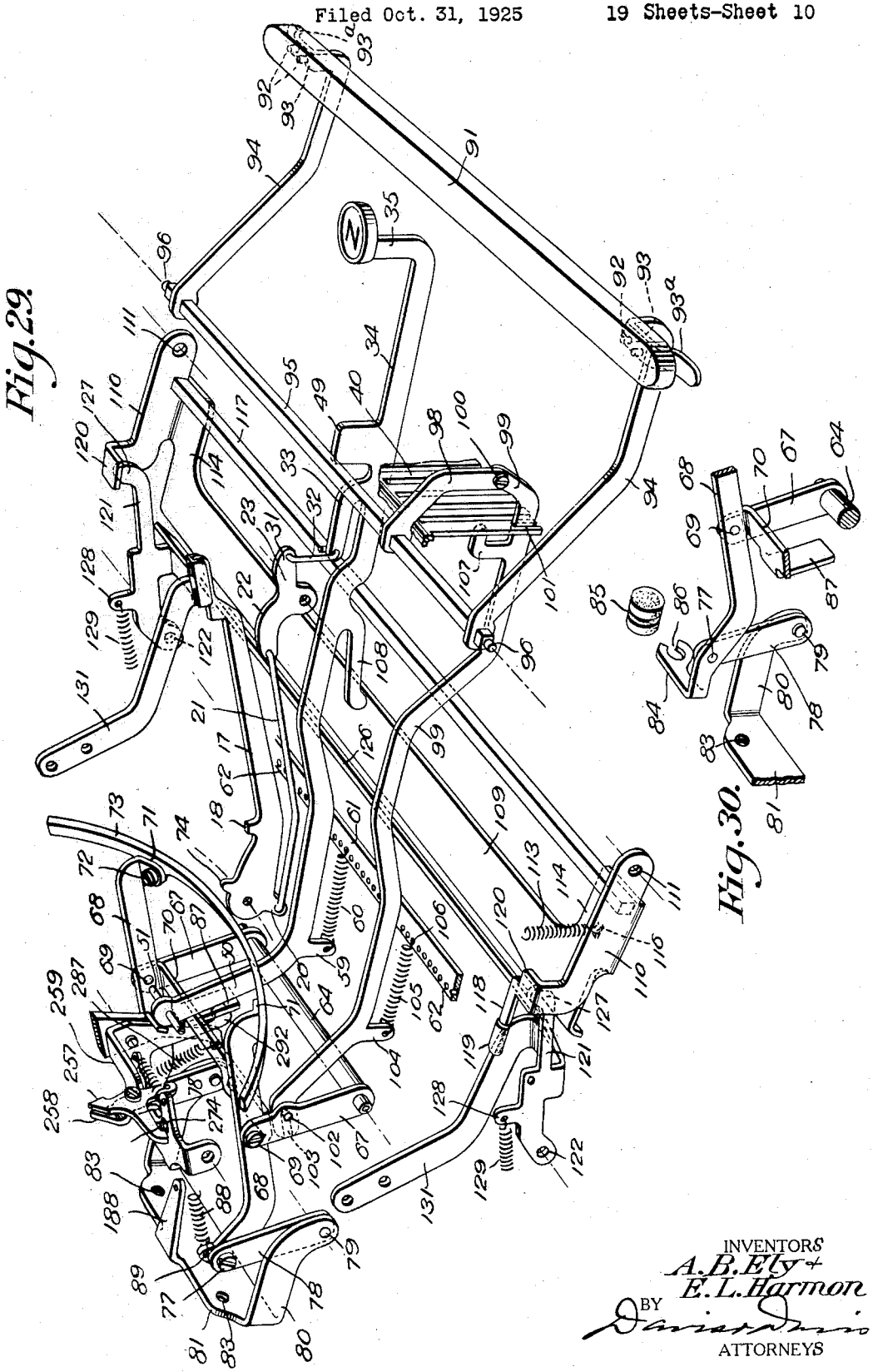

Dec. 25, 1928.
A. B. ELY ET AL
1,696,228
TYPEWRITING MACHINE
Filed Oct. 31, 1925
19 Sheets-Sheet 11
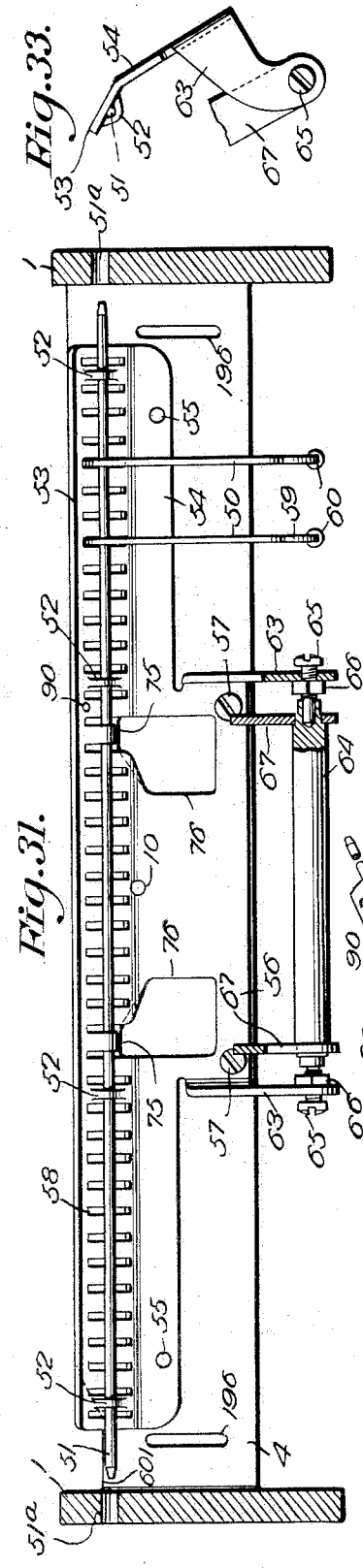
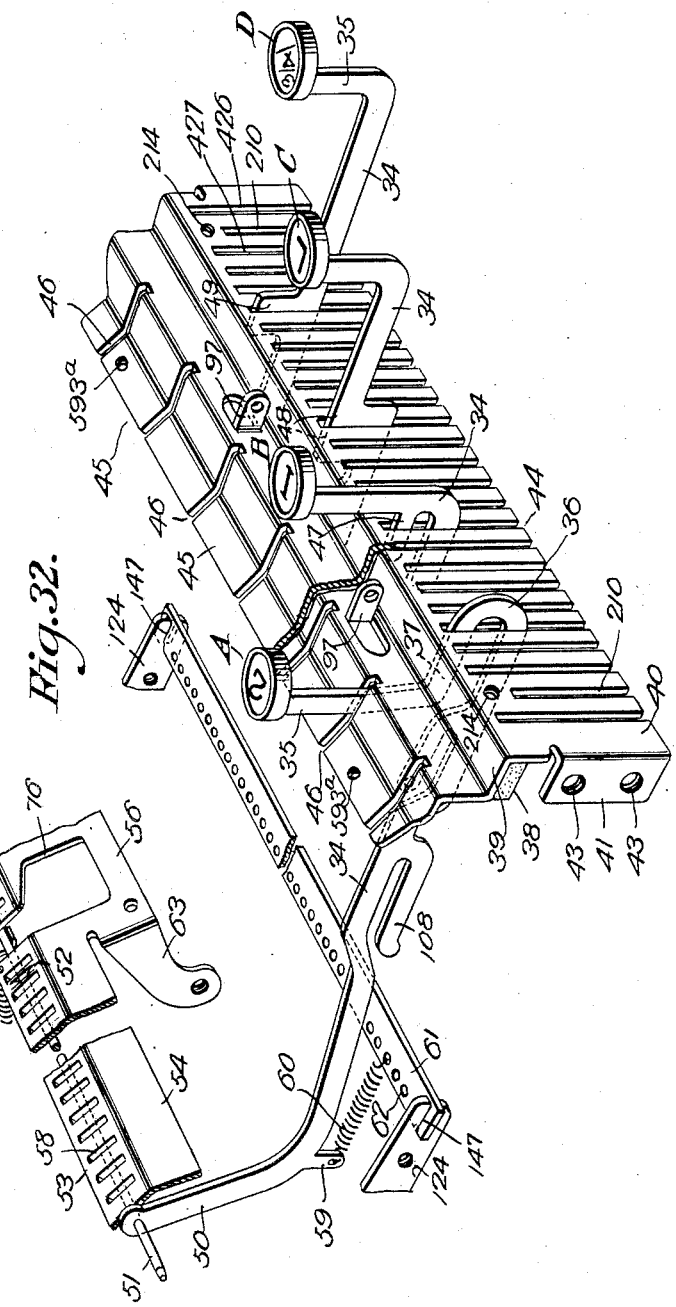
INVENTORS
A.B. Ely +
E.L. Harmon
BY
ATTORNEYS Dec. 25, 1928.

A. B. ELY ET AL 1,696,228

TYPEWRITING MACHINE

Filed Oct. 31, 1925   19 Sheets-Sheet 12

INVENTORS
*A.B.Ely +*
*E.L.Harmon*
BY
ATTORNEYS

Dec. 25, 1928.
A. B. ELY ET AL
1,696,228
TYPEWRITING MACHINE
Filed Oct. 31, 1925
19 Sheets-Sheet 13
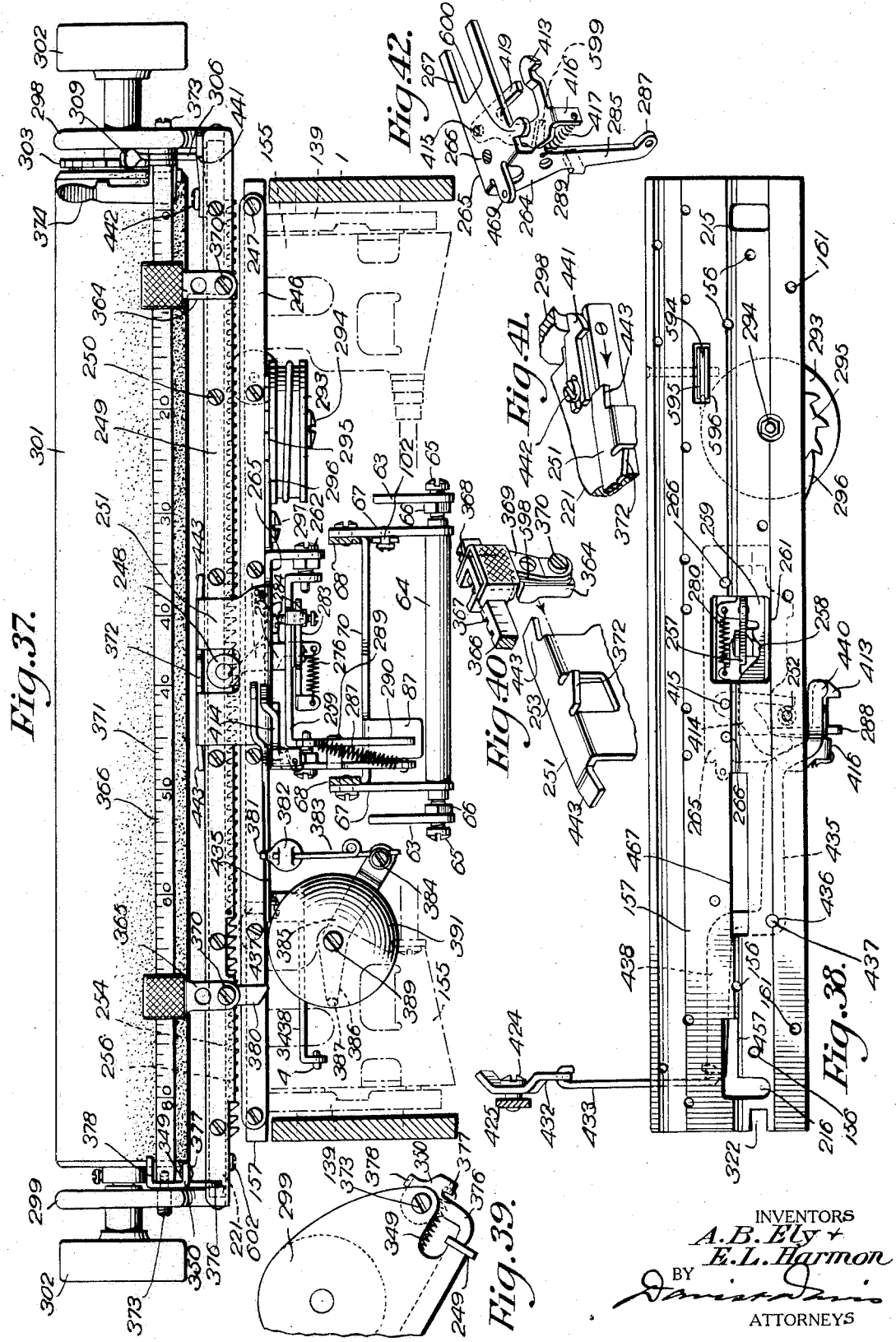
INVENTORS
A. B. Ely +
E. L. Harmon
BY
ATTORNEYS

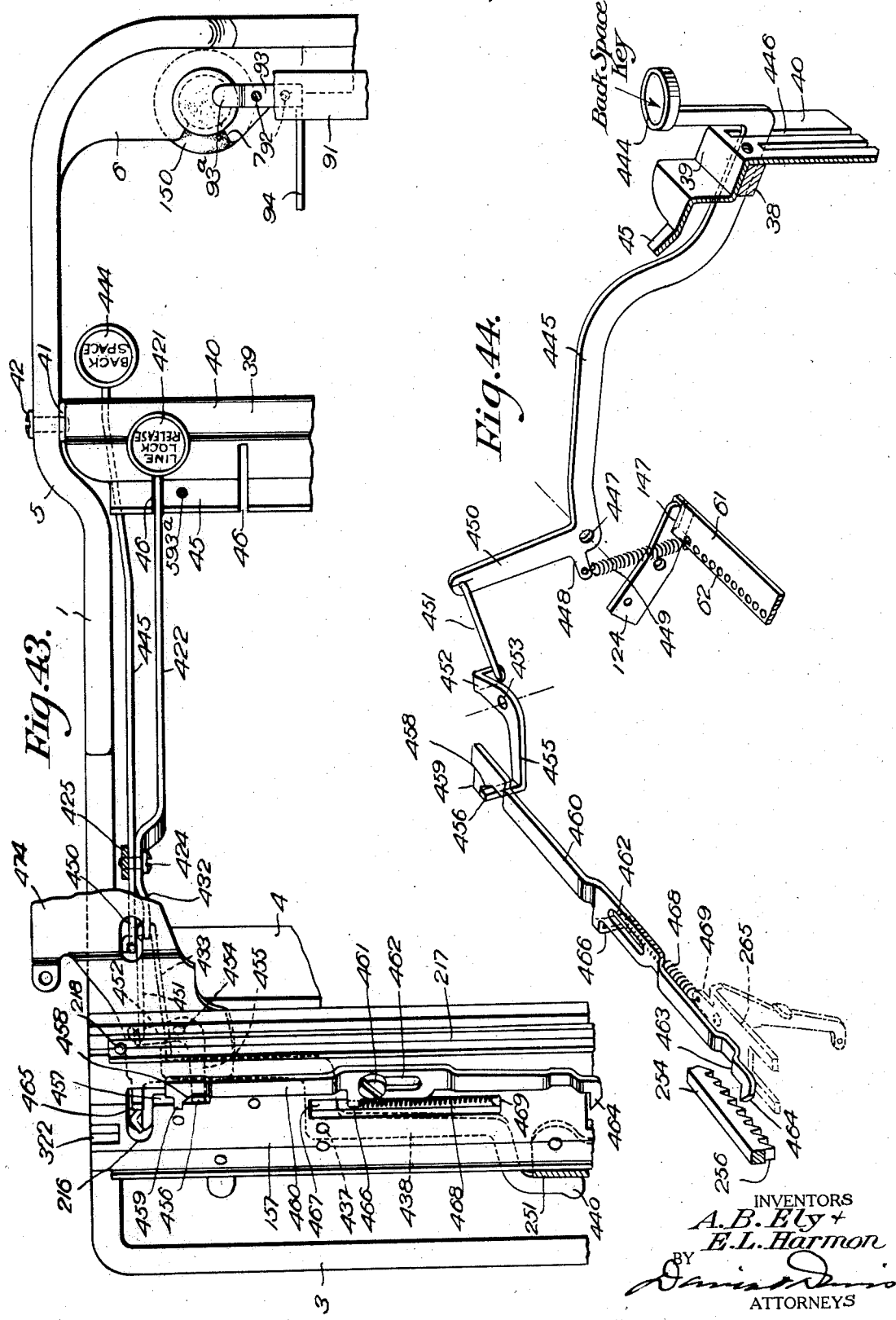

Dec. 25, 1928.  1,696,228
A. B. ELY ET AL
TYPEWRITING MACHINE
Filed Oct. 31, 1925  19 Sheets-Sheet 15
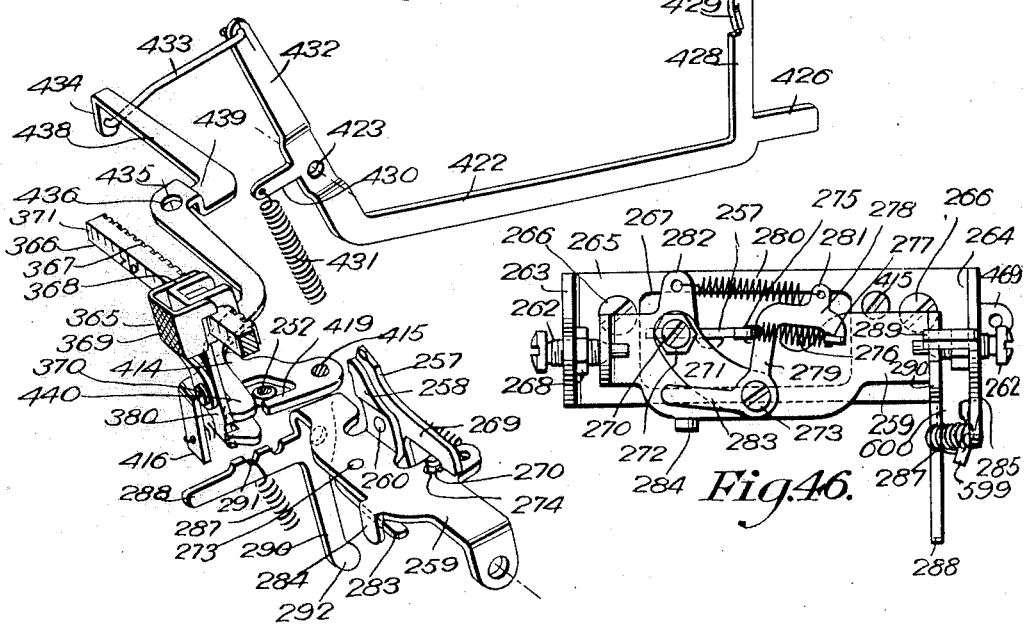
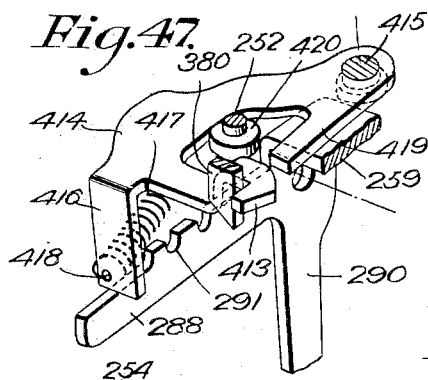
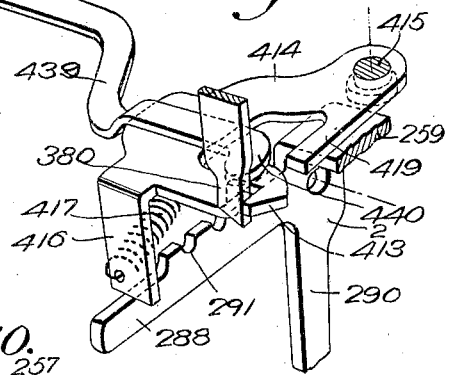
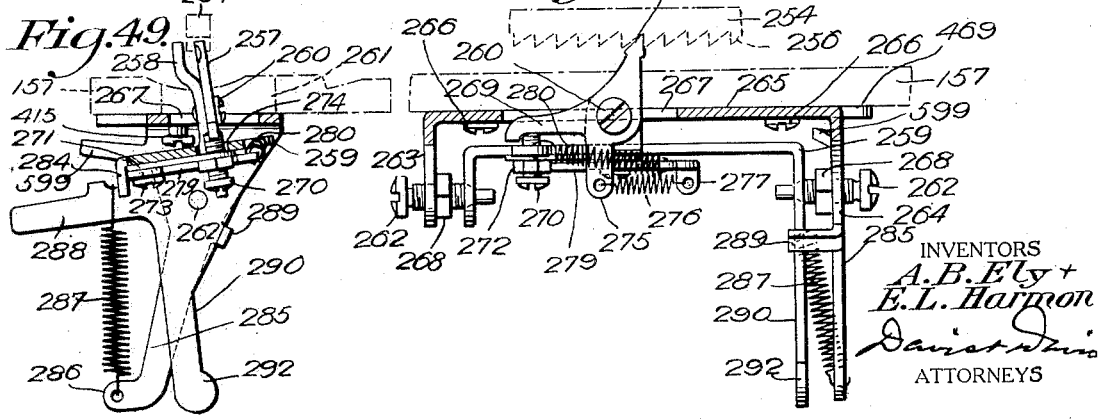
INVENTORS
A. B. Ely +
E. L. Harmon
ATTORNEYS

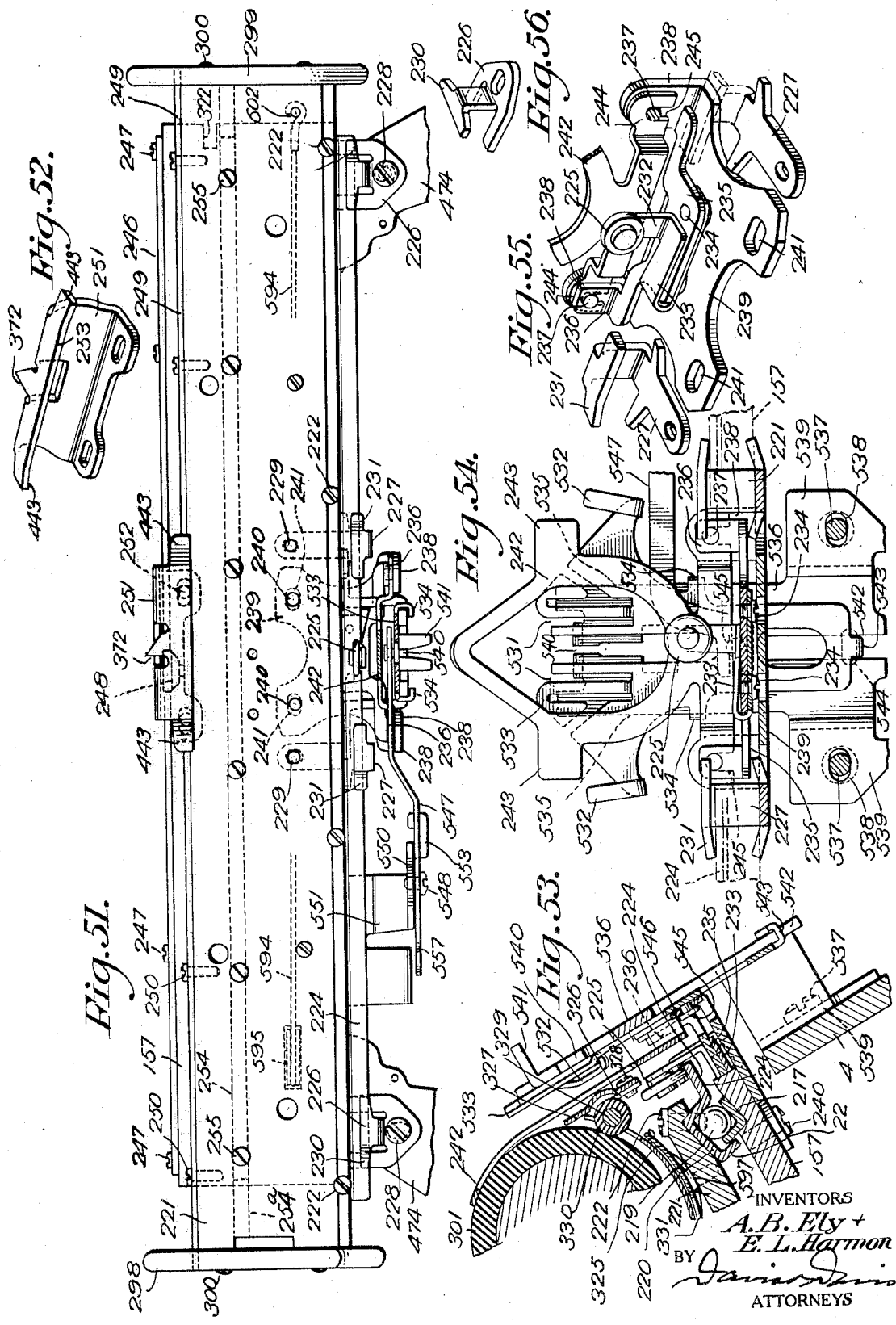

Dec. 25, 1928.  1,696,228
A. B. ELY ET AL
TYPEWRITING MACHINE
Filed Oct. 31, 1925   19 Sheets-Sheet 17
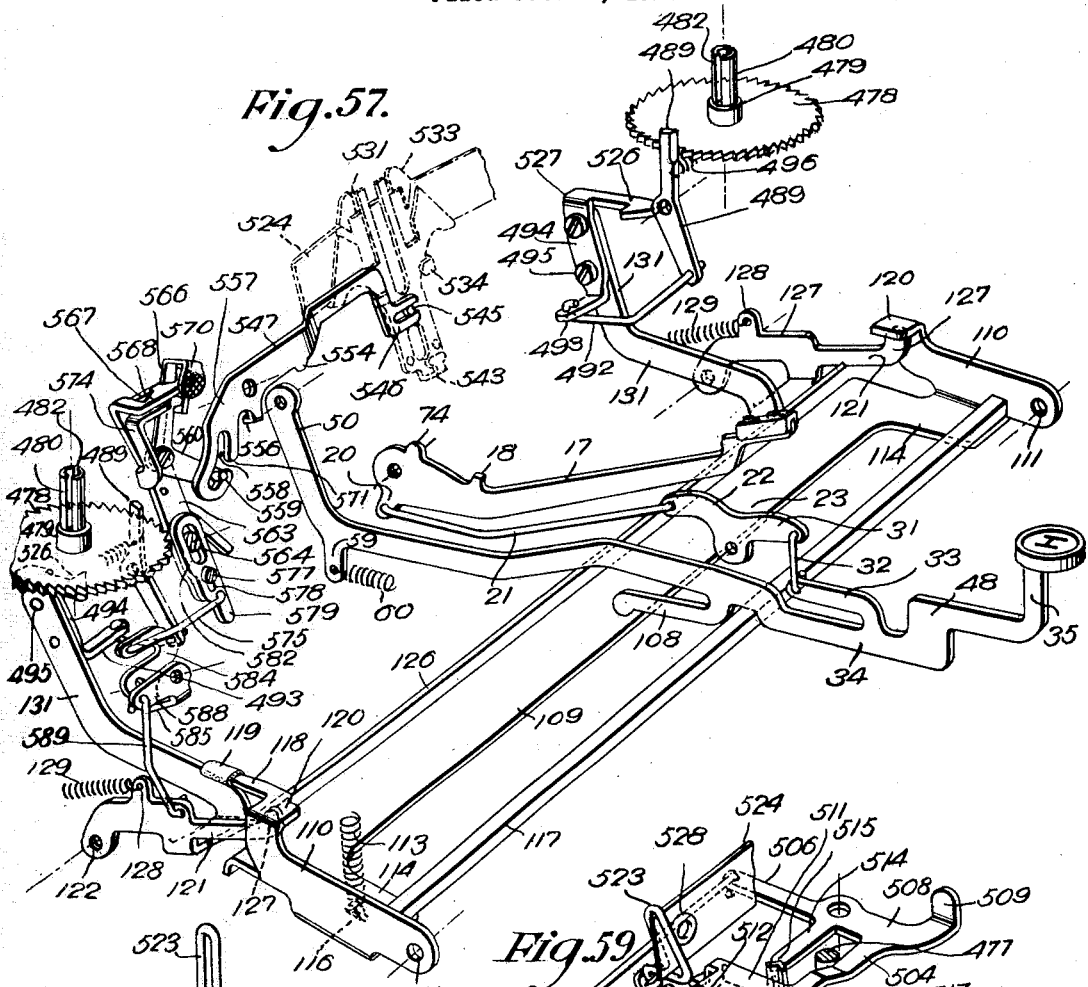
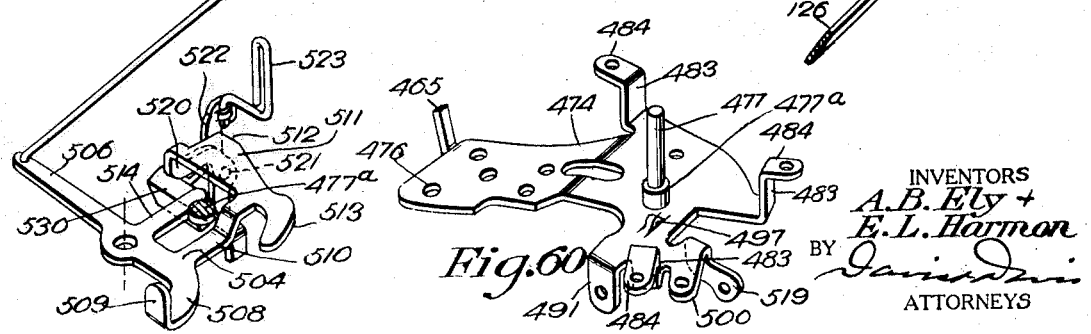
INVENTORS
A. B. Ely +
E. L. Harmon
BY
ATTORNEYS

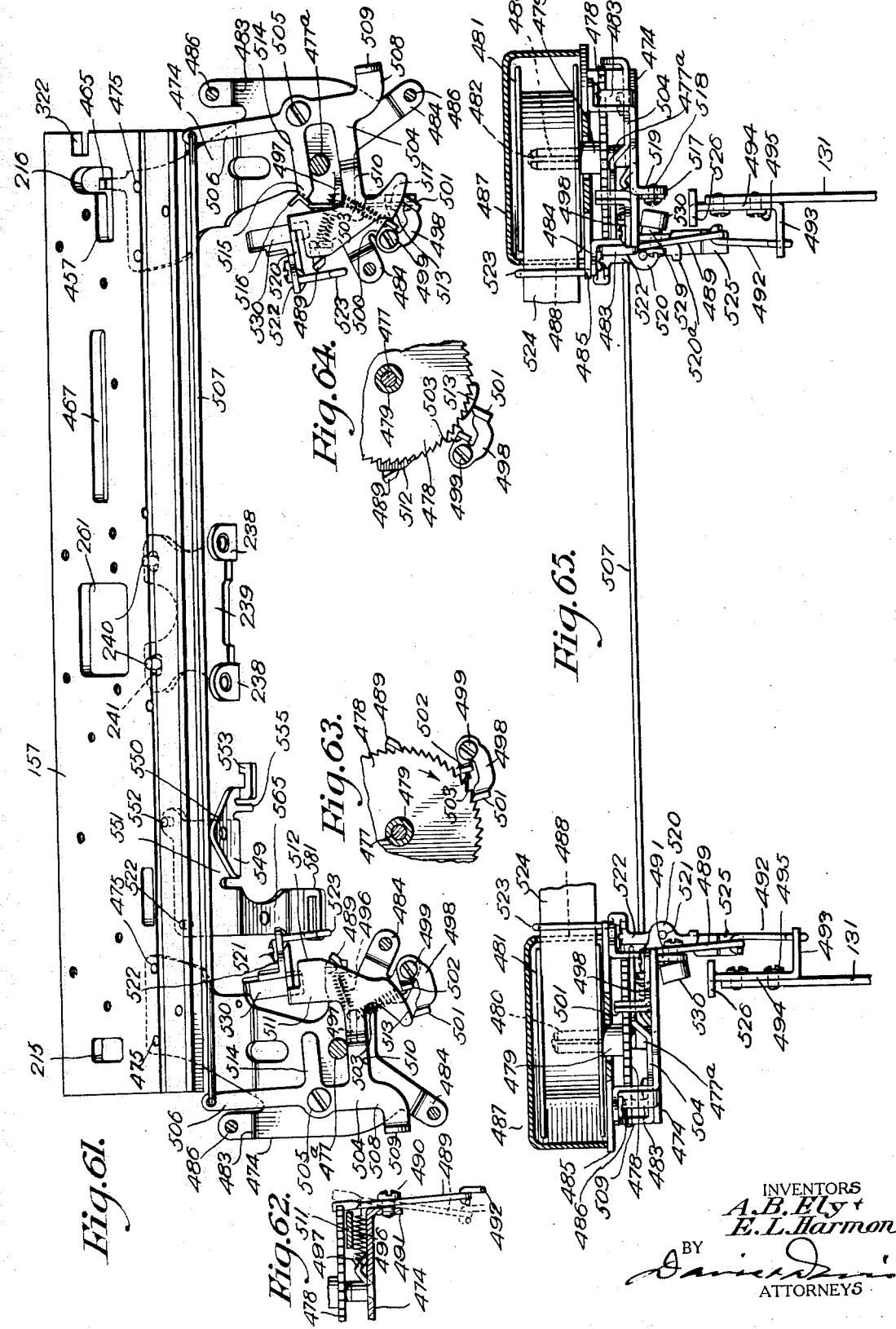

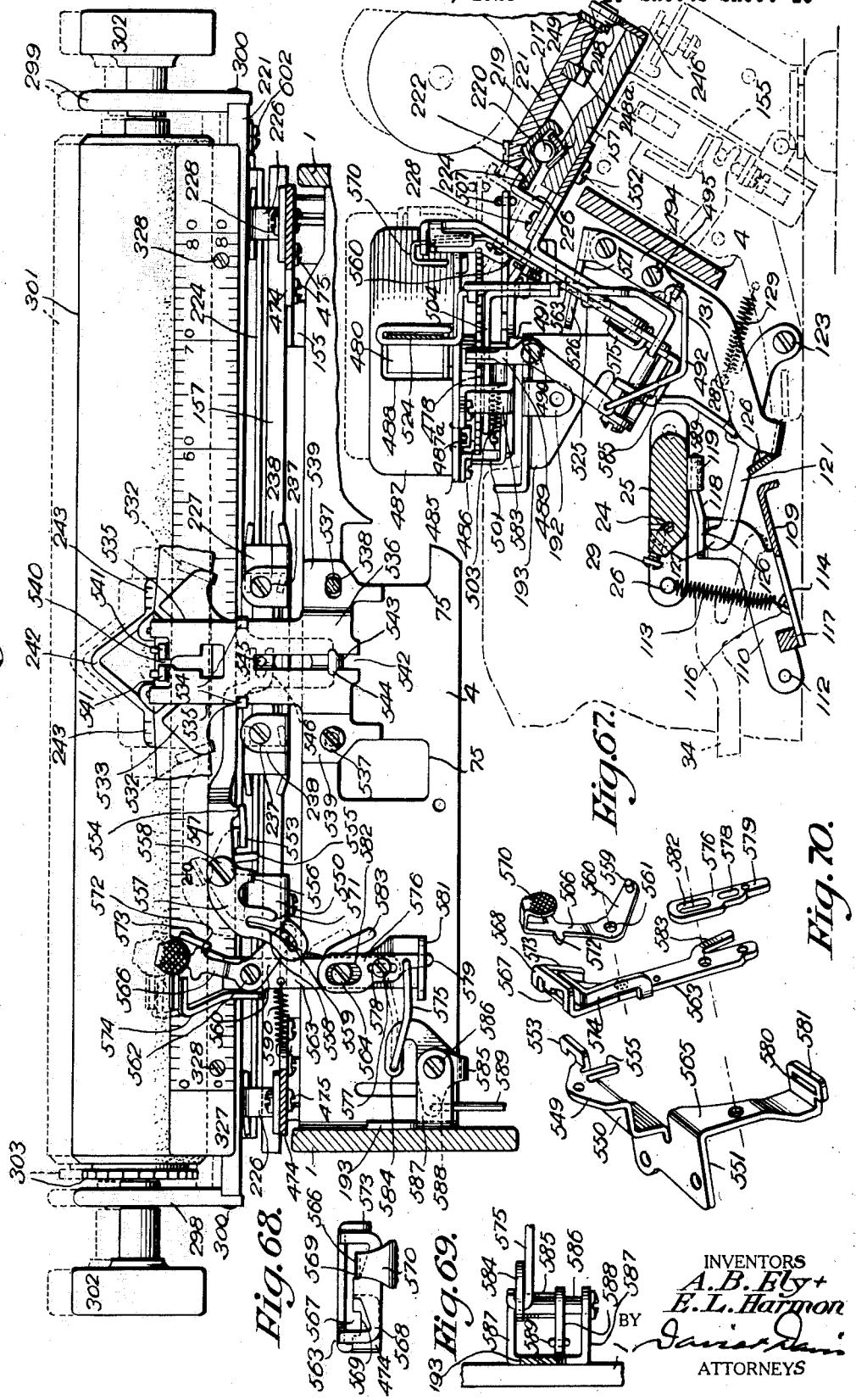

Patented Dec. 25, 1928.

1,696,228

UNITED STATES PATENT OFFICE.

ALONZO B. ELY AND EDWIN L. HARMON, OF GROTON, NEW YORK, ASSIGNORS, BY MESNE ASSIGNMENTS, TO L C SMITH & CORONA TYPEWRITERS INC., OF SYRACUSE, NEW YORK, A CORPORATION OF NEW YORK.

TYPEWRITING MACHINE.

Application filed October 31, 1925. Serial No. 66,000.

This invention relates more particularly to an improved portable typewriting machine having a standard, four-bank keyboard with a single shift.

The four-bank, single-shift type of typewriting machine is considered the standard for office use and for this reason it is desirable to adopt this type for portable or home use, as any one familiar with or accustomed to using the ordinary office typewriter can more readily operate a portable machine provided with the same standard keyboard and shift as the office machine.

In machines of this type heretofore known it has been found necessary, in order to produce a readily portable machine, to either make provision for collapsing the carriage or type action of the machine for transportation, or to make the various operating parts of undesirably small size and mount the same in a main frame relatively short from front to rear and of undesirable height, or to resort to both expedients. It is recognized that machines so constructed have disadvantages.

The principal object of the present invention is to provide a readily portable, four-bank, single-shift typewriting machine suitable for use in the office or home and by travelers, having operating parts, including its type action, platen, line-spacing lever and ribbon mechanism, of rugged but light construction and of sizes usual in office machines.

A further object of the present invention is to provide a low or flat main frame corresponding in transverse and fore-and-aft dimensions with the frames of standard office typewriting machines and upon which the various operating parts are supported, either directly or by means of a small number of specially formed sheet metal brackets, in such manner that said parts may be of the sizes usual in standard office machines.

A further object is to condense the type-bar mounting by placing the pivot segment of the type bars in a transverse plane inclined rearward at an angle of 30° from the vertical, and mounting it closer to the base of the frame of the machine than is usual by securing the segment to the front face of an integral transverse partition wall of said frame, the partition wall being provided with front and rear parallel flat faces lying in planes inclined rearward at an angle of 30° from the vertical.

A further object is to pivotally mount the key levers on a horizontal fulcrum rod extending transversely of the machine parallel with and close to the top edge of the transverse partition wall at a relatively high level in the main frame, the fulcrum rod being supported in a sheet metal plate secured to the rear face of the transverse partition wall by suitable screws, and the major portion of the segment lying below the horizontal plane of the fulcrum rod.

A further object is to provide the key levers with upwardly turned rear ends extending to the fulcrum rod, parallel to the rear face of the transverse partition wall,—that is at an angle of 30° from the vertical, the main portions of the key levers all extending substantially horizontally forward under the lower edge of the transverse partition wall and the segment, the horizontal portions of the key levers in different banks differing in length and being formed at their forward ends with upright key-stem portions differing in length in the different banks and supporting four banks of keys, the highest key bank being substantially at the level of the highest part of the main frame and the lowest bank above the level of the lowest part of the segment and the type-bar pivot wire.

A further object is to provide a corresponding plurality of intermediate or sub-levers, preferably of bell-crank shape, pivotally mounted in a slotted segment located in a horizontal plane, the arrangement being such that the forward arms of the sub-levers fan out in a substantially horizontal plane and are adapted to be connected to the key levers of the different banks at different distances from the common fulcrum of the key levers, while the rear arms extend upwardly and rearwardly in vertical planes converging toward the rear of the machine.

A further object is to provide a type-bar rest curved in an arc of greater radius than the type-bar pivot wire about a center eccentric to the center of curvature of the type-bar pivot segment and wire and supported at a higher level than the segment in a plane inclined more to the rear than the plane of the segment, the relative curvature and arrangement of the segment and rest being such that the type bars normally extend upwardly and forwardly in laterally diverging planes to afford ample space for the type heads and to gradually increase the printing throw of the bars from the center toward the sides of the system of bars, the center bars having a throw of approximately 90° and the side bars having a throw of approximately 100°.

A further object is to arrange the sub-levers, both as to length of lever arms and as to angle of movement, so as to provide for uniform dip of the keys of the different banks and to take care of the variable throw of the type bars,—that is from approximately 90° for the center bars to approximately 100° for the side bars.

A further object is to provide a key lever guide comb plate of special stepped construction to guide the key levers and support a key lever stop pad and the space bar, said plate being provided with forwardly projecting ears adapted to pivotally support the space bar.

A further object is to provide a universal bar for operating the carriage escapement, located back of the type-bar pivot segment in position to be actuated by the type bars when they are brought to the printing point. This universal bar is mounted on the forward ends of rock frame arms extending through apertures in the transverse partition wall of the main frame and supported in the rear thereof by rock arms and parallel links, so that it is mounted for reciprocating movement at right angles to the plane of the type-bar segment,—that is at an angle of 30° from the vertical.

A further object is to provide a platen shift frame mounted for case-shift movement at an angle of 30° from the vertical,—that is parallel to the plane of the pivot rod of the type segment, and, in conjunction therewith, to provide for the operation of the escapement mechanism and the ribbon movement in both the normal and shifted positions of the platen carriage.

A further object is to provide a novel arrangement and mounting of shift-key levers at each side of the keyboard for the case-shift movement of the platen, one of the shift keys being provided with a shift lock.

A further object of the invention is to provide novel and efficient means for supporting, guiding and retaining a rearwardly tilted platen carriage for three-quarter-strike portable typewriting machines.

A further object is to simplify the construction and mounting of the various parts by providing specially shaped sheet metal brackets provided with suitable ears, lugs or arms as may be required for supporting and accommodating the various mechanisms. These special brackets include brackets for supporting the shift keys, the type rest, and for supporting the shift frame race-ways, the latter also providing the stops for limiting the carriage shift.

A further object is to provide an independent universal bar, adapted to be operated by the key levers, for actuating the ribbon mechanism, so that the latter will not be operated by the space bar, which actuates the escapement through parts connected with the escapement universal bar. The ribbon mechanism includes a rock frame pivotally mounted in the main frame and adapted to be operatively connected with the ribbon feed pawls and ribbon vibrator, which are mounted upon and shiftable with the shift frame of the platen carriage; and, in connection therewith, a further object is to provide an automatic ribbon reverse adapted to be actuated by the universal rock frame just referred to.

Further objects of the invention are to provide an improved escapement mechanism, back-space mechanism, and line-locking mechanism, and margin-releasing means.

These and other objects will be more particularly pointed out and referred to hereinafter in the detailed description of the machine.

The preferred form of the machine is more particularly shown in the accompanying drawings, in which Figure 1 shows the machine in side elevation;

Fig. 2 is a vertical longitudinal section, approximately through the center of the machine;

Fig. 3 is a broken-away detail of the left shift key and shift lock;

Fig. 4 is a broken-away detail of the slotted guide comb, showing the guide slot for the shift key;

Fig. 5 is a perspective view of the shift frame and shift keys;

Fig. 6 is a broken-away partial section of the rear end of the machine, with many of the parts left off, the shift frame being in upper-case position;

Fig. 7 is a view similar to Fig. 3, showing the parts in shift-locking position;

Fig. 8 is a transverse sectional view of the shift frame, the section being taken through the ball races on the line 8—8 of Fig. 2 at an angle of 30° from the vertical;

Figs. 9 and 10 are details of the ends of the stay rod connecting the shift frame brackets;

Fig. 11 is a perspective view of the left-hand supporting and guiding means for the carriage bed and the parts of the main frame bracket associated therewith, detached;

Fig. 12 is a broken-away sectional view taken on the line 12—12 of Fig. 2, through the left shift frame bracket and raceway;

Fig. 13 is a top plan view of the main frame and the parts carried thereby for supporting, guiding and anchoring the working parts of the machine;

Fig. 14 is a perspective view of the right half of the main frame, showing certain of the parts carried thereby;

Fig. 15 is a vertical longitudinal section through the center of the main frame of the machine, looking toward the left side of the machine, showing certain of the parts carried by the frame;

Fig. 16 is a fragmentary sectional view taken in a plane parallel with the plane of the transverse inclined frame wall, showing the type bar segment secured to the transverse wall, and the pivot wire partly inserted in the segment groove through half of the type bars;

Fig. 17 is a fragmentary plan view showing parts of the operating means for the type bars in one-half of the segment, the bell-crank fulcrum wire being shown partly inserted in the bell-crank supporting segment;

Fig. 18 shows the same parts as in Fig. 17, looking from the front;

Fig. 19 is a sectional view through the sub-lever segment;

Fig. 20 is a detail vertical sectional view showing the center and side type bars and their operating connections leading to the key levers;

Fig. 21 is a vertical section substantially through the middle of the type segment;

Fig. 22 is a transverse section through the type segment at one end thereof, showing the screw for securing the pivot rod;

Figure 27:
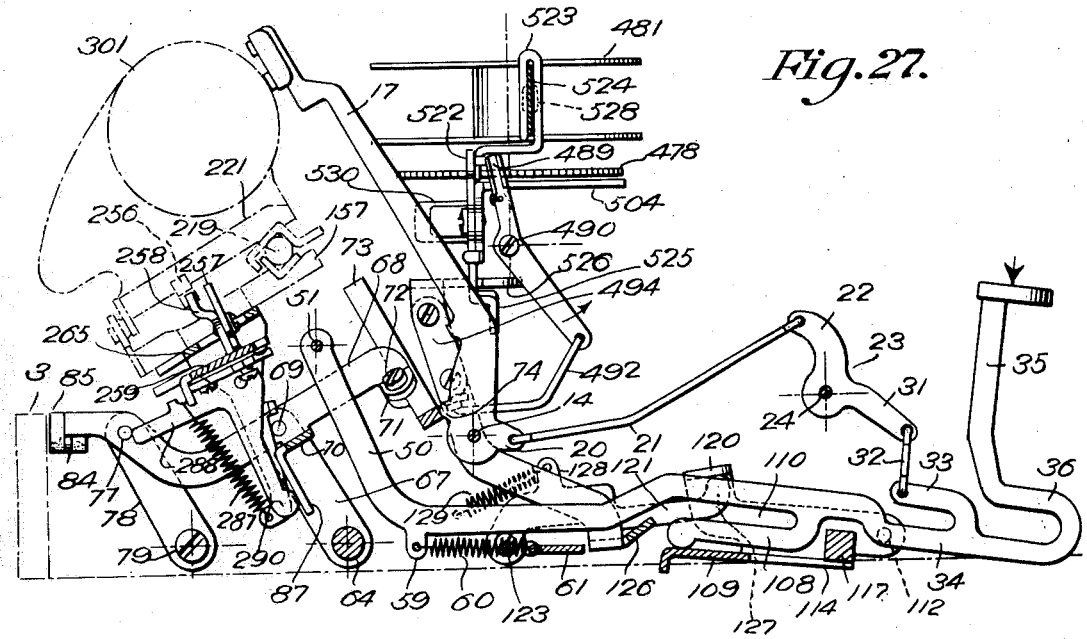
Figure 28:
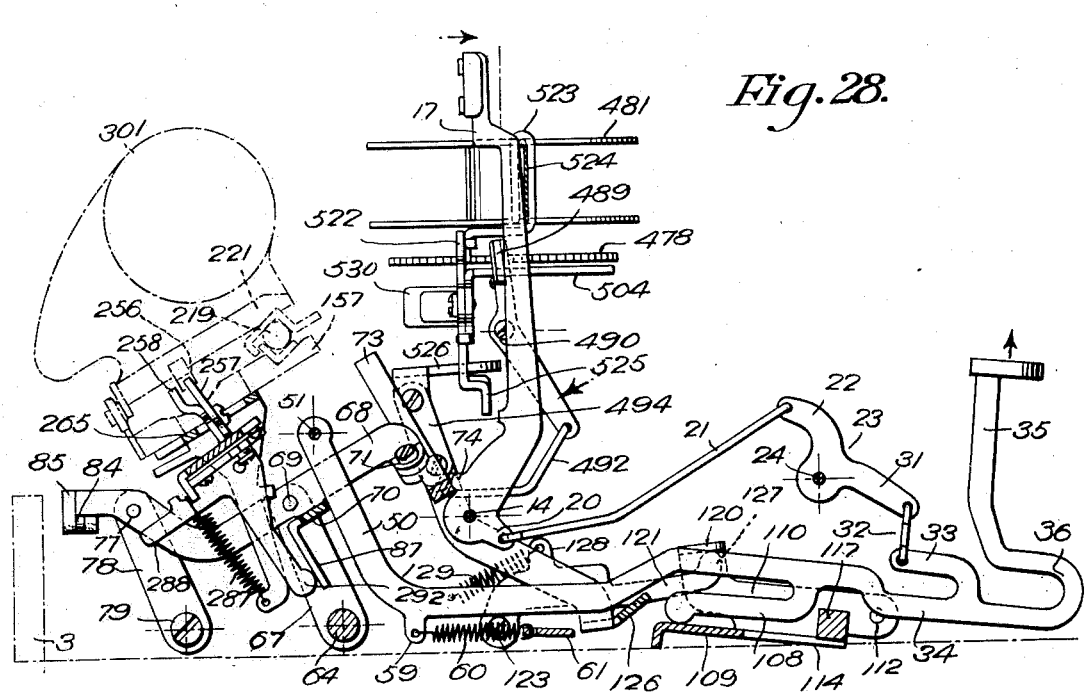

Figs. 23 to 26 inclusive show, respectively, the shape of the key levers in the first, second, third and fourth banks, and diagrammatically show the connections between the several banks of key levers and the type bars associated therewith;

Fig. 27 is a vertical longitudinal sectional view showing the ribbon and escapement operating means and a single key lever and type bar, with the type bar at the printing point;

Fig. 28 is a view of the parts shown in Fig. 27, showing the type bar returning to normal position and at the point at which its type head is in a vertical plane through its pivot;

Fig. 29 is a perspective view of the escapement and ribbon operating universal bar mechanisms, the space-bar mechanism, and type-bar action;

Fig. 30 is a perspective detail of the right-hand portion of the escapement rock frame;

Fig. 31 is a vertical transverse section of the rear portion of the machine, showing, from the rear, the key lever fulcrum rod support on the transverse partition wall and part of the escapement operating means;

Fig. 32 is a perspective view of separated portions of the machine, including the guide comb and broken-away parts of the fulcrum bar supporting plate;

Fig. 33 shows an end view of the fulcrum rod supporting plate;

Fig. 34 shows a rear elevation of the machine with the rear wall cut away;

Fig. 34ª is a perspective view of a part of the line-lock alarm;

Fig. 35 is a side elevation of the rear portion of the machine, looking toward the left;

Fig. 36 is a detail of the line-space ratchet detent;

Fig. 37 is a rear elevation, partially in section, showing parts of the line-lock mechanism; the line-lock alarm, margin release, and escapement mechanism;

Fig. 38 is a top plan view of the shift frame carriage bed, with some of the parts associated therewith;

Fig. 39 is an end view of the platen carriage, showing certain details;

Fig. 40 is a perspective detail of the left margin stop and the fixed stop lug;

Fig. 41 is a perspective detail of the final carriage stop at the left end;

Fig. 42 is a perspective detail of the line-lock lever;

Fig. 43 is a broken-away top plan view of the line-lock release means and back-space means;

Fig. 44 is a perspective view of the back-space key and connections;

Fig. 45 is a perspective view of the line-lock-release key and connections, showing the right-hand margin stop about to engage and move the line-lock lever;

Fig. 46 is a plan view of the under side of the escapement dog rocker in its supporting bracket;

Fig. 47 is a perspective detail of the line-lock lever in locking position;

Fig. 48 is a similar view to Fig. 47, showing the positions of the right-hand margin stop and the line-lock-release lever when the line is locked;

Fig. 49 is a vertical sectional view of the escapement dog rocker and its supporting bracket, the dogs being in normal position;

Fig. 50 is a front elevation of the escapement dog rocker with the supporting bracket partially in section;

Fig. 51 is a top plan view showing the platen carriage frame and its supporting and guiding means, with the platen and paper-feed means removed, and showing also part of the ribbon mechanism and the type guide;

Fig. 52 is a perspective view of the rear carriage gib;

Fig. 53 is a fragmentary vertical section, showing a part of the ribbon mechanism and the front ball bearing for the carriage;

Fig. 54 is a rear view, in elevation, of the type guide, the printing line and point indicator, and ribbon vibrator, with associated parts;

Fig. 55 is a perspective view of the brackets and gibs associated with the printing line and point indicator and carriage retaining roller;

Fig. 56 is a perspective view of one of the front carriage gibs;

Fig. 57 is a perspective view of the ribbon mechanism, illustrated in connection with one key action;

Fig. 58 is a perspective view of one of the ribbon-reverse control levers;

Fig. 59 is a perspective view of the automatic ribbon-reverse mechanism;

Fig. 60 is a perspective view of one of the ribbon-spool brackets carried by the platen shift frame;

Fig. 61 is a top plan view showing the carriage bed and associated brackets for supporting the ribbon spools and ribbon vibrator, and also showing the ribbon feeding and reversing means in position to wind the ribbon on the left-hand spool;

Fig. 62 is a transverse section showing the left-hand pawl and ratchet in active relation;

Fig. 63 is a broken-away plan view of the left ribbon-feed ratchet wheel and the associated feed and detent pawls in feeding position;

Fig. 64 is a similar plan view of the right ribbon-feed ratchet wheel with the feed and detent pawls held out of engagement, as shown in Fig. 61;

Fig. 65 is a view in front elevation of the ribbon spools and automatic reverse mechanism, the parts being in the position shown in Figs. 61 to 64;

Fig. 66 is a front elevation of the platen carriage and part of the ribbon vibrating mechanism, with the main frame in section in front of the transverse partition wall;

Fig. 67 is a vertical longitudinal section of the rear portion of the machine, showing details of the ribbon mechanism at the left side of the machine;

Fig. 68 is a top view of the upper end of the ribbon vibrator lever;

Fig. 69 is a plan view of the ribbon vibrator sub-lever; and

Fig. 70 is a perspective view of the bracket and ribbon vibrating lever in disassociated relation.

In order that a definite idea of the compact construction of the machine may be had it is stated that the improved typewriter is illustrated full size in Figs. 1 to 4, 7, 8, 12, 20, 27, 28, 31, 33, 43, 51 and 67 of the drawings. The over-all fore and aft length of the main frame is 11 inches, the over-all width of the keyboard-enclosing portion of the main frame is 10⅛ inches, the over-all width of the narrower rear portion of the main frame is 9⅜ inches, the height of the highest portions of the side walls of the main frame is 2¾ inches, the keys of the keyboard are of standard size and spacing, the type bars measure from pivot axis to free end approximately 3 5/16 inches, the distance between the inner faces of the end plates of the platen carriage is 10¼ inches, the length of the platen roller is 9¾ inches, the diameter of the platen roller is 1¼ inches, the top of the platen roller is 4⅛ inches above the base of the main-frame-supporting feet, the line-space lever extends forward and outward approximately 2⅞ inches from its pivot and its finger-piece extends upward approximately ⅞ inches, the transverse span of the top face of the type rest pad is approximately 6 inches, the transverse span of the type bar segment (exclusive of the end lugs) is approximately 5 inches, the diameter of the ribbon spool heads is 2 inches, and the width of the ribbon is ½ inch.

Referring to the drawings, it will be seen that the main frame of the machine is low or flat and comprises the side walls 1, front wall 2, rear wall 3 and a transverse partition wall 4, all formed as an integral casting. The side walls 1 at the middle of the machine are approximately of the height of the rear bank of keys and drop or slant downward toward the front of the machine to join the front wall which is of narrow, bar-like form and stands below the front or lowermost bank of keys. The side walls 1 also slant down toward the rear wall at an angle of approximately 30° to the horizontal, where the platen carriage shift frame is located, the rear wall of the main frame being approximately the height of the lowermost bank of keys. The side walls 1 of the main frame, beginning just back of the rear bank of keys, are off-set at 5, so that the frame swells outward at each side of the keyboard as shown in Fig. 13 of the drawings. The lower edges of the walls of the main frame are all in the same horizontal plane, and the front wall, being very narrow vertically, is reinforced at the bottom by a rearwardly projecting flange 6 which is preferably wider at the ends near the side walls 1. These wider portions of the flange 6 are provided with keyhole slots 7 adapted to receive the intermediate reduced neck portions of the two front rubber feet 150 for supporting the front end of the machine, as shown in Figs. 2, 13 and 43. This flange 6 is also provided with a central notch 8, which is adapted to co-operate with a retaining clip (not shown) for holding the machine in a carrying case.

The flat transverse partition wall 4 inclines upwardly and rearwardly at an angle of 30° to a vertical plane and is located about midway between the back wall and the transverse center line of the frame, with the upper edge of the partition wall lying substantially in the plane of the upper edges of the adjacent portions of the side walls 1 which, at this point, as previously pointed out, slope downward toward the rear at an angle of 30° to the horizontal. The lower edge of the transverse partition wall is above the level of the lower edges of the other frame walls and approximately level with the upper edge of the front wall, thereby leaving an open space below the partition wall 4 and above the level of the bottom edges of the other walls, as shown in Figs. 2 and 15 of the drawings.

A slotted type-bar pivot segment 9 is secured to the front face of the transverse partition wall 4 by means of screws 10 passing through suitable lugs 11 and 12, as shown in Figs. 13 and 16. The type-bar pivot segment 9 is provided with the usual radial slots 13 in which the type bars 17 are pivotally mounted upon a pivot rod or wire 14 which is located in a peripheral groove 15, the pivot rod being held in place in the groove by screws 16, as indicated in Figs. 13 and 22. The segment and pivot wire lie in planes parallel with the plane of wall 4, i. e. in a transverse plane inclined rearward at an angle of 30° from the vertical. The radius and length of the segment and pivot wire correspond with those of segments and pivot wires of standard office machines, the pivot wire extending through an arc of approximately 124° on a radius of approximately 2.6 inches. The flat sheet metal type bars 17, which are as long as the type bars commonly employed in standard office machines (measuring in the present machine $3\frac{5}{16}$ inches from pivot to free end), are provided with upwardly projecting lugs 18 adapted to co-operate in the well-known manner with an anvil surface 19 upon the pivot segment above the slots 13. There are 42 type bars in the machine shown, each carrying two type. The heels of the type bars are provided with the usual tail lugs or ears 20 forming short lever arms which are connected by means of links 21 with upwardly and rearwardly extending arms 22 of sub-levers 23 pivoted on a curved pivot rod 24 mounted in an arcuate groove 28 in a radially slotted segment 25 lying in a horizontal plane and extending transversely of the frame below the forward ends of the type bars, with its concave edge facing rearwardly. The segment 25 is preferably secured at its ends to the main frame side walls 1 by means of screws 26, as shown in Fig. 17. The pivot rod 24 for the sub-levers 23 is curved in an arc of approximately 60° on a radius of approximately 8.25 inches. The forward curved edge of the segment 25 is formed with radial slots 27 converging toward the rear for positioning the sub-levers 23 so that the connecting rods 21 to the tails 20 of the type bars will extend substantially radially of the sub-lever segment 25. The groove 28 is cut in the upper face of the segment 25 and the series of slots 27 extend across the pivot rod 24, throughout the major portion of the length of said rod, which rod is held near its ends in groove 28 by means of screws 29, as shown in Figs. 17, 18 and 19. The side walls 1 are provided with apertures 30 (Figs. 1, 17 and 35) coinciding with the ends of the groove 28, so as to permit insertion and removal of the pivot wire 24 through the side walls as indicated in Fig. 17.

The bell-crank sub-levers 23 are provided with forwardly and substantially horizontally extending arms 31 which, on account of the curvature of the pivot rod and slotted edge of segment 25, fan out so as to lie over the key levers, and the ends of these horizontal lever arms are connected by means of vertical links 32 with rearwardly projecting fingers 33 formed as branches of the sheet metal key levers 34. The key levers 34 are formed with upturned forward end portions or key stems 35 supporting four banks of character keys, the keys in the different banks being designated A, B, C, D, the key levers in each bank being of uniform length and shape and the different banks of key levers varying in length and shape, the formation being indicated separately in Figs. 23 to 26.

The throw of the type bars 17 materially varies from the center bars to the side bars:— that is, the center bars have a throw of approximately 90° from their position in the type rest to the printing point, while the extreme side bars have a throw of approximately 100°. To this end, the heads of the type bars are supported on a type-rest 472—473 mounted on bracket arms 470, as hereinafter described. This arcuate rest lies in a transverse plane inclined rearward at an angle of approximately 45° from the vertical with the lowermost central point of the upper edge of rest pad 473 in a plane substantially perpendicular to the plane of the type bar pivots and passing approximately through the pivotal axis of the lowermost type bar of the type bar system, said pad being curved through an arc of approximately 96° on a radius of approximately $4\frac{1}{8}$ inches. This arrangement affords ample space for the heads of the type bars, which are bent laterally progressively greater distances from the central to the side bars (as usual); brings the pad squarely under the heads of all the type bars; supports the bars with their shanks at increasing angles to the plane of the pivot wire 14 from the central to the side bars with the shanks of the bars flaring laterally outward from each other to afford more space for the thickened type heads, and keeps all the bar heads normally below the level of the platen 301. In order to accommodate the varying throw of the type bars 17 the arms 22 and 31 of the associated sub-levers 23 are varied in proportion to the length of the respective banks of key levers, as well as according to the throw of the different type bars. These variations in the lengths and arrangement of the arms 22 and 31 of the sub-levers are graphically indicated in Figs. 23 to 26. Both arms of each sub-lever lie in the same vertical plane.

The length of the fingers 33 of the respective key levers varies with the different banks of keys, so that the distance from the key-lever fulcrum of the connections of the links 32 varies with the length of key levers for the respective banks of keys. This variation is indicated in Fig. 17 and Figs. 23 to 26. The front ends of the key levers vary in shape according to the bank of keys. The front end of each key lever for the upper or rear bank of keys A, as will be seen in Fig. 23, is looped backward at 36 and provided with a flattened portion at 37, adapted to co-operate with a cushion stop pad 38 formed of cork and serving as a key lever rest against which all the key levers are held when in normal inactive position. The pad 38 is preferably cemented on the under side of a horizontal step 39 on the key lever guide comb 40. Comb 40 is provided with bent-over lugs 41 at its ends which are adapted to lie against the inner faces of the side walls 1 of the main frame, just in front of the off-set bands 5 thereof, as shown in Fig. 13, said lugs being held to walls 1 by suitable screws 42 which pass through the side walls and enter threaded holes 43 in the lugs. The forward or main body portion of the comb 40 depends vertically from the forward edge of step 39 and is provided with a plurality of vertical guide slots 44 for guiding the key levers, substantially as shown in Fig. 32. It will be noticed that the stems 35 of the upper or rear bank of keys A do not extend upward in front of the main vertical portion of the comb 40 but, on account of the reverse loops 36 (which extend through certain of the guide slots 44 in the comb 40), said stems extend upward back of the pad 38 through a rearwardly extending horizontal shelf portion 45 of the guide comb member which (as indicated in Fig. 32) is provided with a series of fore-and-aft extending guide slots 46 for the key stems 35 of the bank of keys A. The forward edge of shelf 45 is connected with the rear edge of pad step 39 by an integral vertical wall portion.

The key stems for the next or B bank of keys project upward immediately in front of the main slotted vertical position of the comb 40 and, therefore, in front of the pad or rest 38, and the key stems of this bank are provided with rearwardly extending ears or lugs 47 for co-operation with the pad 38 for limiting the return position of the respective keys, as shown in Fig. 24. The stems supporting the third bank of keys C stand still farther forward from the vertical portion of the guide comb 40 and the key levers for this bank of keys are provided with vertically off-set portions 48 forming a shoulder adapted to co-operate with the pad 38 and thereby position the C bank of keys, as will be seen in Fig. 25. The stems of the lowest or D bank of keys are located still farther forward and the key levers for this bank of keys are provided with upwardly projecting lugs 49 for co-operation with the pad 38, as shown in Fig. 26.

The main portions of the key levers 34 all extend substantially horizontally rearward under the sub-lever segment 25 and the transverse partition wall 4, as will be seen in Fig. 2, and then upward and rearward behind wall 4 at an angle of 30° to the vertical or substantially parallel to the transverse partition wall 4. The rear upper ends of all of the key levers are pivotally supported on a transverse pivot or fulcrum rod 51 supported in punched-out loops 52 on the under side of the rearwardly bent upper portion 53 of a sheet metal fulcrum supporting plate 54, the main flat body portion of which is secured to the rear face of the transverse partition wall 4, as shown in Figs. 2, 14, 15 and 31, by screws 55 which pass through the partition wall 4 and are threaded into the plate 54. Preferably the central screw 10, passing through the lug 12 of the type pivot segment 9, is utilized as one of the fastening screws for holding the fulcrum plate 54, as shown in Figs. 15 and 31. The central portion of the fulcrum plate 54 is widened at 56, and screws 57 passing through this widened portion of the plate from the rear side into the partition wall 4 co-operate with screw 10 to hold this portion of the plate rigidly against the partition wall. The rearwardly projecting edge 53 of the fulcrum plate is provided with a plurality of fore-and-aft extending slots 58 adapted to receive the extreme upper ends of the key lever arms 50 to thereby space the key levers on the fulcrum rod 51, as indicated in Figs. 31 and 32. Preferably the frame side walls 1 are provided with apertures 51ª opposite the ends of fulcrum rod 51 so that the rod may be inserted or removed therethrough.

The key levers 34 are provided with depending ears 59 adjacent the rear ends of the main horizontal portions of the levers, which ears are perforated and connected by means of springs 60 with a sheet metal anchor bar 61 which is provided with a corresponding plurality of perforations at 62 for receiving the forward ends of the respective springs, as shown in Figs. 2, 29 and 32. An important feature of this improvement is that the springs 60 are all of the same normal length and tension before being connected up in the machine and the ears 59 are located at slightly different distances fore and aft in the horizontal plane, according to the lengths of the key levers for the different banks of keys, so that when assembled in the machine the springs 60 for the different banks of key levers supporting key banks A to D are stretched progressively greater extents so that the springs under greatest tension are connected to the longest bank of key levers. This arrangement is more particularly indicated in Fig. 2 and Figs. 23 to 26. Bar 61 is held in slots 147 in bracket arms 124 by the tension of springs 60.

Universal bar mechanism for operating the escapement mechanism of the machine is mounted on the main frame and will be now described. The widened portion 56 of fulcrum plate 54 extends to the lower edge of the partition wall 4, as indicated in Fig. 31, and is provided with integral rearwardly and downwardly extending arms 63 in which a rock shaft 64 is rotatably supported on pivot screws 65 which are held in adjusted position by lock nuts 66. The rock shaft 64 is provided with upwardly and rearwardly extending rock arms 67 brazed, or otherwise rigidly secured, to the shaft. The upper ends of the rock arms 67, as will be seen in Figs 2 and 29, are pivotally secured to the side bars 68 of a vibratory universal-bar-supporting frame by screws 69. This frame is substantially H-shaped in plan, the side bars thereof extending fore and aft of the machine and being connected by a cross bar 70. The forward ends of the side bars 68 are provided with ears 71 which are rigidly secured by means of screws 72 to an arcuate-shaped escapement-operating universal bar 73 located and vibrating wholly within an arcuate groove or channel 9ª in the back face of the type bar pivot segment 9. The universal bar 73 is adapted for operation directly by the type bars 17 which are provided with teat-like lugs 74 on their leading edges, slightly forward of their pivots, the lug on each bar being arranged to engage the forward edge of the universal bar when the head of the bar is brought substantially to the highest point in its throw, i. e. in the vertical transverse plane of its pivot.

The frame arms 68 forward of cross-bar 70 extend through apertures 75 in the transverse partition wall 4 and through apertures 76, registering therewith, in the fulcrum plate 54. The frame side bars 68 extend downward and rearward from universal bar 73 and the rear ends thereof are pivotally connected by screws 77 with the upper ends of a pair of upwardly and rearwardly extending links 78, which are pivotally supported at their lower ends by screws 79 on bracket arms 80 integral with and extending forwardly from a bracket 81 secured to the front face of rear wall 3 of the main frame by means of screws 82 which pass through the wall and are threaded into holes 83 in the bracket. Screws 69 and 77 are disposed in the same horizontal plane, and screws 79 are disposed in the same horizontal plane as rock shaft 64 so that the universal bar will vibrate in a path substantially perpendicular to the plane of the type bar pivot wire between the front wall of recess 9ª and the front face of wall 4. The side bar 68 of the universal bar frame on the right side of the machine is provided with a laterally projecting finger 84 carrying a rubber cushion plug 85 having a reduced central portion engaged in a keyhole slot 86 in the finger. The rear end of plug 85 is adapted to engage rear wall 3 of the main frame upon backward over-travel of the universal bar rock frame, but is normally slightly spaced from wall 3, substantially as indicated in Fig. 28 of the drawings, when a character key is fully depressed and a type bar is in printing contact with the platen.

The universal bar frame 68—70 is adapted to operate the carriage escapement mechanism which is mounted upon and shiftable with the platen carriage shift frame. The universal bar frame cross bar 70 is provided with an integral, flat, depending tappet 87 extending in a plane at right angles to the direction of vibration of the universal bar frame and parallel with the plane of shift of the platen carriage, as hereinafter described. A spring 88 extending forward from an ear 89 on the rear end of the left side bar of frame 68 and having its forward end anchored in a hole 90 in the flange 53 on the fulcrum plate 54, as shown in Figs. 29, 31 and 32, is adapted to normally hold the universal bar 73 against the forward wall of channel 9ª in the segment 9.

The escapement operating frame 68—70 is also adapted to be operated by the wooden space bar 91 which is secured by means of screws 92 to the laterally bent forward ends 93 of a pair of rock arms 94 rigidly secured to a square shaft 95. The cylindrical ends 96 of the shaft 95 are journaled in forwardly projecting ears 97 punched out of the vertical wall of key lever guide comb 40 which leads upwardly from the horizontal comb wall 39 as shown in Figs. 2, 29 and 32. The rock shaft 95, near the middle thereof, is provided with a forwardly and downwardly extending rock arm 98 lying in front of the main vertical portion of the guide comb 40, as shown in Fig. 29, and a link 99 is pivotally connected thereto by means of a screw 100. The link 99 is of irregular shape and extends through a guide slot or notch 101 in the comb 40, rearward between two of the key levers under segment 25 and wall 4 and finally upward to a stud or screw 102 secured in the left one of the rock arms 67 which, as previously pointed out, support the escapement universal bar frame 68—70. The rear end of the link 99 is provided with slot 103 extending in the direction of movement of stud 102 and in the forward end of which said stud 102 is normally engaged, so that the type bars engaging the universal bar 73 may move the frame 68—70 rearward without rocking the space bar 91 and, likewise, the space bar 91 may be operated at any time to move the frame 68—70 independently of the type bars. The space bar link 99 is provided near its upturned rear end with a depending ear 104, to which there is connected the rear end of a spring 105 which is anchored at its forward end at 106 in the anchor bar 61, as shown in Fig. 29. The forward end of the link 99 is provided with an upwardly and then forwardly projecting lug 107 adapted to engage the rear face of the main vertical wall of comb plate 40 to thereby limit the forward movement of the link under the action of the spring 105 and determine the normal position of the space bar. The parts 93 of rock arms 94, to which the space bar 91 is secured, are bent downwardly and then outwardly horizontally below the ends of the space bar to form stops 93ª normally overlying the upper ends of the two forward rubber supporting feet 150 for the main frame (as shown in Figs. 2, 29 and 43), and adapted to engage the upper ends of said feet to thereby limit the downward movement of the space bar.

Universal bar mechanism (entirely independent of the escapement-operating universal bar mechanism) is mounted on the main frame for operating the ribbon spool driving mechanism, ribbon feed reversing mechanism and ribbon-vibrating mechanism of the machine, and will be now described. A key-lever-operated universal bar comprising a sheet metal plate 109, formed with forwardly extending end portions 114 carrying integral bar-like side arm portions 110 disposed edgewise in vertical fore-and-aft planes, is mounted for downward and upward rocking movement under the main horizontal portions of the key levers, being pivotally supported on pivot screws 112 threaded through the side walls 1 of the main frame and projecting through pivot holes 111 in the forward ends of the side arms 110 of the universal bar. The plate portion 109 of this universal bar is wide fore and aft of the machine and underlies the sub-lever segment 25. It is normally held in an upwardly and rearwardly inclined position by a return spring 113 attached at its lower end to an eye 116 in the left-hand extension 114 of said plate portion and hooked at its upper end to the inwardly projecting end of the forward left-hand fastening screw 26 for the sub-lever segment, as shown in Fig. 18. The universal bar 109—110 is braced transversely of the machine with a stay rod 117 rigidly secured to the side arms 110 and to the extensions 114, as shown in Fig. 29, by welding, brazing or otherwise. The side arms 110 are provided with inwardly extending lugs 120 at their forward ends, the lug 120 on the left-hand arm being formed with a rearwardly extending finger 118 covered with a piece of rubber tubing 119 and normally engaging the under side of the sub-lever segment 25, as shown in Fig. 67.

The inwardly projecting lugs 120, bent over from the upper edges of the universal bar side arms 110, engage over the forward ends of the fore-and-aft extending supporting arms 121 of a sheet metal rocking frame. This rocking frame or actuator is located forward of the plane of main frame wall 4 and rocks on pivot screws 123 threaded through screw-threaded holes 125 in bracket arms 124 which extend forwardly under wall 4 adjacent opposite sides of the machine, the inner journal ends of said pivot screws engaging in bearing holes 122 in the rear ends of arms 121. Frame arms 121 are connected together by a transversely extending bar 126 formed integrally therewith, and are formed with rounded upturned ends engaging under lugs 120 on the universal bar and with upwardly projecting ears 128 forward of their pivots, from which ears springs 129 extend rearwardly to holes 130 in the bracket arms 124, as indicated in Figs. 2, 15 and 29. The bar 126 is provided with integral upwardly and rearwardly extending arms 131 which vibrate fore and aft of the machine and are adapted to operate the ribbon feeding mechanism and automatic reverse therefor, and also the ribbon vibrating mechanism, as hereinafter described.

The springs 129 are adapted to restore the bail to normal position and hold the forward ends 127 of the side arms 121 in engagement with the under sides of the overhanging lugs 120, so that at each operation of the key levers, when the universal bar 109—110 will be depressed or moved downward, the rocking frame will be rocked by the engagement of the lugs 120 with the arms 121. The key levers are provided with fingers 108 extending rearwardly and downwardly from their lower edges with their rear ends overlying and normally spaced uniformly slightly above the wide transverse plate portion 109 of universal bar 109—110. The rear ends of fingers 108 are arranged in four transverse rows, those connected with key levers supporting keys in bank A being nearest the rear edge of the universal bar and those connected with key levers supporting keys in banks B, C and D being arranged in rows progressively nearer the fulcrum axis of the universal bar to afford uniform depression of the universal bar by key levers of different key banks, as shown in Figs. 2 and 23 to 26.

Figure 1:
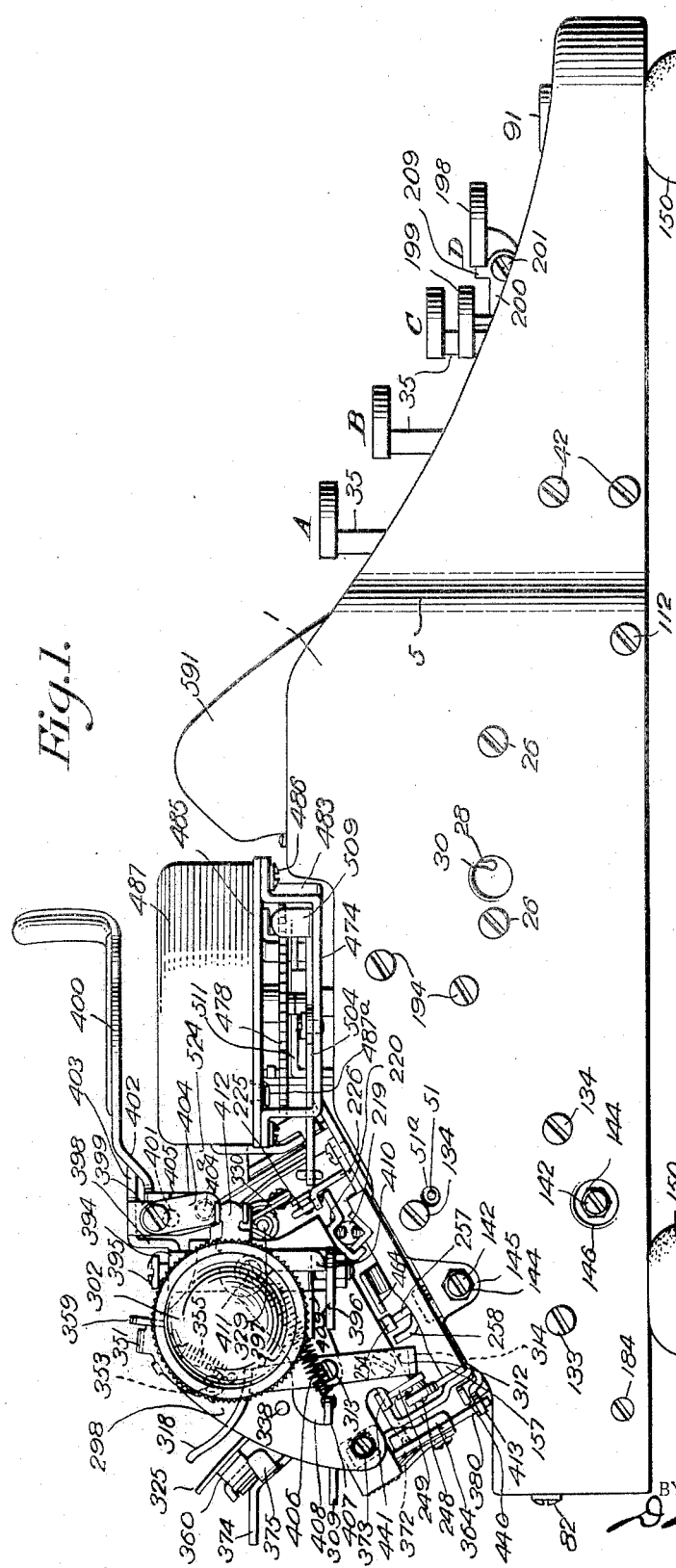

The platen 301 is supported for impact of the type on the upper front quarter thereof and for case-shift movement in a plane parallel with the plane of the type bar pivot wire 14 and wall 4, so that the printing point shifts in changing case in a plane inclined rearward at 30° to the vertical. The shift frame for the platen carriage and the means for guiding and shifting said frame will now be described. On each of the side walls 1, just back of the partition wall 4, sheet metal brackets 132 are secured to the respective side walls by means of screws 133 and 134 which pass through the side walls 1 and are adapted to enter suitable holes at 135 and 136 in the brackets (Fig. 11), 136 designating two holes in a line parallel to the plane of the partition wall 4. The screws 133 are threaded directly into the bodies of the brackets 132 (holes 135 being screw-threaded) while the screws 134, after passing through the non-threaded holes 136, are threaded into screw-threaded holes 137 in sheet metal plates 138 which are provided with V-shaped grooves or ball races 139 lying at an angle of 30° to the vertical, i. e. parallel with wall 4. The metal plates 138 are preferably cut away at 140 so as to leave resilient arms 141 supporting the V-shaped ball races 139 in a manner to permit a certain amount of spring for transverse adjustment thereof. In order to effect this adjustment screws 142, threaded through holes 143 in the brackets 132 as will be seen in Figs. 8, 11 and 12, engage the crowns of the V-shaped ball races so that the latter may be adjusted to obtain parallelism of the shift ball races and proper adjustment of the pressure on the ball bearings hereinafter described. The screws 142 are adapted to be held in adjusted position by suitable lock nuts 144. The screws 142 and lock nuts 144 for adjusting the positions of the ball race-ways 139 are adapted to project through apertures 145 and 146 in the side walls 1, as shown in Figs. 1 and 8, thereby permitting access for these adjustments from the outside of the machine.

The brackets 132 are preferably provided with the forwardly projecting arms 124 which, as previously pointed out, extend forward under the transverse partition wall 4, and are provided with the threaded holes 125 for the pivot screws of the ribbon-operating rock frame, and with the open saw cuts or slots 147 in which the transversely extending anchor bar 61 is held by the tension of the return springs 60 for the key levers. The brackets 132 are also provided with inwardly projecting lugs 148 disposed in a horizontal plane level with flange 6 and the lower edge of the main frame (see Figs. 13 and 14), which lugs are provided with key-hole slots 149 adapted to receive the reduced neck portions of the rear rubber supporting feet 150 for the main frame as shown in Figs. 2 and 34. The brackets 132 are further provided with inwardly bent ears or lugs 151 which lie in a plane at right angles to the plane of shift of the platen and are provided with stop screws 152 held in adjusted position by suitable lock nuts 153, as shown in Figs. 8 and 11. The stop screws 152 co-operate with rearwardly projecting lugs or ears 154 formed on sheet metal brackets 155, which are secured by screws 156 to the under side of the flat carriage bed 157. The brackets 155 are provided with bent-over angle pieces 158 lying in a plane perpendicular to the plane of wall 4 and having holes 159 through which the screws 156 are adapted to pass. The stop lugs 154 are preferably punched out of the metal of the brackets 155 and folded up as tongues projecting rearward in the plane of the angle pieces 158, as shown in Fig. 11. An additional screw hole 160 is provided in the tongue 154, through which a screw 161 passes into the carriage bed 157 for more rigidly holding the angle pieces 158 against the under side of the shiftable carriage bed.

The brackets 155 are secured to the under side of the carriage bed 157 at opposite ends thereof and are held in spaced parallel relation by a tie rod 162, the right end of which is secured in an ear 163 on the right bracket 155 by means of a screw 164 (see Fig. 10) entering a threaded bore in the end of the rod. The opposite end of the tie rod 162 is provided with a similar threaded bore 165 in which a screw 166 is threaded after passing through a similar ear 163 on the left bracket 155. as seen in Figs. 8, 9 and 12. In order to obtain a suitable adjustment of the length of the tie rod 162 the left end thereof is threaded on the outside and provided with an adjustable nut 167 adapted to engage the inner face of the ear 163 when the rod is clamped in position by means of the screw 166. A suitable lock nut or collar 168 is provided for holding the nut 167 in adjusted position.

The shift frame brackets 155 are provided with integral forwardly projecting angle pieces 169 lying in vertical fore-and-aft planes. The upper edges 170 of the angle portions 169 are brazed or welded to the outer edges of the angular portions 158 of the brackets to thereby form a rigid square corner. The angular portions 169 are preferably provided with two elongated apertures 171 extending in a plane at an angle of 30° to the vertical, i. e. parallel with wall 4 and type-bar pivot wire 14, the long edges of the slots being turned over or beveled to form race-ways for the balls 172 mounted in the apertures 171 and rolling in the V-grooves 139 of the race members, previously referred to as adjustably mounted on the side walls 1 of the main frame. In this manner a ball bearing support is provided for the platen shift frame, which permits shifting of the platen 301 and its traveling carriage in a plane at an angle of 30° to the vertical and parallel with the plane of type-bar pivot wire 14, and at the same time provides for suitable adjustment of the ball bearings. The stop lugs 151 carrying the adjustable stop screws 152, previously referred to as adapted to engage the tongues or ears 154, are adapted to limit the downward movement of the shift frame or determine the normal lower-case position of the platen. The upper-case-shifting movement of the platen and shift frame is limited by stop screws 173 which are adjustably secured by lock nuts 174 in removable metal strips 175 secured by means of screws 176 to the under side of tongue pieces 177 punched out of and bent forward from the brackets 155, as will be seen in Figs. 11 and 12. The stop screws 173 are adapted to engage the under sides of rearwardly projecting ears or lugs 178 extending from the lower edge of inwardly projecting arms 179 formed as part of the wall brackets 132, as will be seen in Figs. 11 and 12. It will be noted that the plane of the arms 179 is parallel to the direction of case shift, while the stop lugs 178 thereon are at right angles to the direction of shift and, therefore, adapted to co-operate with the ends of the stop screws 173, as shown in Fig. 8. Arms 179 extend through the openings 140 in race members 138 in front of angle portions 169 of the shift frame brackets, as shown in Fig. 6.

Means are provided for partly counterbalancing the weight of the shift frame and parts thereon, and for shifting said frame by keys without torsion. A rock shaft 180 is provided with forwardly projecting rock arms 181 carrying laterally projecting pins or studs 182 engaged in open slots 183 in the angle portions 169 of the shift frame brackets 155, as will be seen in Figs. 5 and 8 of the drawings. The rock arms 181 are rigidly secured to the rock shaft 180 so that the rock shaft and arms form a shift torsion frame for exerting equal upward thrust on the brackets 155, thereby avoiding cranking of the shift frame ball races when shifting the platen. The rock shaft 180 is journaled on pivot screws 184 threaded through the side walls 1 of the main frame and held in adjusted position by lock nuts 185, as shown in Fig. 12. For counterbalancing a portion of the weight to be shifted the rock shaft 180 is provided with a forwardly projecting central rock arm 186 to which the lower end of a balancing spring 187 is secured, the upper end of the spring being connected with a forwardly projecting ear 188 extending from the bracket 81 (Figs. 2 and 13) previously referred to as secured to the rear wall 3 of the main frame and supporting the parallel links 78 of the escapement universal bar rock frame.

The platen carriage and shift frame are adapted to be shifted from normal lower-case position—that is, when the shift frame is resting on the stop screws 152 as shown in Fig. 2—to the upper-case position, when the stop screws 173 engage the lugs 178, as shown in Fig. 6, by means of shift key levers 189 and 190 which are pivotally mounted on screws 191 secured in ears 192 projecting downward from inwardly overhanging upper portions of brackets 193, which are secured to the side walls 1 by suitable screws 194 as more particularly seen in Fig. 13. It will be noted that the brackets 193 are located near the upper edges of the high central portions of side walls 1 of the main frame forward of wall 4, and the rear arms 195 of the shift key levers 189 and 190 extend rearwardly and downwardly through apertures 196 in the transverse partition wall 4, as shown in Figs. 12 and 16. The extreme rear ends of the arms 195 of the shift key levers are slotted or forked at 197 to engage the laterally projecting studs 182 on the rock arms 181, so that power may be applied to the shift frame for shifting the platen through the torsion frame formed by shaft 180 and arms 181 carrying studs 182, by depressing one or the other of the shift keys 198 on the forward ends of the shift key levers 189 and 190.

It is customary to provide for holding the case shift frame in upper-case position when desired and, in the present instance, this is accomplished by providing a shift lock key 199 on a short lever arm 200 pivotally mounted at 201 on the left shift key lever 190 just under the key 198, as will be seen in Figs. 5 and 7. The shift lock key 199 is mounted on the rear end of the lever arm 200 by means of a stem 202 formed integral with and bent out at right angles to the lever arm 200 and provided at its lower end with a forwardly projecting latch lug 203 adapted to co-operate with the lower edge of a guide and locking plate 204 bent upward on the rear end of a horizontally disposed bracket 205 secured by screws 206 to the left under side of the flange 6 extending from the lower side of the front wall 2, as shown in Fig. 7. A spring 207, connected with the lower end of the key stem 202 and to a punched-out eye 208 on the key lever 190, is adapted to maintain the shift lock key 199 in normal horizontal position, or restore it to normal when released by pressing down on the key 198 when the parts are in locking position shown in Fig. 7. As shown in Fig. 5 a stop lug 209, adapted to engage the key 198, is provided for limiting the return movement of the key 199 under the action of the spring 207.

The forward ends of the shift key levers 189 and 190 extend through comb slots 210 in the key lever guide comb 40 (see Figs. 4 and 32), the shift keys being located respectively at each side of the keyboard proper. In order to limit the downward movement under excessive pressure of the forward ends of the shift key levers 189—190, the lower ends of the guide slots 210 are preferably blocked by inwardly projecting tongues 211 formed as part of sheet metal pieces 212 secured to the front face of the comb over the respective slots 210 by screws 213, as will be seen in Fig. 4, the screws entering threaded holes 214, shown in Figs. 7 and 32. In normal operations the shift levers are arrested as shown in dotted lines in Fig. 3, out of contact with stops 21 by engagement of the upper-case shift frame stops. The carriage bed plate 157, which forms part of the shift frame and carries the brackets 155 as hereinbefore described, is preferably provided with apertures 215 and 216, as shown in Figs. 38 and 61, registering with the upper ends of the V-shaped race-ways 139 as more particularly shown in Fig. 8, where it will be seen that the upper ends of the race-ways project into the apertures when the shift frame is in the normal lower-case position. The case-shift mechanism per se forms the subject-matter of an application for patent filed by us May 9, 1925, and serially numbered 29,125.

The means for guiding and retaining the carriage on the bed will now be described. Near the forward edge of the carriage bed 157 the upper surface thereof is provided with a substantially V-shaped groove extending longitudinally of the carriage bed, in which there is mounted a V-shaped sheet metal track 217 which is secured in place by suitable screws 218 (Figs. 36 and 43). The side walls of the V-shaped sheet metal track strip 217, as will be seen in Fig. 2, lie at equal angles to a vertical plane and diverge upwardly from the carriage bed 157 to form a ball race for the balls 219, co-operating with the ball race 220 secured to the front under edge of the base plate 221 of the platen carriage by means of screws 222, as will be seen in Fig. 53. The side walls of race 220 (which is of inverted V shape) lie in planes at equal angles to a vertical plane, and the lower edge of the rear side wall of said race is formed with a downwardly and forwardly extending flange 223 parallel with and extending behind and close to the rear face of the rear wall of race-way 217 to thereby prevent forward movement of the carriage with respect to the carriage bed and the ball bearing. The front wall of sheet metal race-way 220 is provided at its lower edge with a forwardly projecting ledge or flat flange 224 lying in a plane parallel with the plane of the carriage bed 157, along the upper face of which a yieldably supported roller 225 is adapted to travel to yieldably clamp the balls 219 between races 217 and 220. Suitable gibs 226 and 227 are secured for slight fore and aft adjustment to the ribbon feed mechanism supporting brackets 474 (hereinafter described) and the under side of the carriage bed 157, by screws 228 and 229 (see Fig. 51) passing through fore-and-aft elongated holes in the gibs. The overhanging upper edges 230 and 231 of gibs 226 and 227, respectively, co-operate with the upper face of the ledge 224 (previously referred to as forming part of the ball race-way 220) to prevent separation of the carriage and bed at the front.

As more particularly shown in Figs. 53 to 55, the roller 225, previously referred to, is rotatably mounted upon an upwardly and rearwardly projecting ear 232 formed on the front edge of the upper arm of a U-shaped spring 233 extending transversely of the machine, the lower arm of said spring being secured by screws 234 to a portion of a sheet metal bracket 235 lying in a plane at right angles to the direction of shift of the carriage bed and being provided with upwardly and rearwardly bent ears 236. The ears 236 of the bracket 235 are secured by means of screws 237 to upwardly projecting ears 238 formed integrally with a bracket plate 239 secured to the under side of the carriage bed 157 by means of screws 240 passing through transversely elongated holes 241 formed in the plate 239, as shown in Figs. 51, 53 and 55. The elongated holes 241 provide for adjustment of the bracket 239 and the parts held thereto transversely of the machine.

A sheet metal track bar 246 is held against the rear edge of carriage bed 157 by screws 247 (see Figs. 51 and 67), the upper edge of said bar forming a track for a roller 248 for supporting the platen carriage at the rear. The roller 248 is carried upon a stud 248$^a$ secured to a sheet metal strip 249 mounted upon and secured to the rear edge of the base 221 of the platen carriage by screws 250. The journal stud 248$^a$ extends fore and aft perpendicular to the plane of shift of the carriage. A gib 251, secured by screws 252 to the under side of the carriage bed 157, is provided with an overhang 253 having end portions 443 adapted to co-operate with the upper edge of the strip 249 carried by the platen carriage, for preventing separation of the carriage and bed at the rear and maintaining the roller 248 in rolling contact with the upper edge of the track strip 246, as will be seen in Figs. 2 and 51.

The bracket 239 is located centrally of the carriage bed below the printing point, and mounted thereon is a member 242 forming a combined paper-guiding and printing-line and printing-point indicating device, having an ovate frame portion extending up in front of the platen, through which the type bars are adapted to strike. The side walls of said frame portion are formed with lateral wings 243 provided with letter-space scale graduations, and the upper edges of said wings are arranged to locate the printing line on the platen. At its lower end member 242 is provided with forwardly off-set, laterally extending lugs 244 with slots 245 adapted to co-operate with the bodies of the screws 237, as indicated in Fig. 55, the lugs 244 being adapted to be inserted between the ears 238 of the bracket 239 and ears 236 of the bracket 235, so that when the screws 237 are set up tight the paper guide finger 242 will be clamped in properly vertically adjusted position as shown in Figs. 53 and 54. The elongated slots 241, through which the screws 240 pass, permit a limited lateral adjustment of the member 242 to properly position the same transversely of the machine. The ovate frame portion of member 242 curves rearward around the upper front part of the platen close to the platen, to guide the work, and the apex of said ovate portion is arranged to indicate the fore and aft vertical plane of the printing point.

The escapement mechanism (which will be now described) shifts with the platen carriage and carriage bed relatively to its actuating universal bar frame which is mounted on the main frame, as heretofore described. The under side of the carriage base plate 221 is provided with a longitudinal rectangular groove 254$^a$ in which the feed rack 254 is secured by screws 255 passing through the base plate into the upper edge of the rack, as indicated in Fig. 51. The feed rack 254 is provided with the usual ratchet teeth 256 as shown in Figs. 37 and 50, with which escapement dogs 257 and 258 are adapted to co-operate for feeding the platen carriage from right to left. A dog rocker 259, stamped out of sheet metal, is formed with the fixed or holding dog 258 integral therewith and bent up at right angles to the plane of the main transverse body portion of the dog rocker, as seen in Fig. 45, and also formed with depending pivot ears 286. The sheet metal stepping or loose dog 257 is pivotally supported upon the fixed dog 258 in front of the fixed dog, by means of a screw 260 extending transversely of the rack. The dogs 257 and 258 extend upward through an aperture 261 in the carriage bed 157, and the dog rocker 259 is pivotally mounted on the inner reduced ends of pivot screws 262 extending transversely of the machine and threaded through depending ears 263 and 264 of a bracket 265 which is formed of sheet metal and has its flat body portion secured by screws 266 to the under side of the carriage bed 157. The bracket 265 is provided with an aperture 267, registering with the aperture 261, through which the dogs 257 and 258 project into position to co-operate with the feed rack 254. The dog rocker pivot screws 262 are adapted to be held in adjusted position by lock nuts 268, as shown in Fig. 50. The loose dog 257 is normally engaged with the rack and is provided with a lateral arm 269 projecting in the direction of feed of the carriage and normally engaging the upper end of an adjustable stop screw 270 threaded through the end of a leaf spring 271 and held in adjusted position by a lock nut 272, the leaf spring 271 being supported flat against the under side of the main body of dog rocker 259 by the screw 273, as shown in Figs. 46 and 49. The upper end of the stop screw 270 passes through an aperture 274 in the main body of the dog rocker 259 and engages the outer end of the arm 269, as previously stated, and forms a cushioning support for the loose dog as it brings the carriage to rest at the end of each step-by-step feed movement of the carriage.

The loose dog 257 is also provided with a downwardly extending arm 275, the lower end of which is perforated and connected by means of a spring 276 with a downwardly projecting ear 277 on the irregularly shaped arm 278 of a lever 279 pivoted on the screw 273, previously referred to as holding the leaf spring 271 on the under side of the dog rocker 259, as will be seen in Fig. 46. The spring 276 is adapted to normally hold the arm 275 of the loose dog in contact with the left-hand edge of the forwardly extending portion of arm 278 of lever 279. A spring 280, extending from an ear 281 on the arm 278 of the lever 279 to a fixed ear 282 projecting forward from the main body of the dog rocker 259, is adapted to move the upper end of loose dog 257 to the right (that is, opposite to the direction of feed of the carriage) when the dog rocker is rocked to carry said dog forward out of the rack and the fixed dog into engagement with the tooth previously engaged by the loose dog, as shown in Fig. 27. This movement of the loose dog 257 under the action of the spring 280 is limited by the engagement of arm 283 of lever 279 with a stop lug 284 depending from the rear edge of the main body of the dog rocker 259 to position the loose dog for engagement in front of the next tooth to the right on rack 254 on the return of the dog rocker. As is usual in standard typewriting machines, the platen carriage is fed from right to left, and at the end of a line or the run of the carriage the latter must be returned or pushed back to the right for the new line. In the escapement just described the auxiliary spring 276 is weaker than spring 280 and is adapted to permit the ratcheting of the rack teeth 256 over the end of the loose dog 257 when the carriage is pushed back to the right for starting the new line.

The depending ear 264 at the right-hand end of the dog rocker supporting bracket 265 is provided with an integral downwardly and forwardly projecting arm 285 having a hole in its lower end in which the lower end of a dog rocker return spring 287 is secured, the upper end of the spring being hooked over a rearwardly and downwardly extending arm 288 formed integrally with the right-hand pivot ear 286 of the dog rocker 259, as will be seen in Figs. 45 and 49. The bracket arm 285 is provided with an inwardly projecting stop lug 289 adapted to co-operate with the forward edge of a downwardly and forwardly extending rock arm 290 integral with and depending from the right-hand pivot ear 286 of the dog rocker 259 to arrest the rearward movement of the dogs 257 and 258 under the action of the spring 287 with dog 257 engaged in the rack. The effective pull of the spring 287 on the dog rocker may be varied by hooking the upper end thereof over arm 288 in one or another of the notches 291 in the upper edge of said arm. Stop lug 289 is bendable fore and aft for adjustment. The lower end of the rock arm 290, which extends downward below the stop lug 289, is provided with a rounded forwardly projecting nose 292 normally disposed opposite the lower portion of the rear face of the inclined operating lug 87 carried on the typebar-actuated universal bar frame 68—70, previously described and more particularly shown in Figs. 2, 29 and 37. As previously pointed out, the inclination of the escapement operating lug or shoe 87 is the same as the plane of the case-shift movement of the shift frame upon which the dog rocker is mounted, so that shifting movement of the dog rocker arm 220 with the carriage bed when the platen moves to upper-case position will merely position the nose 292 higher up along the rear face of the lug 87, the nose 292 on arm 290 moving up in a plane parallel with the face of the lug 87, so that in both the lower and upper-case positions of the platen carriage the movement imparted to the dog rocker by the universal bar frame on the main frame will be the same, the lug or shoe moving substantially perpendicular to the plane of its rear face when universal bar 73 is actuated.

The power drive of the platen carriage from right to left under control of the escapement dogs is obtained by the usual spring drum 293, on which is secured and wound one end portion of the usual draw band 594 passing over a pulley 595 journalled in an opening 596 in the carriage bed, and attached at its other end to a screw 602 threaded upward into the carriage base plate 221 (Fig. 51). Drum 293 is rotatably mounted upon a screw 294 threaded into the under side of the carriage bed 157, as shown in Figs. 37 and 38. The usual winding ratchet wheel 295 is provided for varying the tension of the usual motor spring in the drum, and the usual anchor detent 296 is adapted to co-operate with the ratchet wheel 295, the detent 296 being pivotally secured to the under side of the carriage by a screw 297.

The platen carriage comprises the base plate 221, previously referred to, and end plates 298 and 299, the lower ends of which are secured to the ends of the carriage base plate 221 by screws 300. The shaft of the platen 301 is rotatably mounted in the carriage end plates 298 and 299 and provided with the usual finger wheels or knobs 302. The usual line-space feed ratchet wheel 303 is secured to the left end of the platen by screws 304 (see Fig. 36). A detent roller 305 is adapted to co-operate with the teeth of the ratchet wheel 303 to position the platen, the roller 305 being mounted upon a rock arm 306 pivoted at 307 to the platen carriage side plate 298. The detent roller 305 is held in resilient engagement with the teeth of ratchet wheel 303 by means of a spring 308. It is sometimes desirable to release the ratchet wheel 303 from the detent roller 305 so as to position the platen independently thereof, and for this purpose a cam lever 309, pivotally mounted on a screw 310, is provided with a cam at 311 co-operating with the upper edge of the rock arm 306 to move the roller 305 out of engagement with the ratchet wheel when the lever 309 is drawn forward, or to the left as viewed in Fig. 36.

In order to release the carriage for movement in either direction independently of the escapement dogs, a bail 312, having its side arms pivotally mounted at 313 on the carriage end plates 298 and 299, is arranged with its transverse bar 314 extending longitudinally of the carriage on the under side of the base plate 221 above the carriage bed 157 and normally lying back of the rigid escapement dog 258, as will be seen in Fig. 1. The escapement release bail bar 314 is yieldably held toward the rear against the lower edge of the guide bar 249 on the carriage base plate, by means of a spring 315 having one end secured at 316 to the guide bar 249 and the other end secured to the bail bar 314, as indicated in Figs. 2 and 34. The guide bar 249 is provided on its lower edge with a cut-out notch 317 to accommodate the spring 315. The upper ends of the release bail side arms 312 are provided with rearwardly and upwardly extending finger pieces 318 which, upon being rocked rearward and downward, are adapted to move the bail bar 314 forward; and the latter, by engagement with the fixed dog 258, is adapted to swing or move the upper ends of both escapement dogs forward out of the field of the feed rack 254, thereby freeing the carriage so that it may be moved independently of the feed dogs in either direction. Stop pins or studs 338, mounted in and extending laterally from the carriage end plates 298 and 299, are adapted to engage the rear edges of bail arms 312 above their pivots to limit the releasing movement of the bail.

As previously pointed out, this improved typewriter is a portable machine and is adapted to be transported in a carrying case in which the machine is adapted to fit closely. Furthermore, in packing the machine for transportation, it is preferable to relieve the escapement dog or dogs of any pressure from the main spring or otherwise when the machine is being carried about. Therefore a special device is provided for moving and holding the release bail 314 in releasing position,—that is, so as to hold the dogs (257—258) out of engagement with the rack 254. This device at the same time is adapted to position the platen carriage so that the machine will fit snugly into the carrying case. This special device comprises a lever 319 pivotally mounted on the right end plate 299 of the platen, on the pivot screw 313 supporting the right side arm of the release bail 312—314 (see Figs. 34 and 35). The special lever 319 is provided with an outwardly bent finger piece 320 lying back of the bail arm 312 and having at its lower end an inwardly projecting finger 321 lying parallel to the rear edge of the bail bar 314 and adapted to move endwise into and engage the inner end of a notch 322 in the right-hand end of the carriage bed 157 (see Figs. 35 and 38), when the finger piece 320 is pressed forward to move the rock bail 314 and release the feed dogs from the rack and the carriage is moved toward the left to center it over the main frame. In this manner the carriage is held by finger 321 substantially centered over the main frame, and bail 312—314 is locked in release position with the feed dogs free from the rack. The spring 323, connected with the upper arm of lever 319 and a pin 324 on carriage end plate 299, is adapted to hold the centering and locking lever 319 in the normal position shown in Fig. 35, and assists in restoring said lever to this position when the lever is released by moving the carriage toward the right. A suitable carrying case for the machine is shown and described in an application for patent filed by A. B. Ely on April 4, 1925, Serial No. 20,715, in which application are shown and claimed certain features of the machine illustrated in the present application and invented by said Ely, whereby the machine is adapted for enclosure and safe transportation in said carrying case.

A suitable paper feeding means is provided, which will be now described. Mounted upon the platen carriage and extending around the under side of the platen is a paper table and guide 325, the front edge of which is provided with downwardly extending ears 326 to which a scale plate 327 is secured by means of screws 328, as will be seen in Figs. 2, 53 and 66. The front end of the table 325 is also provided with supporting eyes forming bearings for the ends of a feed roller shaft 329 carrying the front feed roller 330, as indicated in Figs. 1 and 53. Co-operating with the paper table 325 and located just below it is a rearwardly extending yoke plate 331 having bearing loops at 332 for rotatably supporting the ends of the shaft 333 carrying the rear feed rollers 334, as shown in Figs. 2 and 34. The bearing loops 332 are provided with rearwardly projecting ears 335 connected by means of a spring 336 with eyes 337 punched rearward from table 325, as shown in Figs. 2 and 34. The table is rockably held at 597 to the carriage bed 157, and springs 336 are adapted to hold the feed rollers 330 and 334 in feeding contact with the platen 301 as shown in Fig. 2.

A bracket 339, secured to the base plate 221 by screws 340, is provided with a rearwardly projecting ear 341 in which the end 342 of a rock member 343 is pivoted, the other end of said member being provided with a forwardly and upwardly extending rock arm 344 formed with an upwardly and rearwardly extending finger piece, as will be seen in Figs. 2 and 34, and pivotally supported on the reduced inner end 345 of the right pivot screw 313 of the escapement release bail, as will be seen in Fig. 34. This forms a feed roll releasing rock member which is provided near the pivot ear 341 with an upwardly extending rock arm 346, to which a wedge 347 is pivotally secured, the point of the wedge being directed toward the front of the machine between the rear face of the paper table 325 and the rear feed roller shaft 333, as shown in Fig. 2. This arrangement is such that when the finger piece of the rock lever arm 344 is pulled forward the nose of the wedge 347 is forced between the paper table and the shaft 333 so as to wedge them apart and thereby simultaneously release both the front feed roller 330 and the rear feed rollers 334 from the platen so that the paper may be adjusted thereon. A rearwardly extending lug 348 is provided for limiting the rearward movement of the rock lever 344. A return spring 349 is connected at its forward end with lever 344 and at its rear end to a bracket or rock arm 350 mounted on the notched margin stop bar or rock shaft, as hereinafter described. The paper feeding and releasing means just described are the invention of F. H Armstrong, and are more fully shown and described in an application for patent therefor filed by him April 23, 1925, Serial No. 25,277.

An upper paper guide and graduated scale bar 351 extends longitudinally along the top of the platen, as will be seen in Figs. 2 and 34, forming a deflector and guide for the paper emerging from the central front paper guide 242. The scale bar 351 is formed as a yoke or rock bail with side arms 352 extending downward on each end of the platen carriage and pivotally mounted upon the end plates 298 and 299 by screws 353 which pass through holes in the ends of the arms 352 and are threaded into the respective carriage end plates. Laterally projecting lugs 354 extend outward from the pivot arms 352 and are connected by means of springs 355 with studs 356 (see Figs. 34 and 35) projecting laterally from the end plates 298 and 299, the arrangement being such as to hold the scale bar 351 close to the platen, as shown in Figs. 2 and 34, or away from the platen when the scale bar 351 is lifted and moved rearward sufficiently far for the springs to pass to the other side of the pivot screws 353. The bail arms 352 are provided with inwardly bent stop lugs 357 adapted to engage with the upper edges of the respective carriage end plates 298—299 for limiting the forward and downward movement of the scale bar. The lower ends of the bail arms 352 are provided with radially extending lugs 358 adapted to co-operate with the pins 356 for limiting the rearward movement of the scale 351 when the latter is shifted away from the platen. The left side arm 352 of the bail is provided with a finger piece 359 adapted to provide a ready means for shifting the bail.

The paper table 325 is preferably provided on its rear face with two brackets 360 secured thereto near the opposite ends thereof, said brackets being off-set as indicated in Figs. 2 and 35 so that their free inner ends stand away from the back face of the paper table. Each of the brackets 360 carries a paper table extension arm or supporting finger 361 formed of sheet metal and pivoted thereon by screws 362 and adapted to be moved from the position shown in Figs. 2 and 34 upward to position at right angles to the upper edge of the paper table 325 to thereby form an extension of the paper table and additional support for the paper. The brackets 360 are provided with overhanging lugs 363 adapted to form stops for limiting the movement of the respective arms or fingers 361 about the pivot screws.

The left and right margin stops 364 and 365 are slidably mounted upon a graduated margin stop bar 366 of square cross-section, which is provided with notches 367 in the front face thereof, with which perforated ears 368 of springy metal clips 369 are adapted to co-operate, the clips 369 being secured at their lower ends to the respective margin stops 364 and 365 by screws 370, as more particularly shown in Figs. 37 and 40. Flat springs 598 held between the clips and margin stops by screws 370 normally press the upper ends of the clips rearwardly. By this arrangement the position of the respective margin stops 364 and 365 along the bar may be adjusted to limit the left and right margins, and the stop positions may be determined by the scale 371 on the rear face of the stop bar, as shown in Figs. 34 and 37. The lower end of the left margin stop 364, as indicated in Fig. 40, is adapted to engage a rearwardly extending stop lug 372 formed integral with the rear carriage gib 251 and thereby limit the return movement of the carriage toward the right. The margin stop bar 366 is rockably supported on the end plates 298—299 of the platen carriage by journal screws 373 passing through and journaled in apertures in the end plates and having threaded ends screwed in sockets in the ends of the rod 366. By thus mounting the rod 366 the latter may be rocked to move the lower ends of the margin stops thereon out of the field of the co-operating stop members 372 and 413 on the carriage bed to thereby permit additional movement of the carriage in either direction. The left margin stop 364 may be thrown out of the field of the stop lug 372 (see Fig. 40) by rocking the rod 366 by pulling forward a finger piece 374 secured to the left end thereof, as indicated in Figs. 34 and 37. The finger piece 374 is provided with a forwardly bent lug 375 adapted to engage the rear side of the platen and limit the forward movement of the finger piece. If the left margin stop 364 is released by thus rocking the scale bar 366, and the carriage is moved farther to the right beyond the stop lug 372, the margin stop 364 will simply ride over the right-hand cam face of the stop lug 372 and not interfere with the movement of the carriage when the carriage is again fed from right to left. The right end of the margin stop bar 366 is provided with a sheet metal stop arm 350 (previously referred to) provided with a stop finger 376 (Figs. 35 and 37) adapted to engage the guide bar 249 extending along the rear edge of the carriage base plate 221; thereby limiting the forward movement of the lower ends of the margin stops 364 and 365 under the action of the spring 349. The spring 349 was previously referred to as being connected to the rock arm member 344 for releasing the paper feed rollers. The stop arm 350 is provided with an inwardly projecting ear 377 to which the outer end of the spring 349 is secured, as indicated in Figs. 37 and 39. The stop arm 350 is also provided with an inwardly projecting lug 378 lying adjacent to and parallel with the margin stop bar 366 for limiting the longitudinal movement toward the right of the right margin stop 365 to prevent interference of the margin stop with stop lug 374 on the paper-feed cast-off rocker 343. The margin stop bar 366 is provided with a notch at 379 into which the outer edge of the lug 341 loosely enters, so that the latter will take the end thrust on the stop bar 366 and also serve as a means for limiting the movement of the margin stops 364 and 365 toward the center of the platen carriage. As shown in Fig. 34 the rear face of the scale bar 366 is provided with a separate set of graduations 371 for each of the margin stops 364 and 365.

The right margin stop 365 is provided at its lower end with a stop nose 380 having a straight edge on the left edge thereof to serve as a stop for limiting the feed movement of the carriage toward the left and also to engage the rearwardly projecting lug 381 on the upper end of a bell clapper or hammer 382 mounted on a spring stem 383 secured by a screw 384 to the rearwardly off-set end of a bracket arm 385, as shown in Figs. 34, 34ª and 37. The bracket 385 is punched out of sheet metal and is provided with a laterally extending arm 386 having a forwardly bent lug 387 which enters a hole 388 in the right shift frame bracket 155, as will be seen in Figs. 5, 8 and 34. The bracket 385—386 is secured to the right-hand shift frame bracket 155 by means of a screw 389 passing through the stem 390 of the bell 391 and screwed into a threaded hole 392 in the right shift frame bracket 155 to thereby hold the bell 391 and the bell hammer bracket 385 in proper relation by means of a single screw and the lug 387. The lug 381 of the bell hammer 382 normally lies in the path of the nose 380 of the right margin stop 365, so that at a predetermined point before the margin stop reaches the line lock stop lug 413 the bell hammer will be moved and released to strike the bell. The right-hand edge of the nose 380 of the right margin stop 365 is beveled, as will be seen in Fig. 37, so that upon the return movement of the carriage said nose may pass the bell hammer lug without interfering with the return movement of the carriage.

The depending nose 380 of the right margin stop 365 is adapted, as the carriage feeds from right to left during the writing operation, to engage a stop lug 413 on the rear end of an irregularly-shaped line lock lever 414 (see Figs. 38 and 45 to 48) pivotally mounted on a screw 415 passing through the dog rocker supporting bracket 265 and screwed into carriage bed 157. The rear or laterally swinging end of the line lock lever 414 is provided with a downwardly extending lug 416 normally off-set to the right of dog rocker arm 288, and which is adapted to be moved over the arm 288 (as shown in Figs. 47 and 48) to prevent upward movement of said arm thereby to prevent actuation of the dog rocker and universal bar 73 by the type bars. In other words, the key action will be locked so that the type bars cannot reach the platen, and the escapement will be locked against operation. Normally the line lock pawl 414 is held in retracted position,—that is, so as not to block operation of the escapement—by means of a spring 417 which, as will be seen in Fig. 42, is connected at 418 to the depending lug 416 and secured at its forward end to ear 264 of the dog rocker bracket 265. In order to limit the retracted position of the lever 414 the latter is provided with a rearwardly projecting finger 419 adapted to engage the head 420 of one of the screws 252 previously referred to as adapted to secure the large gib 251 to the under side of the carriage bed, as shown in Figs. 38 and 45. Lever 414 is guided between a lug 600 on the main body of bracket 265 and a guide lug 599 on the bracket ear 264. The spring 417 will normally hold the depending lug 416 out of the field of the arm 288 of the dog rocker, thereby permitting the usual step-by-step feed of the carriage as the type key levers are operated. When, however, the margin stop 365 reaches the predetermined end of the line after having rung the bell 391, the nose 380 thereof will engage the lug 413 and move the line lock lever 414 to the position shown in Figs. 47 and 48, thereby moving the depending lug 416 over the arm 288, blocking vibration of the latter and preventing step-by-step feed movement of the dog rocker. When this occurs it is sometimes desirable to release the line lock and permit additional feed of the carriage to the extent of a few spaces so that a word may be filled out if necessary. For this purpose a margin or line lock release key 421 is provided in the keyboard. This key, in the present instance, is carried on the forward end of a lever 422 pivoted at 423 on a screw 424 threaded into the lower end of a depending arm 425 on the bracket 193 on the right side of the machine, as will be seen in Figs. 2, 6 and 43. The forward end of the key lever 422 is provided with an extension 426 adapted to pass through the guide slot 427 in the key lever guide comb 40 (Fig. 32). The key stem 428 of the line lock release key lies in line with the stems 35 of the back row of type keys 35 and is guided in one of the slots 46 in the upper shelf-like portion 45 of the guide comb 40. The margin release key stem 428 is preferably provided with a laterally projecting bent-over lug 429 adapted to engage the upper horizontal face of the shelf 45 adjacent the slot 46 in which the key stem slides to thereby limit the amount of depression that may be given to the line lock release key.

A rearwardly projecting finger 430 located back of the pivot 424 of the line lock release key lever is connected with the upper end of a spring 431 which is secured at its lower end to anchor bar 61 and is adapted to hold the line lock release key in normal position and restore it to that position after the key has been depressed. The rear arm 432 of the release key lever back of pivot 424 extends upward and rearward substantially parallel with frame wall 4 to a point in front of and slightly higher than the lower edge of cut-out 601 at the right-hand upper edge of wall 4. The key lever arm 432 is connected by a rearwardly and downwardly extending link 433, passing through cut-out 601, with the depending lug 434 on the outer arm 438 of an inwardly extending line-lock-releasing lever 435 pivoted at 436 on a screw 437 threaded upward into the lower face of the carriage bed 157, as will be seen in Fig. 38. The lever 435 is provided with an inner arm 439 extending inwardly along the under face of the carriage bed and off-set rearwardly and upwardly at its inner end where it is provided with a nose 440 normally lying over the free end of the line lock lever 414 in position to engage the front face of the depending end or nose 380 of the right margin stop when the latter has engaged the stop lug 413 and shifted the line lock lever to locking position, as shown in Fig. 48. It will be seen that when the line lock release key 421 is depressed after the dog rocker 259 has been locked by the depending lug 416 of the line lock lever 414, the nose 380 of the right margin stop 365 will be pushed rearward back of lug 413 by the nose 440 of the lever 435, thereby permitting the spring 417 to restore the line lock lever 414 and permit the dog rocker arm 288 to be vibrated in the usual manner each time the escapement universal bar is actuated for the step-by-step feed of the carriage, lug 413 passing in front of nose 380 when key 421 is depressed. It will be noted that the left edge of the stop lug 413 on the line lock lever is beveled (see Fig. 48) so that after the line lock release key has been operated to release the lug 413 from the margin stop nose 380, the latter, when the carriage is returned toward the right, will be cammed rearward by the beveled face of the stop lug 413 so that the platen carriage may be restored without interference from the margin stop or line lock lever. Link 433 swings up and down during case shift movements, about its pivoted connection with key lever arm 432.

In returning the platen carriage to the right for starting a new line the left margin stop 364, as previously explained, is adapted to engage the lug 372 on the gib 251 and thereby determine the left margin on the paper. If, however, it is desired to write within the left margin, the margin stop 364 is thrown out of the field of the lug 372 by manual operation of the finger piece 374 to rock the margin stop bar 366, thereby permitting the carriage to be moved an additional distance to the right. The final stop of the carriage in its movement to the right is adapted to be determined by the nose of a stop lug 441 secured by a screw 442 to the base plate 221 of the carriage near the left end plate 298 thereof, as will be seen in Figs. 37 and 41. The nose of the stop lug 441 is adapted to engage the left-hand overhanging projection 443 of the gib 251 on the carriage bed, thereby preventing further movement of the carriage toward the right.

The back-space key 444 is mounted on the front end of a key lever 445, the forward end of which is guided in a slot 446 in the key lever guide comb 40, as shown in Figs. 43 and 44. The back-space key lever 445 is pivotally mounted at 447 on the pivot screw 424, hereinbefore referred to as forming the pivot of the line lock release key lever 422. The back-space key lever is provided with a rearwardly extending finger 448 back of its pivot, with which the upper end of a spring 449 is connected, said spring being connected at its lower end with anchor bar 61 for holding the key 444 in normal position or restoring it after it has been depressed. The rear arm 450 of the back-space key lever extends from the pivot 447 upward and rearward substantially parallel with frame wall 4 to a point above and in front of cut-out 601 in said wall, lying parallel with the arm 432 of the line lock release key lever, both of which arms lie in front of the transverse partition plate 4, as will be seen in Fig. 2. The arm 450 is connected by means of a link 451, extending downward and rearward through cut-out 601, with the outwardly extending arm 452 of a bell-crank lever pivoted at 453 on a screw 454 threaded upward into the under side of the carriage bed 157, as will be seen in Fig. 43. The inner arm 455 of the bell-crank lever extends rearwardly and is provided with an upwardly projecting finger 456 passing through a transversely elongated aperture 457 in the carriage bed and engaging at its outer edge a cam face 458, merging at its rear end into a rearwardly extending lug 459 on the outer end of the back-space-dog carrier 460, as shown in Figs. 43 and 44. The sheet metal back-space-dog-carrying bar 460 extends transversely of the machine and is slidably and pivotally mounted about midway its ends upon a screw 461 passing through a longitudinal slot 462 in the lever and threaded downward into the carriage bed 157. The arrangement is such that the dog carrier 460 is adapted to slide longitudinally of the carriage bed 157 under the carriage base plate 221, and is also permitted a limited amount of pivotal movement about the screw 461.

The inner end of the back-space-dog carrier 460 is off-set upward at 463 and formed with an integral back-spacing dog 464 adapted to engage the teeth 256 of the carriage rack 254 when the back-space key is operated and the lug 456 on bell-crank 452—455 rides along the cam face 458 of the dog carrier and throws the dog 464 rearward. This is the first operation upon depressing the back-space key 444. Continued depression of the key 444 carries the bell-crank lug 456 against the lug 459 on the dog carrier and presses said lug outward, thereby moving the dog carrier endwisely toward the right which, by means of the dog 464 previously engaged with a tooth of rack 254, will move the platen carriage toward the right. The movement of the dog carrier 460 to the right is limited by a lug 465 projecting through aperture 216—457 in the bed into the path of the dog carrier lug 459, to limit the back-space movement of the carriage to one letter space. Lug 465 is formed on the right-hand ribbon-spool-supporting bracket 474, hereinafter described, fixed to the carriage bed 157. The back-space dog carrier 460 is provided with a downwardly extending ear 466 which projects through a longitudinal slot 467 in the carriage bed 157, as will be seen in Fig. 43. The ear 466 is located to the rear and at the right of the pivot screw 461 and the right-hand end of a spring 468 is connected thereto, the left-hand end of the spring being connected to an ear 469 (see Figs. 42, 44 and 46) projecting from the right-hand end of the bracket 265 supporting the escapement dog rocker. The spring 468 extends longitudinally of the slot 467 below and in rear of the pivot of the backspace-dog carrier 460, and is adapted to normally hold the dog 464 forward out of the path of the rack teeth 256. The pull of the spring 468 is also adapted to hold the backspace-dog carrier 460 as far to the left as the pivot screw 461 in the slot 462 will permit. In this position, as previously stated, the first operation of depressing the backspace key will be to throw the dog 464 rearward between two of the rack teeth against the operation of the spring 468. Link 451 swings up and down during case-shift operations.

The brackets 193, previously referred to as providing pivotal supports for the shift key levers and the line-lock-release and backspace key levers, are provided with integral forwardly, inwardly and upwardly extending arms 470 (see Figs. 2, 13, 14 and 15), to the upper inner ends of which there is secured, by means of screws 471, the arcuate sheet metal type rest segment 472 which is of channel form in cross section and carries in its upper and rearwardly facing channel a pad, such as a rubber tube 473, adapted to form a cushion stop and support for the heads of the type bars 17.

Line-spacing rotation of the platen is effected by a line-space pawl 393 which extends horizontally inward in front of the ratchet wheel 303, into position to co-operate with the teeth of the latter. The line-space pawl 393 is formed integrally with the rear yoke portion 394 of a jointed line-space lever. The yoke portion 394 of the line-space lever is pivotally and slidably supported on a vertical rod or screw 395, the lower end of which passes through an ear 396 of a bracket 397 secured to the left carriage end plate 298, as will be seen in Figs. 1 and 34. The upper end of the lever section 394 is formed with an upwardly extending arm 398 provided with a horizontal forwardly projecting extension 403 formed with downwardly extending ears 399 on its side edges, in which the rear end of the handle section 400 of the line-space lever is pivoted by means of a screw 401. The pivot end of the line-space lever section 400 is off-set upward at 402 and adapted to engage the forward end of extension 403, to thereby limit the upward movement of the lever section 400. Spring detent device 404—404ᵃ, co-operating with a downwardly extending arm 405 formed as part of the lever section 400, is adapted to hold the main body portion of lever section 400 in horizontal position, as shown in Fig. 1, or in a depressed position, which is desirable when the machine is placed in a carrying case.

A spring 406 (connected with an ear 407 extending outward from an arm 408 of the bracket 397 and also connected with the fulcrum section 394 of the line-space lever 394—400) is adapted to hold the line-space pawl 393 out of the line-space ratchet wheel 303, or restore it to the normal position as shown in Fig. 1. The return movement of the line-space lever is limited by a stop lug 409 engaging the bracket arm 408. When the line-space lever 394—400 is swung toward the right for line spacing, the pawl 393 first engages the ratchet wheel 303 and the line-space lever then slides up the screw 395, during the final movement of the lever toward the right, until arrested by engagement of section 394 with the head of screw 395. A sheet metal stop finger piece 410 is secured by a screw 411 to the side of the fulcrum section 394 of the line-space lever, so as to be movable into position to engage bracket ear 396 to limit the downward movement of the line-space lever, as shown in Fig. 1, to provide for single spacing. The stop finger 410 is provided with a forwardly extending finger piece 412 which, when pushed down, will throw the stop finger to the rear and upward and permit the line-space lever to drop down until fulcrum section 394 engages bracket ear 396, to provide double spacing. The line-spacing devices (including the ratchet wheel detent devices heretofore described) are the invention of A. B. Ely and are claimed in an application for patent filed April 30, 1925, Serial No. 26,966, and in the application for patent Serial No. 20,715, heretofore referred to, filed by said Ely, wherein said devices are more fully shown and described.

The ribbon mechanism, including means for vibrating a bichrome ribbon transversely and feeding it longitudinally and automatically reversing the direction of feed, is supported on the carriage bed and shiftable therewith, said several means being arranged for operation by the universal bar 109 through the ribbon mechanism actuator or rocking frame 121—126—131 previously described, in both case positions of the shiftable carriage bed. Right and left ribbon spool brackets 474 are secured to the under side of the carriage bed 157 near the ends thereof, by screws 475 which pass through screw holes 476 in the brackets and enter the under side of the carriage bed, as will be seen in Figs. 60, 61 and 66. As will be seen in Figs. 60 and 61, the rear end of the right bracket 474 carries the upwardly bent stop lug 465 which passes through the aperture 457 and, as previously explained, is adapted to limit the movement to the right of the back-space dog carrier 460. The brackets 474 extend upwardly and forwardly, parallel to the plane of the carriage bed, for a short distance and then forward horizontally, as will be seen in Figs. 1, 2, 43 and 67. The horizontal portions of brackets 474 closely overlie and extend on opposite sides of the inwardly offset portions of side walls 1 in rear of the transverse plane of the ends of the type rest. The horizontal portions of brackets 474 are provided with fixed upwardly extending vertical posts 477 which are adapted to rotatably support the ratchet feed wheels 478, the latter being loosely mounted on the posts and provided with hubs 479 seated on shoulders 477ª on the posts and carrying upwardly extending split tubes 480 of smaller diameter than the hubs. Tubes 480 form spring arbors upon which the barrels of the respective ribbon spools 481 are mounted. The spring action of the split tubes 480 is adapted to frictionally hold the ribbon spools in place and the barrels of the respective spools are seated on the upper ends of hubs 479 and are preferably provided with inwardly projecting teats (not shown) adapted to enter the slots 482 of the respective split tube arbors 480 and thereby assist the friction grip of the arbors to prevent independent rotation of the ribbon spools relative to the associated ratchet wheels 478. The brackets 474 are each provided with three upwardly extending lugs 483 spaced around the post 477 thereon and having their upper ends bent outwardly to form horizontal ears 484 to which disks or plates 485 are secured by means of screws 486, as will be seen in Figs. 61 and 65. The plates 485 are adapted to cover the mechanism mounted on the brackets 474 below the respective spools, and each plate is adapted to support a sheet metal ribbon spool covering cup 487, as will be seen in Figs. 65 and 67. The guard cups 487 are each provided with a slot at 488, through which the ribbon from the respective spools is adapted to pass. Cups 487 are detachably held to plates 485 by hook lugs 487ª thereon forced through suitable slots in the plates by springing the cup walls.

Ratchet driving pawls 489 loosely mounted on screws 490 threaded into downwardly bent ears 491 on the brackets 474, as will be seen in Fig. 62, are connected below their pivots by links 492 with inwardly bent arms 493 carried by the upper ends of the rock lever arms 131, previously described as adapted to be operated by the ribbon universal bar 109 (see Fig. 57). The arms 493 are formed as part of sheet metal brackets 494 secured to the upper ends of the rock arms 131 by screws 495. As is indicated in Fig. 62, the ribbon spool driving pawls 489 normally stand upright and are mounted to wobble laterally on the screws 490; and the forward beveled edges of the upper ends thereof are adapted to be held in engagement with the respective ribbon spool driving ratchet wheels 478 by springs 496 which extend outwardly from the upper arms of the pawls below the ratchet wheels to eyes 497 pushed upward from the brackets 474, as will be seen in Figs. 61 and 62. Detent pawls 498 are pivotally mounted on screws 499 threaded into ears 500 extending from the brackets 474. The detent pawls 498 are provided with upwardly bent noses 501 adapted to co-operate with the teeth of the respective ratchet wheels 478 for preventing reverse motion thereof during spool driving operation under the action of the ribbon spool driving pawls 489. The detent pawls 498 are provided with ears 502 with which springs 503 are connected at one end, the opposite ends of the springs being secured to the eyes 497 previously referred to. From this arrangement it will be seen that each time the ribbon universal bar 109 is operated the rock arms 131 will be vibrated fore and aft of the machine and will move the ribbon spool driving pawls 489 so that the upper ends thereof will move back and forth to rotate the respective ratchet wheels 478. The driving of the ratchet wheels 478 by pawls 489 takes place only on the return or rearward movement of the rock arms 131, as will be seen by the arrangement of the lever and link connections thereto just described, and any advance of the particular ratchet wheel being driven or moved forward by its associated driving pawl 489 will be maintained by the nose 501 of the associated detent pawl 498.

It will be understood that only one ribbon spool ratchet wheel 478 can or is intended to be driven at a time by its associated driving pawl 489, the driving pawl and detent pawl for the other spool being held out of operative engagement with their associated ratchet wheel so that the ribbon spool connected with the last-mentioned ratchet wheel will be free to rotate in a direction to unwind the ribbon therefrom. In order to provide means for throwing out of operation one or the other of the sets of driving and detent pawls associated with the ratchet wheels 478, right and left cam levers 504 are pivotally mounted on the brackets 474, on vertical screws 505 which are threaded into the respective brackets 474, as indicated in Fig. 61. The sheet metal, feed-reversing cam-levers 504 are provided with rearwardly extending arms 506 back of their pivots, which arms are connected together by a wire rod or link 507, so that the two cam levers are adapted to be operated simultaneously. Each cam lever 504 is provided with a forwardly and laterally projecting arm 508 provided with an upwardly extending lug 509 forming a finger piece for manually moving the cam levers horizontally from one feed-controlling position to the other. The cam levers are provided with inwardly projecting arms 510 having fore-and-aft extending heads 511 provided at their inner edges with cams at 512 and 513 adapted to co-operate, respectively, with the upper ends of the ribbon driving pawls 489 and with the detent pawl noses 501, as will be seen in Fig. 64. The cam heads 511 of the cam levers 504 are rights and lefts,—that is, both of them face inward toward the middle of the machine and are located outside of the adjacent driving and detent pawls, so that when one set of cams 512—513 is in position to hold the associated pawls 489 and 498 out of engagement with their associated ratchet wheel 478, as shown in Fig. 64, the other set of cams is shifted inside the bases of the teeth of their associated ratchet wheel to permit the adjacent pawls 489 and 498 to engage in the teeth of said wheel, as shown in Fig. 63. The reversing motion of the cam levers 504 is adapted to be limited in one direction by the engagement of the cam arms 510 with the enlarged lower end of the ribbon spool post 477, as shown in Fig. 61. The cam levers 504 are also provided with inwardly extending fingers 514 adapted to co-operate with the enlarged lower ends of posts 477 on the opposite side from the arms 510 to limit movement of the cam levers in the opposite direction, and one of these fingers 514, that is the one associated with the cam lever 504 on the right side of the machine, is provided with a double-bevel nose 515 adapted to co-operate with a V-shaped end 516 of a flat detent spring 517 secured by means of a screw 518 to a depending lug 519 on the front end of the right-hand bracket 474, as will be seen in Figs. 2 and 65. The V-shaped spring detent 516, in co-operating with the double-bevel nose 515 as indicated in Fig. 61, is therefore adapted to yieldably hold the cam levers 504 in one or the other of the ribbon-feed-controlling positions,—that is so that the driving pawls will drive one ribbon spool or the other as may be desired.

As previously indicated, the reverse of the ribbon feed may be effected manually by manipulation of the finger pieces 509, but it is desirable to also provide an automatic ribbon reverse. For this purpose it is necessary to provide means for automatically shifting the cam levers 504 which control the direction of feed of the ribbon. Each of the cam levers 504 is provided with a downwardly and inwardly extending lug or ear 520 at the rear end of its cam head 511, as will be seen in Figs. 59 and 61. Vertically disposed levers 522 are pivotally supported on the ears 520 by screws 521 to swing transversely of the machine, and the upper ends of said levers are provided with wire loops 523 through which the ribbon 524 passes. The depending arms of levers 522 are provided with forwardly off-set lower end portions 525, thus providing two vertically disposed surfaces located in planes one behind the other for co-operation with the rear edges of actuating dogs 526 formed on the front ends of arms 527 which are formed integral with and extend forward from the upper ends of the brackets 494, previously referred to as secured to the upper ends of rock arms 131, as will be seen in Figs. 57 and 59. The arms 527 and dogs 526 are located in fore and aft planes outside of the depending arms of levers 522 and are, therefore, adapted to be vibrated fore and aft of the machine each time the ribbon universal bar 109 is actuated by the type key levers, normally without either dog 526 engaging one of said levers 522. The arrangement is such that upon the return movement (toward the rear) of the dogs 526, if the depending arm of lever 522 associated with the spool from which the ribbon is unwinding is swung outward into the path of the adjacent dog 526, said lever 522 will be pushed bodily rearward, carrying the associated cam lever 504 with it and, through the connecting rod 507, moving the cam head 511 of the other cam lever 504 and the lever 522 thereon forward. In order to throw the lower arm of the lever 522, which is in advanced position and is associated with the unreeling spool, into position to be engaged by the adjacent dog 526 upon exhaustion of the ribbon 524 from the unreeling spool, the ribbon is provided near its ends with eyelets 528 adapted to engage against the wire loops 523 and rock the levers 522 on their pivots 521. Obviously only one eyelet 528 is exposed at a time, and when it operates its lever 522 the dog 526 on that side of the machine will move the associated cam lever 504 rearward and in so doing move the cams 512 and 513 thereof out of the field of the associated driving and detent pawls. Simultaneously, through the connecting rod 507, the corresponding cams 512—513 for the other ribbon spool will be moved forward into position to force and hold the driving and detent pawls of the other ratchet wheel out of engagement with the ratchet wheel.

The stepped formation of the lower arms of the ribbon-operated reverse-control levers 522 is for the purpose of providing for the engagement of the forwardly offset lower ends 525 of the lever arms by the associated reversing dogs 526 when the shift frame is in lower-case position, and for engagement of the upper portions of said depending lever arms by said dogs when the shift frame is in upper-case position, to afford equal movement of the reversing devices by the dogs in both case positions, as it will be obvious that the levers 522 will move rearward as well as upward when the platen is shifted to upper-case position. Levers 522 are provided with outwardly projecting arms 529 to which metal blocks or weights 530 (Fig. 58) are welded, for the purpose of normally holding the levers 522 substantially vertical, as shown in Fig. 65, with their depending arms out of the field of the operating dogs 526, the inner edges of the depending lever arms being normally held by the weights against rearwardly projecting stop lugs 520ª on ears 520.

The ribbon 524, in passing from one spool 481 to the other, passes through guide slots 531 and over loops 532 formed in the upper end of the sheet metal ribbon vibrator and unreeler 533 which is provided at its side edges with ears 534 folded over in front of a type guide 536 to slidably support the vibrator behind said guide 536, which guide has vertical side edges 535 co-operating with ears 534 to guide the vibrator. The type guide 536 is secured by screws 537 to the front face of the transverse partition wall 4, as indicated in Figs. 53 and 66. The screws 537 pass through transversely elongated openings 538 in rearwardly offset ears 539 at the lower end of the type guide, said ears and screws supporting the type guide 536 at an angle of 30° to the vertical in front of the platen 301. The upper part of the guide 536 is formed with an open slot 540, and is provided with upwardly and forwardly extending and outwardly beveled lugs or ears 541 at each side of the upper end of the slot, for guiding the type heads of the type bars 17 to the printing point. The lower part of the type guide 536 is provided with a vertical slot 542 in which a tongue 543 on the lower end of the ribbon vibrator 533 slides, the tongue 543 being provided with outwardly projecting lugs 544 extending over the edges of the slot 542 and sliding on the front of the guide 536. This arrangement provides for free sliding movement of the ribbon vibrator 533 on the type guide 536 in a plane parallel with the plane of shift of the platen.

The ribbon vibrator or reciprocatory guide 533 is provided with an inwardly projecting stud or headed rivet 545, the shank of which fits loosely in the forked inner end 546 of the transversely extending arm of a bell-crank ribbon vibrator lever 547. The lever 547 is pivotally supported upon a screw 548 extending perpendicular to the plane of wall 4 and threaded into the upwardly and rearwardly bent end 549 of a bracket arm 550 formed integral with a bracket 551 which is secured to the under side of the carriage bed 157 by screws 552, as shown in Figs. 61 and 66. The end 549 of bracket arm 550 is provided with a forwardly and inwardly projecting lug 553 (Figs. 66 and 70) adapted to co-operate with the depending teat-like projection 554 on the lower edge of the transverse arm of vibrator lever 547 to limit the downward movement of the vibrator. Lug 553 is bendable up and down for purposes of adjustment. The end 549 of bracket arm 550 is also provided with a downwardly projecting stop finger 555 adapted to co-operate with an ear 556 extending rearward from the depending arm 557 of the lever 547, for limiting the upward throw of the lever when the throw-control is adjusted for carrying the lower half of the ribbon over the printing point. Finger 555 is bendable transversely of the machine for purposes of adjustment.

The arm 557 of the vibrator lever 547 extends downward parallel with wall 4 and is provided with an arcuate slot 558 curving downward and outward, in which engages a stud 559 projecting forwardly and upwardly from the inwardly extending arm of a bell-crank throw-control member 560. The adjustable member 560 is pivoted at 561 on a screw 562 threaded into the upper arm of a lever 563. The lever 563 lies in a plane parallel with wall 4 and is pivotally mounted on a screw 564 threaded into an arm 565 extending downward and forward from the bracket 551, as indicated in Figs. 66 and 70. Screw 564 is perpendicular to the plane of wall 4. The other arm 566 of the bell-crank throw-control member 560 extends upward through an aperture 567 in the forwardly and upwardly bent end 568 of the lever 563. The upper end of the arm 566 is spring tempered and bent so as to normally spring forward into one or the other of two notches 569 in the bent-over lever end 568, and a finger piece 570 formed on arm 566 is adapted for springing said arm backward out of the notches 569 and moving the member 560—566 about its pivot to shift the stud or pin 559 to one end or the other of the arcuate slot 558.

The arrangement is such that when the stud 559 is in the position shown in Fig. 66 and the lever 563 is rocked, the throw of the ribbon vibrator 533 will be only such as to bring the upper half of the ribbon 524 in front of the printing point. If, however, the finger piece 570 is pushed backward and the member 560—566 moved to engage arm 566 thereof in the left-hand notch 569 in lever end 568, the stud 559 will be thrown to the upper end of the arcuate slot 558 thereby bringing the stud 559 closer to the pivot of the vibrator lever 547 and providing for a greater throw of the ribbon vibrator 533 which will bring into the path of the type the lower half of the ribbon 524. In this manner provision is made for employing a bi-chrome ribbon or for using the full width of the ribbon. When the spring lever arm 566 is placed in central position between notches 569, the stud 559 will be in position to pass through a gap 571 in the lever arm 557 at the inner edge of slot 558 without actuating the vibrator lever 547, and when so positioned the machine is adapted for writing stencils. The pressure of spring arm 566 on the projection between notches 569 will hold the control member in central position. The spring arm 566 is preferably provided with laterally projecting lugs 572 adapted to co-operate with bent-over lugs 573 and 574 on the upper end of the lever 563 to limit the movement of the stud 559 in either direction, said lugs 573 and 574 being bendable transversely of the machine for purposes of adjustment.

The lever 563 is adapted to be vibrated by means of a link 575 connected to a vertically adjustable arm member 576 secured below the pivot screw 564 to the lower arm of the lever 563 by a screw 577, the shank of which passes through a slot 578 in arm member 576 and permits sliding adjustment of the arm member 576 to vary the length of the lower arm of the two-part lever 563—576. The extreme lower end 579 of the adjustable arm member 576 passes through a transversely extending guide slot 580 in an ear 581 bent forward and upward from the lower end of the bracket arm 565, as will be seen in Figs. 66 and 70. The upper end of the adjustable arm member 576 is provided with a vertical slot 582 adapted to co-operate with the head of the pivot screw 564 to prevent relative pivotal movement between the parts of the lever 563—576. The lever 563 is also provided with an inwardly and downwardly projecting finger 583 extending below and to the right of the pivot screw 564, as will be seen in Fig. 66, and adapted to co-operate with the inner edge of the bracket arm 565 to insure uniform throw of the lever 563 at all times, said finger being bendable transversely of the machine for purposes of adjustment.

The link 575 extends outwardly from lever 563—576 and is connected at its outer end to the upwardly extending arm 584 of a bell-crank sub-lever 585 pivotally mounted on a screw 586 in ears 587 projecting inwardly from the lower end of the left bracket 193 on the main frame, as will be seen in Figs. 15, 66 and 69. The sub-lever 585 is provided with an outwardly projecting lever arm 588 connected by a downwardly and forwardly extending link 589 with the left-hand ribbon-operating frame arm 121, as will be seen in Figs. 57 and 67. The bell-crank lever arms vibrate in planes parallel with wall 4, pivot screw 586 being perpendicular to said wall. A spring 590, connected between the upper arm of lever 563 and the left ribbon spool supporting bracket 474, as will be seen in Fig. 66, is adapted to restore the lever and associated parts to the normal position, in which they are shown in Fig. 66, after each operation of the character key levers. From this arrangement it will be seen that the sub-lever 585, being pivoted in the main frame of the machine, remains in fixed position relative to the lever 563 and the associated parts, including the ribbon vibrator 533, which are shiftable with the platen carriage, as indicated by dotted lines in Fig. 66. The connecting link 575, extending transversely of the machine, is so disposed that case shifting of the platen carriage does not affect the throw of the ribbon vibrator, which will remain the same for both lower and upper-case positions, lever arm member 576 being adjusted so that the inner end of link 575 swings between points equal distances above and below the horizontal plane of the outer end of the link. It will also be evident that the ribbon unreeling action of the ribbon vibrator, hereinafter described, will be the same in upper case as in lower case, since the vibrator and spools remain in constant relation during case shifting of the platen.

The space back of the keyboard and in front of and below the type-bar rest 472, where the key-action sub-levers 23 are located, is preferably enclosed or covered by a guard and dust shield or cover plate 591, which is secured in place by screws 592 threaded into screw holes 592$^a$ in the bracket arms 470, as will be seen in Figs. 2 and 13, and also held by screws 593 threaded into screw holes 593$^a$ in the upwardly and rearwardly bent rear edge of part 45 of the key lever guide comb 40. The upper edge of the guard or cover plate 591 preferably conforms substantially to the curvature of the type-bar rest 472—473 and is arranged to expose the heads of the type bars and permit free access to the type for cleaning purposes, as shown in Fig. 2.

While it is believed that the operation of the various devices and parts will be apparent from the drawings and foregoing description, a more detailed statement of the arrangement and operation of certain parts will be now given, attention being called more particularly to Figs. 1, 2, 17, 18, 20, 23 to 28, 35 and 67 of the drawings in connection with this statement.

The upper edge of the back wall 3 is approximately level with the lowest bank of keys D and the highest parts of the side walls 1 are only slightly higher than the level of the highest bank of keys A. The partition wall 4 is located about one-fourth the fore-and-aft length of the main frame forward of the back wall, the upper edge of wall 4 being a substantial distance above the level of the upper edge of the back wall and substantially level with the bank of keys B, while the lower edge of wall 4 is a substantial distance above the level of the lower edges of the other frame walls and below the level of the bank of keys D. The sub-lever segment 25 lies about midway between the frame walls 2 and 3 slightly above the level of the lower edge of the partition wall 4 and between the key levers and the type bars in rear of the guide comb 40.

The type-bar segment 9 is secured to the central portion of the front face of wall 4 and is located below the level of the highest bank of keys A and substantially entirely down within the space above the horizontal portions of the character key levers between the upturned end portions of said levers so that the major portion of the system of type bars is within the depression in the system of key levers. The type rest is wider than the segment 9 and is so located and curved that the heads of all the type bars are below the level of the platen, the heads of the central bars being supported on the rest closely in rear of the highest bank of keys and substantially level with said bank of keys, the bars extending upward and forward from their pivots with the side bars of the system fanning slightly outward and supported at progressively increasing angles to the plane of the segment so that there is a substantial variation in the throw of the bars, the throw increasing from the center to side bars and varying from approximately 90° to approximately 100°

The platen is located entirely above the level of the ends of the segment 9 and in rear of the plane of the type-bar pivots, with the bottom of the platen substantially level with the highest bank of keys and the upper front quarter of the platen in position to be struck by the type carried by the type-bar heads. The platen and its carriage, and the shift frame and its guiding means, are located forward of the vertical plane of the back wall 3 and in rear of the plane of the type-bar pivots, the shift frame and its guiding means extending into the space between the back wall 3 and partition wall 4 in rear of the upturned rear ends of the character key levers.

The character key fulcrum rod is supported forward of the shift frame back of and near the upper edge of the partition wall 4 and approximately level with the bank of keys C, said fulcrum being so arranged and the key levers being so shaped that the keys remain substantially upright when depressed and space is afforded for depressing the system of type bars largely within the system of key levers to reduce the height of the machine. The arrangement of the key levers and type bars is such as to afford ample space above the key levers and under the type bars for the operating connections between said key levers and type bars.

The ribbon reeling, ribbon feed reversing, and ribbon vibrating means, together with the universal bar mechanism for actuating the same, are all located forward of the plane of the partition wall. The escapement mechanism and the universal bar mechanism for actuating the same are located back of the plane of the type-bar pivots and forward of the back wall 3. It will be noted that there is no interweaving and crowding together of the parts of the escapement mechanism with the ribbon mechanism or of the parts of the two universal bar mechanisms with each other, and that the parts of the two universal bar mechanisms and the devices operated thereby are of substantial construction. It will also be seen that the ribbon devices and escapement devices are arranged in a low flat machine without crowding and interweaving the same into the universal bar mechanism associated therewith in such manner as to complicate adjustment, assembly and manufacture of the parts.

The ribbon spools are supported on vertical axes at opposite sides of the system of type bars below the level of the top of the platen, and lie within the fore-and-aft vertical planes of the platen finger wheels when the carriage is centered over the rear portion of the main frame, said spools overlying the upper edges of the inwardly off-set portions of the side walls of the main frame. The ribbon guiding head 533 of the reciprocating ribbon vibrator is located to the rear of and between the ribbon spools and is guided on the type guide 536 to move in an oblique plane parallel with the plane of shift of the platen so as to carry the ribbon rearward as well as upward relatively to the spools. The plane of movement and normal position of the vibrator is such that the portion of the ribbon between the spools normally extends slightly downward from the spools to the vibrator and, when the vibrator covers the printing point, extends slightly upward to the vibrator. This arrangement affords a minimum vertical movement of the covering portion of the ribbon 524 relatively to the spools and also provides an arrangement whereby the vibrator on its upward and rearward covering movement will draw off a little of the ribbon from the free or unreeling spool on an easy draft line with minimum resistance to movement of the vibrator, minimum wear on the edges of the ribbon, and minimum liability of folding or creasing of the ribbon, the reeling spool being held by its detent pawl against unreeling movement during the printing-point-covering and ribbon-unreeling stroke of the vibrator.

Upon depression and release of a character key the machine operates as follows:

During the first slight downward movement of the key against resistance of its return spring 60, the head end of the connected type bar 17 rises about 5/8 of an inch from the type rest 473, whereupon finger 108 on the key lever comes in contact with ribbon universal bar 109. Continued downward movement of the key depresses universal bar 109 against the resistance of its return spring 113 and rocks the ribbon-actuating frame 121—126—131 against the resistance of its return springs 129 in a direction to cause the nose of the active spool-driving pawl 489 to swing rearward one tooth space relatively to the adjacent ratchet wheel 478 connected with the spool upon which the ribbon 524 is being wound by the time the type bar strikes the platen, and also to cause the ribbon vibrator actuating mechanism to move against the resistance of return spring 590 and shift the vibrator upward and rearward relatively to the spools to carry the ribbon over the printing point in advance of the impact of the type against the platen. The upward and rearward movement of the vibrator shifts the upper ribbon guiding portion thereof from its normal printing-point-uncovering position to a printing-point-covering position in which it is farther from the spools and thereby draws a little of the ribbon off the free or unreeling spool, withdrawal of ribbon from the reeling spool being prevented by the detent pawl 501 acting on the ratchet wheel connected with said reeling spool. As the head of the type bar reaches the highest point of its throw, i. e. a point in a vertical plane transversely of the machine through its pivot, the lug 74 thereon engages the forward edge of the escapement universal bar 73 and, during the remainder of the printing stroke of said type bar, which is assisted by the action of gravity, presses the universal bar 73 rearward and downward against the resistance of spring 88 and the dog rocker return spring 287, shifting the dog rocker from the position shown in Fig. 2 to the position shown in Fig. 27, whereupon the fixed dog 258 catches and holds the rack tooth 256 from which stepping dog 257 has just been freed, and dog 257 swings transversely of the machine into position to move in front of the next rack tooth to the right upon return of the dog rocker.

When pressure on the key is relieved pressure is relieved on the universal bars and dog rocker and the key moves upward, and the type bar moves back toward the rest, all under the influence of the several springs 60, 113, 590 and 129, 287 and 88 referred to, until the type bar head reaches the highest point in its throw (see Fig. 28), thus insuring prompt retraction of the type bar from the platen to said point, from which the complete return of the bar is effected by the aid of gravity and spring 60, and also partly by the aid of springs 129, 590 and 113. During movement of the type bar to the position shown in Fig. 28 the dog rocker returns to normal position, dog 257 engaging in front of the next rack tooth to the right, as above indicated, and being forced, by the advance of the carriage under the influence of the feed drum spring, toward the left until arrested by stop 270, thereby feeding the carriage one letter space from right to left.

On the return movement of rocking frame or actuator 121—126—131, the active spool driving pawl rotates the ratchet of the reeling spool one tooth space to wind the ribbon slightly thereon as the ribbon vibrator moves downward and forward. The downward and forward movement of the vibrator leaves a substantial slack in the ribbon which is only partly taken up by the one-step turn of the reeling spool so that the ribbon stands normally somewhat slack. As the unreeling spool is free the ribbon is never stretched tightly across the point of impact of the types in printing operations. The power for the ribbon take-up or reeling action of the active spool driving pawl is derived from springs 129, assisted somewhat by spring 590.

If the ribbon should happen to be exhausted from the unreeling spool by the upward and rearward movement of the vibrator, the pull of the vibrator on the ribbon draws the exposed eyelet or other usual ribbon abutment 528 against the guide loop 523 of the adjacent trip lever 522 and swings the lower end of said lever behind and slightly back of the adjacent feed reversing dog 526 as shown in Fig. 27, so that after a very slight return movement of said dog it engages the trip lever and forces it backward to operate the feed-reversing cams. The slight preliminary free backward movement of dog 526 allows time for the ribbon vibrator to drop slightly down and forward to ease a little slack into that portion of the ribbon between the vibrator and the exhausted spool, and the backward movement of the trip lever 522 by the dog (which is transverse of this leg of the ribbon) takes place as the vibrator continues down and forward to normal position and thereby progressively slackens said leg of the ribbon as it is bowed rearward by the rearward movement of lever 522 and its guide loop 523, whereby the reverse is effected substantially without resistance from the ribbon. The power for effecting the reverse of the feed is derived from springs 129, assisted somewhat by spring 590.

As heretofore stated, the type actions for keys in banks A, B, C and D are constructed to afford substantially uniform dip and touch for keys in different banks and the throw of the type bars varies approximately 10° from the center to the side bars. It has been found that where all the type bars have equal throws, intermediate link and lever connections between key levers having a common fulcrum and type bars affording uniform dip to keys in different banks produce a type action in which the touch of the center keys of a bank is somewhat heavier than the touch of the end keys in the same bank, due to the fact that the gravity pull on the center bars is greater than that on the end bars, as the bars from center to each side swing in planes progressively approaching more nearly a horizontal plane. By progressively increasing the throw of the type bars from center to side bars as above described, not only are the advantages heretofore set forth obtained but the touch of the keys in each bank is rendered substantially uniform by requiring the end keys of the banks to move their connected type bars farther with the same key movement.

It will be noted by comparing Figs. 2 and 27 that projections 127 on the side arms of the ribbon actuating rock frame move under lugs 120 on universal bar 109 progressively closer to the axis of the universal bar pivots 112 as a key is depressed, so that the motion of the rock frame is started easily and is accelerated during the down stroke of the key.

It will be observed that while in plan the machine compares in size with a standard office machine; while the various parts are of large and sturdy structure, and while the carriage, platen, type bars, ribbon spools and keyboard are of sizes commonly employed in standard office machines, the machine is low and flat so that it may be placed in a readily portable carrying case. The machine is, therefore, well adapted for office use as well as for use by persons requiring a machine which may be readily carried from place to place. While the machine is of sturdy construction it is light in weight, the machine from which the drawings have been made weighing approximately 9 pounds. The machine illustrated is adapted to fit within a small flat carrying case without folding any part except the handle section of the linespacing lever, and it will be obvious that this lever may be made rigid if desired, in which case a slightly higher carrying case would be required.

What we claim is:

1. In a typewriting machine, a main frame comprising an integral casting, provided with side walls, a front wall and a back wall all having their lower edges in the same horizontal plane, the side walls being substantially higher at their middle portions than the front and back walls and having their upper edges merging with the upper edges of the front and back walls at their ends, and a transverse partition wall located substantially one-fourth the length of the frame forward of the back wall and lying in a plane inclined rearwardly approximately 30° from the vertical with its upper edge substantially above the level of the upper edge of the back wall and its lower edge substantially above the lower edges of the front, back and side walls to afford space between said back and partition walls for guiding and counterbalancing means for an obliquely shiftable carriage bed and the fulcrum portions of printing key levers, space forward of said partition wall for type bars and a keyboard, and space under said partition wall for intermediate portions of printing key levers.

2. The typewriting machine as claimed in claim 1, in which said transverse partition wall is provided with vertically elongated apertures near each side wall to permit the passage therethrough of platen shift key levers.

3. The typewriting machine as claimed in claim 1, in which said transverse partition wall is provided with two apertures, located at each side of the center of the machine, for the passage therethrough of supporting arms for a universal bar.

4. The typewriting machine as claimed in claim 1, in which the upper edge of said transverse partition wall, near one side wall, is provided with a notch depressing the upper edge of said partition wall for the passage thereover of connections to back space and margin release keys.

5. The typewriting machine as claimed in claim 1, in which said transverse partition wall is provided with a fulcrum plate for printing key levers, detachably secured to the rear face of said partition wall and formed with supporting means for a key lever fulcrum rod adjacent the upper edge of said wall.

6. The typewriting machine as claimed in claim 1, in which a sheet metal plate, secured by screws to the rear face of said transverse partition wall, is provided with punched-out loops, through which a pivot rod extends for forming the pivotal support and fulcrum of printing key levers.

7. The typewriting machine as claimed in claim 1, in which a sheet metal plate, secured to the rear face of said transverse partition wall, has its upper edge bent rearward and provided with a plurality of elongated perforations for positioning and spacing the fulcrum ends of individual printing key levers.

8. The typewriting machine as claimed in claim 1, in which a sheet metal plate secured to the rear face of said transverse partition wall is provided with rearwardly extending and transversely spaced integral ears, forming the front pivotal support for an escapement universal bar rock frame.

9. The typewriting machine as claimed in claim 1, in which said transverse partition wall is provided with apertures through which arms of an escapement universal bar rock frame may extend, and a sheet metal plate secured to the rear face of said partition wall is provided with supporting means for a key lever fulcrum rod and also provided with apertures registering with the apertures in said wall, and punched out ears integral with said plate extending rearwardly and forming pivotal supports for said universal bar rock frame.

10. The typewriting machine as claimed in claim 1, in which a sheet metal plate secured to the rear face of said transverse partition wall and adapted to support the fulcrum rod for the key levers is provided with rearwardly extending ears forming front pivotal supports for an escapement universal bar rock frame, and a sheet metal bracket secured to the front face of the rear wall of said main frame is provided with forwardly extending ears forming rear pivotal supports for said rock frame.

11. The typewriting machine as claimed in claim 1, in which a type bar pivot segment is secured to the front face of said partition wall with its type bar pivot wire groove lying in a plane at an angle of 30° to the vertical.

12. The typewriting machine as claimed in claim 1, in which a type bar pivot segment is secured to the front face of said transverse partition wall, said segment being provided with an arcuate universal bar-receiving recess in its rear face and an arcuate type bar pivot wire receiving groove extending around said recess both parallel with the plane of said wall, said wall having apertures communicating with said recess for passage through the wall of supporting arms for a universal bar.

13. The typewriting machine as claimed in claim 1, in which the front wall of said frame is vertically narrow and reinforced with a rearwardly projecting bottom flange provided with key-hole slots, in which rubber frame-supporting feet are inserted.

14. The typewriting machine as claimed in claim 1, in which a sheet metal bracket secured centrally on the inside of the rear wall of said frame is provided with forwardly projecting and transversely spaced ears for supporting a universal bar rock frame and a forwardly projecting central anchor ear for one end of a counterbalancing spring for a platen shift frame.

15. The typewriting machine as claimed in claim 1, in which sheet metal brackets secured to the side walls of said frame near the rear wall thereof are provided with inturned horizontal ears having key-hole slots in which rubber feet are inserted, the front wall of said frame having a rearwardly extending base flange provided with key-hole slots in which rubber feet are inserted.

16. The typewriting machine as claimed in claim 1, in which the main frame side walls are off-set outwardly near their front ends so as to provide a wider space at the front of the frame for the keyboard.

17. The typewriting machine as claimed in claim 1, in which the main frame side walls are off-set outward near their front ends, and a transversely extending key lever guide comb is secured between the off-set portions of said side walls in the angle of said off-sets.

18. The typewriting machine as claimed in claim 1, in which a transversely extending key lever guide comb of stepped formation in cross section is secured to the main frame side walls forward of the partition wall and provided with vertical guide slots for all of the key-levers and horizontal guide slots for the back row of key levers.

19. The typewriting machine as claimed in claim 1, in which a transversely extending key lever guide comb, secured to the side walls of the main frame forward of the transverse partition wall is formed with a vertical comb portion having guide slots for all the key-levers, an intermediate horizontal portion extending rearwardly from said vertical portion, a second vertical portion rising from the rear edges of said intermediate horizontal portion formed with forwardly extending pivot ears for a space-bar rock frame, and a second horizontal portion extending rearward from said second vertical portion formed with guide slots for the rear bank of key levers of the machine, a key lever stop pad being secured to the under face of said intermediate horizontal portion.

20. The typewriting machine as claimed in claim 1, in which a pivot segment for the sub-levers of a type-bar action is secured to said side walls at its ends forward of the partition wall in a horizontal plane above the plane of the lower edge of the partition wall with the concave edge of the segment facing rearwardly.

21. The typewriting machine as claimed in claim 1, in which a type-bar action sub-lever pivot segment is secured to the side walls of said main frame and said side walls are provided with apertures registering with the ends of the pivot wire slot in said segment, through which the pivot wire may be inserted and removed.

22. The typewriting machine as claimed in claim 1, in which sheet metal brackets secured to the respective side walls of the main frame are provided with arms extending inwardly and upwardly to points above and in transverse alignment with the high central portions of the side walls, a type bar pivot segment being secured to the front face of the partition wall and a type-bar rest being supported at its ends on said arms above and forward of the segment.

23. The typewriting machine as claimed in claim 1, in which a pair of sheet metal brackets secured to the main frame side walls forward of the partition wall are provided with arms for supporting a type bar rest and arms for supporting pivots for right and left hand shift key levers of the machine.

24. The typewriting machine as claimed in claim 1, in which two sheet metal brackets located forward of the partition wall are secured respectively to the inner faces of the right and left side walls of the main frame, the bracket on the right wall forming the fulcrum support for a shift key lever and margin release and back space key levers, while the corresponding bracket on the left wall forms the fulcrum support for a shift key lever and for a sub-lever of the ribbon mechanism.

25. The typewriting machine as claimed in claim 1, in which a pair of oppositely disposed sheet metal brackets are secured to the main frame side walls between the rear wall and said transverse partition wall, said brackets having arms extending forwardly under said transverse partition wall for supporting an anchor bar for key lever return springs forward of and below the level of said partition wall, said brackets each having a horizontal attachment portion between said partition wall and the back wall for a frame supporting cushion foot.

26. The typewriting machine as claimed in claim 1, in which a pair of brackets secured to the side walls of the main frame between the back wall and the transverse partition wall are provided with forwardly projecting arms extending under said transverse wall, said arms having their ends slotted for holding a transversely extending bar forming the common anchor for key lever restoring springs, each of said brackets having an attachment portion for a frame supporting foot between the back wall and partition wall and portions for carrying shift frame stops located back of the partition wall.

27. The typewriting machine as claimed in claim 1, in which sheet metal brackets secured to the side walls of the main frame between the rear wall thereof and said transverse partition wall are formed respectively with three inwardly projecting portions, one of said portions on each bracket lying in the plane of the bottom edges of said side walls and being provided with a key hole slot in which one of the rear rubber feet of the machine are inserted, the other two of said portions on each bracket being arranged at different elevations for supporting upper and lower case stops for limiting the case shift movements of the platen carriage.

28. The typewriting machine as claimed in claim 1, in which sheet metal brackets are secured to the inside faces of the main frame side walls between the rear wall and said transverse partition wall, said brackets having arms for supporting shift frame stops back of the partition wall and being provided with forwardly projecting arms extending under said partition wall forming supports for a ribbon mechanism rock frame and an anchor bar for key lever return springs forward of said partition wall, each bracket having an attachment portion for a main frame supporting foot back of the partition wall.

29. In a portable typewriting machine, a low main frame having front, back and side walls, and a transverse partition wall inclined rearwardly at an angle of approximately 30° from the vertical with its lower edge above the lower edges of the other frame walls; a type bar segment held to the front face of the partition wall; a system of type bars normally extending upwardly and forwardly from the segment and pivoted therein with their pivots in an arc lying in a plane parallel with the plane of the partition wall; an arcuate rest for the free ends of the bars supported on the frame above and forward of the segment in a rearwardly inclined plane; a platen above the level of the segment and in rear of the plane of the type bar pivots on the upper front quarter of which the type on the bars are arranged to strike; a rearwardly tilted platen carriage located forward of the back wall above the space between said wall and the partition wall; a rearwardly tilted shift frame on which the carriage is mounted to travel endwise extending into the space between the back and partition walls; means located in the space between the back and partition walls for guiding the shift frame to shift in a plane parallel with the partition wall; a horizontal fulcrum member supported back of and parallel with the partition wall near the upper edge of said wall and forward of the shift frame; a system of parallel key levers pivoted at their rear ends on said member and extending downward back of the partition wall and then forward under said wall to the forward part of the main frame; a system of rearwardly converging connections between the key levers and the heels of the type bars located above the forwardly extending portions of the key levers; a shift key lever pivoted in the main frame and connected with the shift frame; a transverse bar supported in the main frame below the forwardly extending portions of the key levers; and restoring springs attached at their forward ends to said bar and at their rear ends to the key levers.

30. A typewriting machine as claimed in claim 29, in which the rest is so curved and supported in the main frame as to normally so sustain the type bar heads as to cause the bars to fan out toward the sides of the machine from their pivots, with the type faces on the bars at angles to the plane of the bar pivots varying from approximately 90° for the center bars to 100° for the side bars, and the heads of all the bars below the level of the platen.

31. In a typewriting machine, a main frame; a shiftable platen carriage support; means guiding said support to move up and down relatively to the main frame; a platen carriage mounted to travel on said support; escapement mechanism and line-locking mechanism for the carriage shiftable with the support and carriage during case-changing operations; a device operable upon a part of the escapement mechanism to back-space the carriage; a device operable upon a part of the line-locking mechanism to unlock said mechanism, said two devices being mounted on the shiftable carriage support; a back-space key lever and a line-lock release key lever; a common horizontal pivot for said two key levers extending transversely of the main frame; a connection between said back-space key lever and said back-spacing device for actuating said device in the different case positions of said shiftable support; a connection between the release key lever and said unlocking device for actuating said device in the different case positions of the shiftable support; a shift key lever connected with said shiftable support; a horizontal pivot for said shift key lever extending transversely of the main frame; and a single bracket held to the main frame and supporting the shift key lever pivot and the common pivot for the back-space key lever and line-lock release key lever.

32. A typewriting machine as claimed in claim 31, wherein the connections between the back-spacing and line-lock-release key levers and the devices actuated thereby each comprises a link connected at one end with the key lever and swinging about its connection with the lever during case-changing operations.

33. In a typewriting machine, a main frame; a shiftable platen carriage; escapement mechanism for the carriage; line-locking mechanism for the carriage; a back-spacing device; a line-lock releasing device; a key lever for shifting the carriage; a key lever for actuating the back-spacing device; a key lever for actuating the releasing device; and a bracket held to the main frame upon which said three key levers are mounted, said bracket and key levers being located adjacent one side of the main frame.

34. In a typewriting machine, a carriage bed; a back-spacing device mounted on the carriage bed; a bracket held to the carriage bed; ribbon mechanism mounted on said bracket; a stop on said bracket for limiting back-spacing movements of said device; means for actuating said device; and means for actuating said ribbon mechanism.

35. In a typewriting machine, a main frame; a shiftable carriage bed; a bracket held to the carriage bed; a back-spacing dog mounted on the carriage bed; a ribbon spool mounted on said bracket; means for turning said spool mounted in part on the main frame and in part on said bracket; means for actuating said dog mounted in part on the main frame and in part on said bed; and a stop on said bracket cooperating with said dog to limit back-spacing movements of the dog.

36. In a typewriting machine, a main frame having a transverse partition wall; a shift frame extending down into the space back of the partition wall; a platen carriage mounted on the shift frame; a pair of ribbon spools and spool-rotating devices associated therewith all mounted on the shift frame forward of the plane of the partition wall; escapement mechanism for the carriage in rear of the plane of the partition wall and mounted to partake of case-shift movements of the carriage; ribbon-reversing means mounted on the shift frame forward of the plane of said partition wall for rendering the spool-rotating devices effective alternately; line-locking means located to the rear of the plane of said partition wall; a releasing device for the line-locking means mounted on the shift frame in rear of the plane of said partition wall; a back-spacing device mounted on the shift frame in rear of the plane of said partition wall; type bars mounted in the main frame forward of the partition wall; a keyboard in the front portion of the main frame having character keys connected to actuate the type bars and keys connected respectively with the shift frame and the back-spacing device and the line-lock releasing device; and mechanism on the main frame operable from the character keys for actuating said spool-rotating devices and said ribbon-reversing means and said escapement mechanism.

37. In a typewriting machine, a main frame having front, back and side walls and a transverse partition wall; a type bar segment held to said partition wall; a key lever fulcrum member held to said partition wall; a key lever guide comb forward of the partition wall and held to the side walls; a sub-lever segment intermediate the guide comb and partition wall and held to the side walls; key levers fulcrumed on said fulcrum member and extending forward under said sub-lever segment and guided in said comb between the keys and sub-lever segment; a shift frame extending down into the space between the back and partition walls; guides for the shift frame held to the main frame between the back and partition walls; a carriage mounted on the shift frame; a platen on the carriage; type bars pivoted in the type bar segment; a pair of brackets held to the side walls between the partition wall and guide comb; right and left-hand shift levers guided in said comb and fulcrumed on said brackets and connected with the shift frame; a type bar rest supported on said brackets forward of the type bar segment; operating connections between the key levers and type bars extending from the key levers at the rear of said guide comb over said sub-lever segment to the type bars and including sub-levers fulcrumed on the segment, and a cover plate extending from side to side of the main frame and closing the space between the type bar rest and the guide comb and supported on said guide comb and said pair of brackets.

38. In a typewriting machine, a main frame; a shift frame guided to move up and down in the rear part of the main frame; a pair of brackets extending forward from the shift frame at opposite sides of the main frame; ribbon spools mounted on said brackets; a platen carriage mounted on the shift frame; escapement mechanism and line-locking mechanism both partaking of the case-shift movements of the carriage; a back-spacing device and a line-lock releasing device both partaking of the case-shift movements of the carriage; means for actuating said devices comprising two key levers, means for shifting the shift frame comprising right and left-hand shift key levers, a pair of brackets held to the main frame at opposite sides thereof upon which said shift key levers are fulcrumed and upon one of which the two key levers for actuating the back-spacing and line-lock releasing devices are also fulcrumed; a type rest supported on the pair of brackets held to the main frame, type bars pivotally supported on the main frame in rear of said rest and normally engaging over the rest forward of their pivots, a stop on one of said ribbon spool brackets for limiting back-spacing movements of the back-spacing device, key-operated means in the main frame for actuating the type bars, and means for actuating the escapement and the ribbon spools.

39. In a typewriting machine, a main frame having a transverse partition wall located toward the rear thereof; a slotted typebar segment held to the front face of said wall and having an arcuate recess in its rear face with which the segment slots communicate; an arcuate universal bar vibratable in said recess; an arcuate system of type bars pivoted in the slots of the segment for engagement with the universal bar during their printing strokes and normally extending forwardly from the segment; character keys forward of the type bars; a system of key levers supporting said keys at their forward ends and extending rearward under the partition wall and finally upward behind said wall to points adjacent the upper edge of the wall; a fulcrum member held to said wall at the rear thereof on which the key levers are fulcrumed at the upper ends of the upturned rear portions thereof; operating connections between the key levers and type bars located forward of the partition wall; universal-bar-carrying means extending rearwardly through the partition wall and the system of key levers; means in the main frame in rear of the partition wall and the upturned rear portions of the key levers supporting said carrying means for vibratory movements; a platen above and in rear of the segment; a traveling carriage upon which the platen is mounted, located above said universal-bar-carrying means; and letter-spacing mechanism for the carriage operable by said universal-bar-carrying means and connected therewith at a point in rear of the upturned rear ends of the key levers.

40. In a typewriting machine, a main frame having a transverse partition wall; an arcuate system of type bars forward of said wall and pivotally supported at their rear ends from said wall; a supporting member held to the rear face of said wall, formed with a pair of rearwardly extending transversely spaced arms adjacent the lower edge of the wall; character keys forward of the system of type bars; key levers supporting the keys at their forward ends and extending rearward therefrom under said wall and finally upward behind the wall; said key levers having their upturned rear ends pivotally held to said supporting member adjacent the upper edge of said wall; an arcuate universal bar located forward of said wall for engagement by the type bars during their printing strokes; universal-bar-carrying means extending rearwardly from the universal bar through said wall and the system of key levers; a pair of supporting links connecting said carrying means with the arms on said supporting member and located in rear of the upturned rear portions of the key levers; additional supporting means for said universal-bar-carrying means located in rear of said links and cooperating therewith to guide the universal bar to move transversely of the plane of the partition wall; a platen; a carriage located above said universal-bar-carrying means and supporting the platen above and in rear of the type-bar pivots; operating connections between the key levers and type bars, located forward of the partition wall; and escapement mechanism for the carriage operable from the universal-bar-carrying means and located to the rear of the plane of the partition wall.

41. In a typewriting machine, a main frame having a transverse partition wall; a type bar segment held to the front face of said wall; a sheet metal plate held to the rear face of said wall, having its upper edge portion bent rearwardly and formed with a series of fore-and-aft extending key-lever-spacing slots and a plurality of laterally facing eyes; a key-lever fulcrum rod supported in said eyes and crossing said slots; character-key levers having their rear ends pivoted on said rod and engaged in said slots and extending downward behind said wall and then forward under the wall to the forward portion of the main frame; type bars located forward of the wall and pivoted in the segment; operating connections between the type bars and key levers; vibratory universal-bar-carrying means extending through said wall and plate; and an arcuate universal bar supported by said carrying means forward of the wall in the paths of the type bars, said plate having a pair of rearwardly extending arms on which said universal-bar-carrying means is supported.

42. In a typewriting machine, a main frame having front, back and sides and a transverse member; a shift frame of open construction extending down into the space between said transverse member and the back of the frame; means between the transverse member and the back of the frame for guiding the shift frame to move up and down; a type-bar segment supported from the transverse member at the front of said member; type bars pivoted in the segment; a platen carriage supported by the shift frame; a platen on the carriage above and in rear of the type-bar pivots; universal-bar mechanism extending through the shift frame and including a universal bar in the paths of the type bars; type-bar-actuating mechanism including key levers; a sheet metal supporting member held solely to said transverse member and with which said key levers and said universal bar mechanism are pivotally connected; and key-actuated means on the main frame for shifting the shift frame.

43. In a typewriter machine, a main frame having front, back and side and a transverse member; a shift frame of open construction extending down into the space between said transverse member and the back of the frame; means between the transverse member and the back of the frame for guiding the shift frame to move up and down; a type-bar segment supported from the transverse member at the front of said member; type bars pivoted in the segment; a platen carriage supported by the shift frame; a platen on the carriage above and in rear of the type-bar pivots; universal-bar mechanism extending through the shift frame and including a universal bar in the paths of the type bars; type-bar-actuating mechanism including key levers; a sheet metal supporting member held solely to said transverse member and with which said key levers and said universal bar mechanism are pivotally connected; key-actuated means on the main frame for shifting the shift frame; and escapement mechanism for the carriage, shiftable with the shift frame and extending within the open structure of said shift frame.

44. In a typewriting machine, the combination of a low main frame having front and back and side walls, and a transverse partition wall, character keys arranged in the banks increasing in height from the front to the rear bank within the forward part of said main frame, said partition wall lying in a rearwardly inclined plane and extending across the rear portion of the frame with its lower edge above the level of the lower edges of the other frame walls, a type bar pivot segment secured to the front face of said partition wall below the level of the highest bank of keys, type bars pivotally supported in said segment with their pivots in an arc in a transverse plane inclined rearward from the vertical, a rest for the type bars supporting the bar in normal upwardly and forwardly inclined positions with the heads of the central bars close to the highest bank of keys and substantially level with the same, a platen carriage, a case shift frame on which said carriage is mounted to travel extending into the main frame back of the segment, a platen mounted on the carriage slightly above the level of the segment for impact of types on the bars on its upper front quarter, means on the main frame for guiding the shift frame in a plane parallel with the plane of the type bar pivots, said carriage and platen together with the shift frame and its guiding means being located forward of the vertical plane of the back wall of the machine and in rear of the plane of the type bar pivots, a system of character key levers extending downwardly from the banks of keys and then rearwardly under the partition wall and finally upwardly behind said wall, means pivotally supporting the rear upper ends of the key levers on said partition wall near the level of the upper edge of said wall, ribbon feeding and vibrating mechanism and a key-lever-operated universal bar for actuating the same, located forward of the plane of the partition wall, escapement mechanism for the carriage and a type-bar-actuated universal bar for actuating the same located between the plane of the type bar pivots and the vertical plane of the back wall of the frame, a shift key connected with the case shift frame, and operating connections from the character key levers to the type bars.

45. The typewriting machine as claimed in claim 44, in which the connections from the key levers to the type bars are located above the rearwardly extending portions of the key levers forward of the partition wall.

46. The typewriting machine as claimed in claim 44, in which the ribbon operating universal bar is located under the rearwardly extending portions of the key levers, and the connections from the type bars to the key levers are located above said rearwardly extending portions of the key levers.

47. In a portable typewriting machine, a standard four-bank keyboard; a system of type bars carrying upper and lower case types and pivotally mounted at their rear ends with their pivots in an arc lying in a transverse plane inclined toward the rear of the machine; connections between the type bars and the keys of the keyboard for actuating the type bars; a main frame having a transverse partition wall adjacent the rear thereof supporting the key lever and type bar pivots; a rearwardly and downwardly inclined carriage bed located in rear of the plane of the type bar pivots and below the level of the highest bank of keys; a rearwardly and downwardly tilted platen carriage mounted on the bed; a platen mounted on the carriage in rear of the plane of the type bar pivots to receive type impacts on its upper front quarter; key-operated means for shifting the carriage bed up and down substantially parallel with the plane of the type bar pivots; a pair of brackets extending forwardly from the carriage bed over the partition wall and having horizontal forward portions overlying the sides of the main frame; a pair of upright ribbon spools rotatably supported on said horizontal bracket portions substantially level with the platen; a third bracket extending forward from the carriage bed over the partition wall between said pair of brackets; an upwardly and rearwardly inclined vibrating ribbon guide supported from said third bracket; carriage-feed mechanism mounted in rear of the plane of the partition wall to partake of case-shift movements of the carriage bed; means for actuating said spools, ribbon-guide and carriage-feed mechanism at the key strokes; and an arcuate type rest mounted in the main frame in rear of the keyboard in a rearwardly inclined transverse plane and supporting the type bars in upwardly and forwardly inclined positions with the heads of the bars below the level of the top of the platen.

48. In a three-quarter-strike typewriting machine, a main frame; a four-bank standard keyboard; an upwardly and rearwardly inclined type segment supported in the main frame; upwardly and forwardly extending type bars pivoted in the segment; a downwardly and rearwardly inclined carriage bed overlying the main frame in rear of the segment; a downwardly and rearwardly inclined carriage on the bed; a platen mounted on the carriage above and in rear of the segment with the bottom thereof substantially level with the highest bank of keys; key levers supporting the keys and pivoted at their rear ends to the rear of the plane of the segment and close to the forward edge of the carriage bed and depressed between their ends to afford space for the segment and type bars and type-bar-actuating connections; operating connections between the key levers and type bars located entirely in the space between the type bars and keyboard above the depressed portions of the key levers; a rest mounted in the main frame, supporting the heads of the type bars between the levels of the highest bank of keys and the top of the platen; and escapement mechanism for the carriage including a dog rocker mounted on the bed and extending into the space between the upturned rear ends of the key levers and the back of the main frame.

49. In a three-quarter-strike typewriting machine, a main frame; a four-bank standard keyboard; an upwardly and rearwardly inclined type segment supported in the main frame; upwardly and forwardly extending type bars pivoted in the segment; a downwardly and rearwardly inclined carriage bed overlying the main frame in rear of the segment; a downwardly and rearwardly inclined carriage on the bed; a platen mounted on the carriage above and in rear of the segment with the bottom thereof substantially level with the highest bank of keys; key levers supporting the keys and pivoted at their rear ends to the rear of the plane of the segment and close to the forward edge of the carriage bed and depressed between their ends to afford space for the segment and type bars and type-bar-actuating connections; operating connections between the key levers and type bars located entirely in the space between the type bars and keyboard above the depressed portions of the key levers; a rest mounted in the main frame, supporting the heads of the type bars between the levels of the highest bank of keys and the top of the platen; escapement mechanism for the carriage including a dog rocker mounted on the bed and extending into the space between the upturned rear ends of the key levers and the back of the main frame; shiftable supporting means for the bed extending downwardly and forwardly from the bed into the space between the upturned rear ends of the key levers and the back of the frame and guided in the main frame to move up and down substantially parallel with the plane of the segment; and key-operated means for case-shifting the bed-supporting means.

50. In a three-quarter-strike typewriting machine, a main frame having a rearwardly inclined transverse partition wall; and upwardly and rearwardly shiftable carriage-supporting frame extending into the space between said wall and the back of the frame; a platen carriage on said shiftable frame; a platen on the carriage; a pair of end brackets held to said support at their rear ends and extending forward over said wall; ribbon spools and spool-rotating devices supported on said brackets forward of the plane of said wall; a third bracket held to said shiftable frame; a dog rocker for the carriage escapement mounted on said third bracket, said dog rocker and its supporting bracket being both located in rear of the plane of the partition wall; an upwardly and rearwardly inclined type-bar segment held to the front face of said wall; type bars pivoted in said segment to strike on the upper front quarter of the platen; a rest supporting the heads of the type bars, located forwardly of the spools, said type bars swinging through the open space between the ribbon spool and its rotating device at one side of the machine and the ribbon spool and its rotating device at the opposite side of the machine; shift key levers connected to shift said shiftable frame; character-key levers pivotally supported at their rear ends from the partition wall; and connections between the key levers and type bars for actuating the type bars, located forwardly of the partition wall.

51. In a three-quarter-strike typewriting machine, a main frame having a transverse partition wall in the rear portion thereof lying in an upwardly and rearwardly inclined plane; a key-lever fulcrum member held to the back face of said wall; a standard four-bank keyboard in the front portion of said frame; an arcuate type-bar rest supported in the frame in an upwardly and rearwardly inclined plane with the lowest part thereof close to and substantially level with the highest bank of keys; an upwardly and rearwardly inclined type-bar segment held to the front face of said wall below the level of the highest bank of keys; a system of type bars of standard length pivoted at their rear ends in said segment and supported at their forward ends on said rest; a horizontally disposed sub-lever segment in the main frame extending under the type bars substantially level with the lowest bank of keys and curving toward the rear of the machine; a system of rearwardly converging sub-levers pivoted in said sub-lever segment; a system of parallel key levers extending under the sub-lever segment and partition wall and having upturned front key-carrying end portions forward of said segment and the type rest, and upturned rear end portions back of said wall pivoted at their upper ends on said fulcrum member; a system of upstanding links connecting the forward ends of the sub-levers with the key levers closely in rear of the keyboard; a system of downwardly and rearwardly converging links connecting the rear ends of the sub-levers with the heels of the type bars; and a platen supported above and in rear of the type bar segment to receive impacts of types on the type bars on its upper front quarter.

52. In a three-quarter-strike typewriting machine, a main frame having a transverse partition wall in the rear portion thereof lying in an upwardly and rearwardly inclined plane; a key-lever fulcrum member held to the back face of said wall; a standard four-bank keyboard in the front portion of said frame; an arcuate type-bar rest supported in the frame in an upwardly and rearwardly inclined plane with the lowest part thereof close to and substantially level with the highest bank of keys; an upwardly and rearwardly inclined type-bar segment held to the front face of said wall below the level of the highest bank of keys; a system of type bars of standard length pivoted at their rear ends in said segment and supported at their forward ends on said rest; a horizontally disposed sub-lever segment in the main frame extending under the type bars substantially level with the lowest bank of keys and curving toward the rear of the machine; a system of rearwardly converging sub-levers pivoted in said sub-lever segment; a system of parallel key levers extending under the sub-lever segment and partition wall and having upturned front key-carrying end portions forward of said segment and the type rest, and upturned rear end portions back of said wall pivoted at their upper ends on said fulcrum member; a system of upstanding links connecting the forward ends of the sub-levers with the key levers closely in rear of the keyboard; a system of downwardly and rearwardly converging links connecting the rear ends of the sub-levers with the heels of the type bars; a platen supported to travel across the main frame with the lower portion thereof substantially level with the highest bank of keys and its upper front portion in position to receive impacts of types on the type bars; a transverse bar supported in the main frame below the key levers and forward of the rear upturned portions thereof; and springs held to said bar at their forward ends and connected at their rear ends with the key levers.

53. In a typewriting machine, a main frame having a transverse partition wall; a type action including key levers and type bars; means mounted on the partition wall at the rear of said wall for pivotally supporting the key levers; means mounted on the partition wall at the front of the wall for supporting the type bars; a platen located above and in rear of the type bar pivots; a carriage for the platen; letter-feed mechanism for the carriage located entirely to the rear of the plane of said wall; ribbon-feeding and vibrating mechanism located entirely forward of the plane of said wall; a universal bar under the key levers for actuating the ribbon mechanism; and a universal bar located in front of said wall between the type bar pivots and the platen for actuating the letter-feed mechanism.

54. In a three-quarter-strike typewriting machine, a main frame having front, back and side walls and an upwardly and rearwardly inclined transverse partition wall; a carriage bed inclining downwardly and rearwardly from the upper edge of the partition wall; a rearwardly tilted carriage; means guiding and holding the carriage to the bed to travel thereover, said bed and carriage being located forward of the vertical plane of the back frame wall; means between the back and partition walls for guiding the bed to shift up and down substantially parallel with the partition wall; an upwardly and rearwardly inclined type bar segment held to the front face of the partition wall; an upwardly and rearwardly inclined type guide held to the front face of the partition wall; type bars pivoted in the segment; keys in the forward part of the frame connected to actuate the type bars; a platen supported on the carriage to receive type impacts on its upper front quarter; a ribbon guide slidably held to the inclined type guide; upright ribbon spools supported forward of the path of the carriage substantially level with the platen; a pair of end brackets held to the under face of the bed and extending forward over the partition wall and supporting the spools; a third bracket held to the under face of the bed and extending forward over the partition wall between the end brackets; a supporting and actuating member for the ribbon guide mounted on said third bracket and operable from the keys; spool-rotating devices mounted on the end brackets at opposite sides of the system of type bars and operable from the keys; and escapement mechanism located between the planes of the back and partition walls and mounted to partake of case-shift movements of the bed.

55. In a three-quarter-strike typewriting machine, a main frame having front, back and side walls and an upwardly and rearwardly inclined transverse partition wall; a carriage bed inclining downwardly and rearwardly from the upper edge of the partition wall; a rearwardly tilted carriage; means guiding and holding the carriage to the bed to travel thereover, said bed and carriage being located forward of the vertical plane of the back frame wall; means between the back and partition walls for guiding the bed to shift up and down substantially parallel with the partition wall; an upwardly and rearwardly inclined type bar segment held to the front face of the partition wall; an upwardly and rearwardly inclined type guide held to the front face of the partition wall; type bars pivoted in the segment; keys in the forward part of the frame connected to actuate the type bars; a platen supported on the carriage to receive type impacts on its upper front quarter; a ribbon guide slidably held to the inclined type guide; upright ribbon spools supported forward of the path of the carriage substantially level with the platen; a pair of end brackets held to the under face of the bed and extending forward over the partition wall and supporting the spools; a third bracket held to the under face of the bed and extending forward over the partition wall between the end brackets; a supporting and actuating member for the ribbon guide mounted on said third bracket and operable from the keys; spool-rotating devices mounted on the end brackets at opposite sides of the system of type bars and operable from the keys; escapement mechanism located between the planes of the back and partition walls and mounted to partake of case-shift movements of the bed; a fourth bracket held to the under face of the bed and extending forward over the partition wall; and a combined printing line and printing point indicator supported on said fourth bracket in front of the platen and to the rear of the ribbon and type guides.

56. In a typewriting machine, a main frame; a platen carriage and a shift frame therefor both located forward of the rear of the main frame; a platen on the carriage; a type-bar action including type bars and key levers located entirely in the space between the shift frame and the front of the main frame and below the level of the top of the platen; carriage escapement mechanism under the carriage and in rear of the type bar action operable by the type bar action; ribbon spools and rotating devices therefor supported from the shift frame below the level of the platen and entirely forward of the shift frame; a rocking frame operable by the type action; and operating connections between the rocking frame and said rotating devices, said rocking frame and operating connections being located entirely forward of the shift frame and escapement mechanism.

57. In a typewriting machine, a main frame, a space bar pivotally supported on the main frame and a pair of rubber supporting feet held to the main frame and having their upper ends arranged to form cushion stops for limiting depression of the space bar.

58. In a typewriting machine, a main frame; an upwardly and rearwardly inclined segment in the main frame; type bars pivoted in the segment and extending upward and forward therefrom; a platen and a carriage therefor located forward of the rear of the main frame and in rear of the type bears; a shift frame for the carriage extending down into the space to the rear of the segment and forward of the rear of the main frame and shiftable substantially in the plane of the segment; escapement mechanism shiftable with the shift frame; ribbon-feeding and vibrating mechanism shiftable with the shift frame; type-bar-actuating mechanism, said escapement mechanism being located to the rear of said ribbon vibrating and feeding mechanism and said type-bar-actuating mechanism; and two universal bars for actuating said ribbon mechanism and escapment mechanism, the universal bar for the escapment mechanism being located to the rear of the universal bar for the ribbon mechanism.

59. In a typewriting machine, a main frame having an upwardly and rearwardly inclined transverse partition wall; a type-bar segment held to the front face of said wall in a rearwardly inclined plane; a shift frame extending down into the space behind the partition wall and shiftable up and down subtantially parallel therewith; a platen carriage mounted on the shift frame above the space between the partition wall and the rear of the main frame; escapement mechanism located to the rear of the plane of the partition wall and forward of the rear of the main frame; an upwardly and forwardly inclined system of type bars pivoted in the segment at their rear ends; a platen mounted on the carriage to receive type impacts on its upper front quarter; an upwardly and rearwardly inclined type guide held to the front face of the partition wall at its lower end between the ends of the segment and extending upward in front of the platen; a ribbon guide; a vibrating support for the ribbon guide supported from the shift frame above the segment and entirely forward of the shift frame; ribbon spools supported from the shift frame forward of the partition wall substantially level with the platen and at opposite sides of the main frame; a spool-rotating means associated with each spool and both supported from the shift frame forward of the partition wall; a universal rocking device on the main frame forward of the shift frame; a connection between said device and said vibrating ribbon guide support located in front of the partition wall at one side of the system of type bars; connections between said rocking device and both of said spool-rotating means located at opposite sides of the system of type bars and forward of the partition wall; key-operated means for actuating the type bars located forwardly of the shift frame and the escapement mechanism; and an escapement actuator supported on the main frame in rear of the partition wall.

60. In a typewriting machine, a main frame; a type action including type bars and character keys in the main frame; a space-bar; escapment mechanism operable from the type action and space bar; a pair of rubber supporting feet for the rear portion of the main frame; and a pair of rubber supporting feet for the front portion of the main frame, having exposed upper ends located to form cushion stops for limiting down strokes of the space bar.

61. A typewriter having a main frame supporting the working parts thereof including the space bar, and supporting feet for the main frame, characterized by the fact that certain of said supporting feet are held to the main frame in position to present the upper ends thereof in position to form stops for limiting downward movement of the space bar.

62. In a typewriting machine, type bars; key levers; connections between the key levers and the type bars including sub-levers; a segment extending between the type-bars and key levers in which the sub-levers are pivoted; a spring-returned universal bar located under the key levers; and a stop on said universal bar engageable with said segment to determine the normal position of the universal bar.

63. In a typewriting machine, a slotted type bar segment having an arcuate recess in its rear face communicating with the segment slots; type bars pivoted in the slots of the segment; a main frame having a transverse partition wall against the front face of which said segment is held; an arcuate universal bar vibratable in the recess in said segment by the type bars, said wall having openings therein communicating with the recess in the segment; vibratable universal-bar-carrying means extending through said wall opening; key levers for operating the type bars, extending rearward under said wall from the keys; and a common pivot support for the key levers and said universal-bar-carrying means, held to the partition wall at the rear of said wall.

64. In a typewriting machine, a main frame; a pair of brackets held to the main frame at opposite sides of said frame; a pair of supporting feet for the main frame; and an anchor bar for the return springs of the type action of the machine, extending transversely of the main frame, said brackets each having a slot in which one of the supporting feet is detachably held and a slot in which one end of the anchor bar is detachably held.

65. In a typewriting machine, a main frame, a system of type bars and a system of key levers fulcrumed on the main frame, the key levers having upturned key carrying ends supporting keys in transverse rows, operating connections leading from the type bars to the key levers at points close to the upturned ends of the rear row of keys, a transverse guide comb of angular form in cross-section mounted on the main frame having a vertical wall forward of the rear row of keys formed with vertical guide slots through which the parts of all of the key levers extend and two horizontal walls in stepped relation above and in rear of said vertical wall, a stop cushion held to the under face of the lower horizontal wall overlying portions of all the key levers, and restoring springs connected with the key levers and main frame normally urging the key levers against said stop cushion, the higher horizontal wall of said comb being formed with fore-and-aft extending guide slots for the upturned end portions of the key levers carrying the rear row of keys.

66. A typewriting machine framework comprising a main frame having front and back walls, side walls, and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, and a front frame plate detachably held to said brackets and comb.

67. A typewriting machine framework comprising a main frame having front and back walls, side walls, and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, a front frame plate detachably held to said brackets and comb, said brackets each having a supporting ear for a shift-key-lever pivot, and a second pair of brackets held to said side walls between the back and partition walls each formed with stop-carrying arms for upper and lower case stops for a platen shift frame.

68. A typewriting machine framework comprising a main frame having front and back walls, side walls, and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, a front frame plate detachably held to said brackets and comb, said brackets each having a supporting ear for a shift-key-lever pivot, and a second pair of brackets held to said side walls between the back and partition walls each formed with stop-carrying arms for upper and lower case stops for a platen shift frame, said second pair of brackets each formed with a horizontal attachment portion for a cushion foot and said front wall of the main frame having a horizontal attachment flange for cushion feet.

69. A typewriting machine framework comprising a main frame having front and back walls, side walls, and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, a front frame plate detachably held to said brackets and comb, said brackets each having a supporting ear for a shift-key-lever pivot, a second pair of brackets held to said side walls between the back and partition walls each formed with stop-carrying arms for upper and lower case stops for a platen shift frame, said second pair of brackets each formed with a horizontal attachment portion for a cushion foot and said front wall of the main frame having a horizontal attachment flange for cushion feet, said key lever fulcrum supporting plate having integral transversely spaced arms extending rearwardly therefrom for supporting a universal bar, and a bracket held to the rear wall of the main frame having a pair of transversely spaced forwardly extending arms forming with the arms on said plate supporting means for a universal bar frame, said second pair of brackets each having a forwardly extending arm passing under the partition wall, and an anchor bar for key lever return springs held to said last-mentioned bracket arms.

70. A typewriting machine framework comprising a main frame having front and back walls, side walls, and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, a front frame plate detachably held to said brackets and comb, and a type-action sub-lever segment detachably secured at its ends to the side walls of the main frame intermediate the partition wall and guide comb.

71. A typewriting machine framework comprising a main frame having front and back walls, side walls and a transverse partition wall, a character key lever spacing and fulcrum supporting plate held to the rear face of said partition wall, a type bar fulcrum support held to the front face of said partition wall, a key lever guide comb held at its ends to said side walls between the partition and front walls, a pair of oppositely disposed brackets held to said side walls intermediate said partition wall and comb, a type bar rest supported at its ends on said brackets, a front frame plate detachably held to said brackets and comb, said brackets each having a supporting ear for a shift-key-lever pivot, a second pair of brackets held to said side walls between the back and partition walls each formed with stop-carrying arms for upper and lower case stops for a platen shift frame, said second pair of brackets each formed with a horizontal attachment portion for a cushion foot and said front wall of the main frame having a horizontal attachment flange for cushion feet, said key lever fulcrum supporting plate having integral transversely spaced arms extending rearwardly therefrom for supporting a universal bar frame.

72. In a typewriting machine, a platen; a system of key levers having upturned rear end portions pivotally supported at their upper ends with the pivotal axes in a single straight line extending transversely of the machine, said key levers being of different lengths and supporting keys in banks at their forward ends; a stationary transverse bar under the key levers forward of the upturned rear ends thereof; a series of coiled springs of uniform normal length and tensile strength connected with said bar at their forward ends and connected at their rear ends with the key levers, the distance between the points of connection of said springs with the key levers and the bar varying in accordance with variations in the lengths of the key levers and being shortest for the shortest levers and longest for the longest levers so that the springs when connected with the key levers and bar are tensioned in direct proportion to the load; and type carriers operable by the key levers.

73. In a typewriting machine, a main frame; a transversely extending sheet metal plate detachably held to the main frame, having a row of slots therein adjacent one edge of the plate and extending perpendicular to said edge; a transverse rod extending across said slots at one face of the plate, said plate having eyes punched up therefrom in which said rod is removably supported; key levers fulcrumed on said rod and extending through said slots; type bars operable by the key levers; a universal bar operated by the type bars; a pair of transversely spaced arms integral with said plate and lying in parallel planes perpendicular to the plane of the plate; and a rocking supporting frame for the universal bar, pivotally mounted on said arms.

74. In a three-quarter-strike typewriting machine, a main frame; a downwardly and rearwardly inclined carriage bed; a type segment forward of the bed and inclined upward and rearward toward the bed; a rearwardly tilted platen carriage over the bed; a platen on the carriage; antifriction bearings between the carriage and bed; a bracket held to the bed and extending forward therefrom; a roller mount located over the bracket; a roller yieldably mounted on said roller mount; a combined printing line and printing point indicator located over the bracket and extending upward and rearward to the upper front quarter of the platen; fastening screws common to said mount and indicator and securing both to said bracket with the roller in position to exert downward and forward pressure on the carriage and with the axis of rotation of the roller extending downwardly and rearwardly; and type bars pivoted in the inclined segment and adapted to strike on the upper front quarter of the platen.

75. In a typewriting machine, the combination of a platen carriage; a platen on the carriage; printing mechanism including pivoted type bars and keys connected with the type bars to swing the bars about their pivots toward the platen; a carriage escapement including a dog rocker spring-urged to normal position; a pair of ribbon spools; ratchets rotatable with the spools; a driving pawl for each spool for rotating the spool ratchet in a direction to reel the ribbon on the spool; a detent pawl for each spool for holding the ratchets against turning in unreeling direction; ribbon feed direction controlling means settable to render the pawls for either spool ineffective when the pawls for the other spool are effective; a combined ribbon carrier and unreeler for guiding the ribbon in its passage between the spools, vibratible relatively to the spools from a printing point uncovering position to a printing point covering position in which its ribbon guiding portion is farther from the spools to unreel the ribbon on its covering movement from the free spool only; spring-returned universal means movable by the printing mechanism on the down strokes of the keys only following a partial movement of a type bar toward the platen by the actuated key; connections between said spring-returned universal means and said combined ribbon carrier and unreeler, spool driving pawls, and spring-returned dog rocker, whereby the dog rocker is moved against the action of its spring, the spool driving pawls are moved in non-driving direction, and the ribbon carrier is moved in printing-point-covering and ribbon-unreeling direction during completion of the movement of the actuated type bar toward the platen, and whereby the movement of the dog rocker is started only after starting of the movements of the pawls and ribbon carrier; and individual restoring springs each associated with a connected key and type bar for returning the same to normal position; said spring-returned dog rocker and spring-returned universal means cooperating with the printing mechanism, ribbon carrier and driving pawls and with each other to effect a rapid return of the actuated key and type bar, a feed of the carriage at the beginning of the up stroke of the actuated key, and complete uncovering movement of the ribbon carrier and complete ribbon reeling movement of the effective driving pawl before full restoration of the actuated key and type bar.

76. In a three-quarter-strike typewriting machine, a platen carriage; a platen on the carriage; type bars pivoted to swing first upwardly and rearwardly and then downwardly and rearwardly on their printing strokes; key levers connected to actuate the type bars; a pair of ribbon spools; a combined ribbon guide and unreeler guiding the ribbon in its passage between the spools, shiftable from a printing-point-uncovering position to a printing-point-covering position in which its guiding portion is farther from the spools; a vibrating spool-rotating device for each spool for turning the spool in a direction to reel the ribbon thereon; a holding device for each spool for preventing turning thereof in unreeling direction; feed-direction controlling means settable to render the rotating and holding devices for one spool at a time ineffective; a spring-returned universal bar operable against its spring directly by the key levers and engageable by the actuated key lever on the down stroke of a key before the connected type bar reaches the highest point of its throw and only after an initial upward and rearward movement of said type bar; connections between the key-lever-operated universal bar and the ribbon guide and spool-rotating devices for moving said devices in non-turning direction and moving the ribbon guide to printing-point-covering position on the down stroke of a key to thereby unreel the ribbon from the free spool, interpose it between the actuated type bar and platen, and position the effective spool-rotating device for turning the held spool on the following up stroke of an actuated key; a spring-returned escapement device for the carriage; and a spring-returned universal bar operable directly by the type bars and engageable therewith only during the downward part of the printing stroke and upward part of the return stroke of the actuated type bar and arranged to move the escapement device against the force of its spring on the downward part of the printing stroke of a type bar.

77. In a three-quarter-strike typewriting machine, a main frame; a keyboard in the forward part of the main frame; a carriage bed overlying the rear portion of the main frame; an arcuate system of type bars; an inclined and radially slotted segment, in the slots of which the type bars are pivoted, extending downwardly and forwardly from the front edge of the carriage bed; an arcuate upwardly and rearwardly inclined type bar rest between the segment and keyboard supporting the heads of the type bars higher than their pivots and well forward of their pivots; key levers supporting the keys of the keyboard and having upturned rear end portions located in rear of and close to the plane of the segment and pivoted at their upper ends adjacent the forward edge of the carriage bed; an arcuate universal bar parallel with the segment and located between the upturned rear ends of the key levers and the segment in position for actuation by the type bars; means shiftably mounted on the main frame in rear of the upturned rear ends of the key levers and extending forward to the universal bar for supporting said bar for vibration transversely of the plane of the segment; a platen; a carriage mounted on the carriage bed and supporting the platen in position to receive type impacts on its upper front quarter and with its top substantially level with the ends of the type bar rest; carriage feed mechanism operable by the universal bar supporting means; and connections between the key levers and type bars for swinging the type bars about their pivots.

78. In a three-quarter-strike typewriting machine, a main frame; a keyboard in the forward part of the main frame; a carriage bed overlying the rear portion of the main frame; an arcuate system of type bars; an inclined and radially slotted segment, in the slots of which the type bars are pivoted, extending downwardly and forwardly from the front edge of the carriage bed; an arcuate upwardly and rearwardly inclined type bar rest between the segment and keyboard supporting the heads of the type bars higher than their pivots and well forward of their pivots; key levers supporting the keys of the keyboard and having upturned rear end portions located in rear of and close to the plane of the segment and pivoted at their upper ends adjacent the forward edge of the carriage bed; an arcuate universal bar parallel with the segment and located between the upturned rear ends of the key levers and the segment in position for actuation by the type bars; means supporting the universal bar for vibration transversely of the plane of the segment; a platen; a carriage mounted on the carriage bed and supporting the platen in position to receive type impacts on its upper front quarter and with the top of the platen substantially level with the ends of the type bar rest; carriage feed mechanism under the carriage and extending downward behind the upturned rear ends of the key levers; an operating connection between the universal bar and said carriage feed mechanism; and connections between the key levers and type bars for swinging the type bars about their pivots.

79. In a three-quarter-strike typewriting machine, a main frame having front, back and side members and an upwardly and rearwardly inclined transverse member adjacent to and forward of the back member; a rearwardly tilted carriage bed; means guiding and supporting the bed to shift bodily upward and rearward to change case; a rearwardly tilted platen carriage mounted on said bed to travel thereover; a platen on the carriage; an arcuate system of type bars forward of said inclined transverse member; means pivotally supporting said bars from said inclined transverse member adjacent their rear ends with their pivots in an arc lying in an upwardly and rearwardly inclined plane; a rest on the main frame supporting the bars forward of their pivots with the heads of the type bars below the level of the top of the platen; said platen, carriage, bed and bed supporting and guiding means being all located in the space between the vertical plane of the rear frame member and the inclined plane in which the type bar pivots are situated with the platen in position to receive type impacts on its upper front quarter; a stationary upwardly and rearwardly inclined type guide supported from the inclined frame member at the fore and aft center line of the frame; a ribbon guide slidably held to the type guide to vibrate in an upwardly and rearwardly inclined path to cause a ribbon guided thereby to cover and uncover the impact point on the platen; an actuator for the ribbon guide connected directly therewith and mounted on the carriage bed to vibrate relatively thereto to raise and lower the guide and to shift bodily with the bed; a pair of supports extending forwardly from the carriage bed over the inclined frame member at opposite sides of the machine below the level of the top of the platen; a ribbon spool and a driving means therefor mounted on each of said supports below the level of the top of the platen; carriage escapement mechanism also located in the space between the vertical plane of the rear frame member and the plane of the inclined frame member and shiftable with the carriage bed; universal key-actuated devices on the main frame for operating the ribbon guide actuator, the ribbon spool driving means and the carriage escapement mechanism in all case positions of the shiftable carriage bed; shift-key-operated means on the main frame for shifting the carriage bed; character keys in the front part of the main frame forward of the type bar rest and below the level of the top of the platen; and connections between the character keys and type bars for actuating the type bars.

80. In a portable typewriting machine, a low main frame; a platen; an upwardly and rearwardly inclined type-bar segment mounted in said frame entirely below the highest part of the frame and the level of the bottom of the platen and forward of the platen; an arcuate system of type bars pivoted in said segment and normally inclined upward and forward from their pivots; key-actuated means for operating the type bars; a carriage supporting the platen at an elevation at which the top of the platen is substantially level with the forward end of the side type bars of the system; key-operated carriage escapement mechanism located under the carriage entirely in rear of the segment; a pair of ribbon spools; means supporting said spools at opposite sides of the machine forward of and substantially level with the platen; a spool-driving device adjacent each spool; ribbon-set means located forward of the carriage and extending from one spool-driving device to the other in rear of the printing positions of the type bars for rendering the spool-driving devices effective one at a time; and an open-top, key-operated actuator pivoted on the main frame and located forward of the escapement mechanism, having upstanding side members at opposite sides of the system of type bars for actuating said spool-driving devices and said ribbon-set means and a transverse member extending under the system of type bars.

81. In a three-quarter-strike typewriting machine, the combination of a platen carriage; a platen on the carriage; a carriage escapement including a spring-returned dog rocker; a system of pivoted type bars movable first upwardly and then downwardly toward the platen on their printing strokes; a system of key levers connected with the type bars to swing the same toward the platen on the down strokes of the keys; a pair of ribbon spools; a ribbon-vibrating and unreeling-device for unreeling the ribbon from one spool and carrying the ribbon over the printing point on the down stroke of a key and withdrawing the ribbon from over the printing point on the up stroke of a key; ribbon reeling means for reeling the ribbon on the other spool on the up stroke of a key; ribbon-feed-direction controlling means for selecting the unreeling and reeling spools; a spring-returned universal bar operable directly by the key levers connected with the ribbon vibrating and unreeling device and the ribbon reeling means for actuating the same and movable against its spring by the key levers only after a type bar has been moved partly toward the platen; and a spring-returned universal bar operable directly by the type bars for moving the dog rocker against its spring, said type-bar-actuated universal bar being movable against its spring by a type bar only after the key-lever-actuated universal bar has been moved against its spring by a key lever.

82. In a three-quarter-strike typewriting machine, the combination of a platen carriage; a platen on the carriage; a carriage escapement including a spring-returned dog rocker; a system of pivoted key-operated type bars movable about their pivots first upwardly and rearwardly and then downwardly and rearwardly toward the platen on the down strokes of the keys; a pair of ribbon spools; a ribbon vibrating and unreeling device for unreeling a ribbon from one spool and carrying the ribbon over the printing point on the down stroke of a key and withdrawing the ribbon from over the printing point on the up stroke of a key; ribbon-reeling means for reeling the ribbon on the other spool on the up stroke of a key; ribbon-feed-direction controlling means for selecting the unreeling and reeling spools; and spring-returned mechanism common to the keys and movable thereby against the spring-resistance only after a partial movement of an actuated type bar toward the platen and operative to actuate the dog rocker, ribbon vibrating and unreeling device, and ribbon reeling means; said mechanism cooperating with the dog rocker only during a portion of the period of operation of the ribbon vibrating and unreeling device and ribbon reeling means and only during the latter part of the printing stroke and first part of the return stroke of an actuated type bar.

In testimony whereof we hereunto affix our signatures.

ALONZO B. ELY.
EDWIN L. HARMON.